(12) United States Patent
Nishikawa et al.

(10) Patent No.: US 7,542,058 B2
(45) Date of Patent: Jun. 2, 2009

(54) COLOR IMAGE FORMING APPARATUS USING REGISTRATION MARKS

(75) Inventors: Eiji Nishikawa, Hachioji (JP); Hiroyuki Maruyama, Kanagawa (JP); Hiroyuki Arai, Hachioji (JP); Toshihiro Motoi, Tokyo (JP); Kenji Izumiya, Hachioji (JP); Ryuji Okutomi, Hino (JP); Shinobu Kishi, Hachioji (JP); Satoshi Ogata, Hachioji (JP); Kenichi Ozawa, Hachioji (JP); Tadayuki Ueda, Kokubunji (JP); Yumiko Higashi, Kokubunji (JP)

(73) Assignee: Konica Corporation, Tokyo (JP)

( * ) Notice: Subject to any disclaimer, the term of this patent is extended or adjusted under 35 U.S.C. 154(b) by 732 days.

(21) Appl. No.: 11/126,129

(22) Filed: May 10, 2005

(65) Prior Publication Data
US 2005/0206934 A1    Sep. 22, 2005

Related U.S. Application Data

(62) Division of application No. 10/435,743, filed on May 8, 2003, now Pat. No. 6,911,993.

(30) Foreign Application Priority Data

May 15, 2002   (JP)   ............................. 2002-140431
Jun. 6, 2002   (JP)   ............................. 2002-166142

(51) Int. Cl.
*G03G 15/01*   (2006.01)
(52) U.S. Cl. ...................................... 347/116; 399/301
(58) Field of Classification Search ................. 347/116, 347/229, 234, 248; 399/297–302
See application file for complete search history.

(56) References Cited

U.S. PATENT DOCUMENTS

| 5,175,570 | A | 12/1992 | Haneda et al. |
| 6,911,993 | B2 * | 6/2005 | Nishikawa et al. .......... 347/116 |

FOREIGN PATENT DOCUMENTS

| JP | 08-262823 | A | 10/1996 |
| JP | 09-267512 | A | 10/1997 |
| JP | 2000-172133 | A | 6/2000 |
| JP | 2000-321834 | A | 11/2000 |
| JP | 2002-023444 | A | 1/2002 |
| JP | 2002-132005 | A | 5/2002 |

OTHER PUBLICATIONS

Japanese Office Action dated Aug. 19, 2008 and English translation thereof issued in a counterpart Japanese Application.

* cited by examiner

*Primary Examiner*—Huan H Tran
(74) *Attorney, Agent, or Firm*—Frishauf, Holtz, Goodman & Chick, P.C.

(57) ABSTRACT

In an image forming apparatus for forming a color image by superposing component color images, a control device obtains position data representing a forming position of each of plural registration mark images for the component color images with respect to a positional reference value arbitrarily determined, divides the position data into each of a unit reference range representing a range in which one mark image is formed, converts the position data divided for each unit reference range into those based on respective reference values representing the front edge of the unit reference ranges, extracts the position data representing ranges common to the mutually overlapping ranges each of which is representing by a couple of position data corresponding to the rising and falling edges of a passage timing pulse as read position data of the mark image of the component color, and calculates the amounts of positional deviations of the component color images from one another on the basis of the position data extracted.

19 Claims, 55 Drawing Sheets

PATCH (1)

PATCH (2)

PATCH (3)

PATCH (4)

| FUSE F | Snd |
|--------|-----|
| Close  | "L" LEVEL |
| Open   | "H" LEVEL |

| No, | Data |
|---|---|
| 0 | 150 |
| 1 | 180 |
| 2 | 300 |
| 3 | 330 |
| 4 | 410 |
| 5 | 440 |
| 6 | 560 |
| 7 | 580 |
| 8 | 670 |
| ... | ... |
|  | 1500 |

DT

MARK 1: rows 0–3
MARK 2: rows 4–7

| Data |
|---|
| 10 |
| 40 |
| 160 |
| 190 |
| 270 |
| 300 |
| 420 |
| 440 |
| 530 |
| ... |
| 540 |

DP

MARK 1, MARK 2

| Data |
|---|
| 10 |
| 40 |
| 160 |
| 190 |
| 14 |
| 44 |
| 164 |
| 184 |
| 18 |
| ... |
| 28 |

DP

MARK 1, MARK 2

FIG. 50 (A) MARK 1
FIG. 50 (B) MARK 2
FIG. 50 (C) MARK 3
FIG. 50 (D) MARK 4
FIG. 50 (E) POSITION DATA DP

PRIOR ART

COLOR IMAGE FORMING APPARATUS USING REGISTRATION MARKS

CROSS-REFERENCE TO RELATED APPLICATIONS

The present application is a Divisional application of U.S. application Ser. No. 10/435,743, filed on May 8, 2003 now U.S. Pat. No. 6,911,993, which claims the benefit of priority of JP 2002-140431, filed on May 15, 2002, and JP 2002-166142, filed on Jun. 6, 2002.

BACKGROUND OF THE INVENTION

This invention relates to a color image forming apparatus such as a tandem-type color printer or copying machine and a complex machine of these having an intermediate transfer belt or a photoreceptor belt and an image forming method suitably applied thereto.

In recent years, a tandem-type color printer or copying machine or a complex machine of these has been used in many cases. In these color image forming apparatus, there are provided exposure means, developing devices, and photoreceptor drums for the respective colors of yellow (Y), magenta (M), cyan (C), and black (BK), an intermediate transfer belt, and a fixing device.

For example, in the exposure means for the color Y, an electrostatic latent image is formed on the photoreceptor drum on the basis of arbitrary image information. In the developing device, a color image is formed through the deposition of toner particles of the color Y on the electrostatic latent image formed on the photoreceptor. The toner image is transferred from the photoreceptor drum onto the intermediate transfer belt. As regards the other colors M, C, and BK, the same processing is carried out. The color toner image, having been transferred onto the intermediate transfer belt, is fixed by the fixing device.

Incidentally, by a color image forming apparatus of this kind, a color toner image has to be formed on an intermediate transfer belt without color deviations (positional deviations of component color images from one another, that is, component color images being out of registration). The reason is that the color toner image composed of component color images superposed without color deviations should be transferred onto a paper sheet.

FIG. 54 is a drawing showing an example of the detection of color registration marks according to a prior art. In FIG. 54, a processing called "color registration mark detection" is applied to the intermediate transfer belt 6 (also called the belt unit or paper conveyance belt) periodically or non-periodically before a color image is formed on the basis of arbitrary image information. In this detection processing, by the use of reflection-type photo-sensors (hereinafter also referred to as registration sensors) 12A or 12B, etc., the "7-shaped" color registration marks (marks made up of a horizontal straight line segment and an oblique straight line segment meeting together at a point with an acute angle, and hereinafter referred to also as color registration marks CR simply) are detected.

At this time, the light, having emitted from the photo-sensor 12A or the like, is intercepted by the color registration mark CR, for example, on the intermediate transfer belt 6. In this processing, the detection of the mark position (the edge or the center of gravity) of the registration mark CR is done in such a way that the light traveling after being reflected by the intermediate transfer belt 6 is detected. The edge detection data are recorded in a RAM or the like, and afterwards, on the basis of the record, the amounts of positional deviations for the component colors Y, M, C, and BK are calculated; the exposure timing at the exposure means for the respective colors are controlled in such a way as to superpose the toner images with these amounts of positional deviations reduced to zero.

FIG. 55 is a drawing showing an example of the waveform of a signal of a scratch obtained by the registration sensor 12A or the like. In FIG. 55, the abscissa represents time t, and the ordinate represents the signal level of a position detection signal S2 obtained by the registration sensor 12A or the like. The solid line in FIG. 55 shows the waveform of a signal representing the state of the color image formation surface of the intermediate transfer belt 6 before the formation of the color registration marks. Lb denotes the base correction level of the position detection signal S2, and Lth denotes a threshold voltage.

This waveform can be obtained by the detection of the color image formation surface by means of the registration sensor 12A or the like through one revolution of the intermediate transfer belt 6. Whether or not the interception of light by the color registration marks does occur in the detection processing is judged by whether or not a signal level lower than the threshold voltage Lth does exist. According to the signal example shown in FIG. 55, values of the position detection signal S2 coming lower than the threshold voltage Lth are detected; this is the case where the intermediate transfer belt 6 has scratches etc. to obstruct the color registration mark detection processing. It sometimes occurs that scratches are produced when the intermediate transfer belt 6 is rubbed by the drum 1 which is suddenly stopped due to a power failure during the operation of the image forming apparatus, or when the intermediate transfer belt 6 is taken out and inserted for maintenance operation.

Incidentally, according to a tandem-type color image forming apparatus based on a conventional method, there are problems as described below.

(1) In the color registration mark detection processing, owing to the change of the intermediate transfer belt 6 with the passage of time, for example, scratches on the belt surface, although they are different depending on the material of the belt, the reflected light quantity by the color toner layer is raised, which makes it difficult to secure sufficiently the signal difference between the toner surface and the substrate surface. In particular, if the image density of the color registration marks CR fluctuates, that is, if the density becomes lower, or if the density becomes too much higher, the reflected light quantity becomes higher; therefore, there is a possible risk that the color registration marks cannot be detected with a good reproducibility due to the density fluctuation.

(2) If scratches (permanent scratches) increase on the belt owing to the above-mentioned change of the intermediate transfer belt 6 with the passage of time, it occurs frequently the case where the sensors react to the scratches etc. on the belt, which makes it impossible to detect exactly the mark edge of the color registration marks (hereinafter referred to also as the mark images). In this connection, it can be thought of a method in which a black colored band is formed on the color image formation surface of the intermediate transfer belt 6 beforehand, and afterwards, registration marks of the respective colors are formed on this black surface, but this makes toner consumption larger.

(3) If scratches (permanent scratches) increase on the belt owing to the change of the intermediate transfer belt (hereinafter referred to also as the image transfer system) with the passage of time, in the color registration mark detection processing, it occurs frequently the case where the sensors react to the scratches etc. on the belt, which makes it impossible to detect exactly the mark edge of the color registration marks. In such a case, it is necessary to take trouble to form the color registration marks at positions of no belt scratches.

(4) In this connection, for a method of eliminating scratch data from position detection data containing belt scratches, it has been thought of a method in which registration marks are formed, afterwards, the periods of time from a reference timing to the line edges of each of the registration marks are memorized, this processing is repeated plural times, and the detection of all the registration marks is tested; then, only the places where the registration marks overlap one another are extracted. However, as regards this method, in order to eliminate belt scratches etc. which appear unexpectedly, the above-mentioned processing has to be repeated plural times every occasion, it takes a considerable time for the calculation of the color deviation amounts of one time.

SUMMARY OF THE INVENTION

Thus, this invention has solved the above-mentioned problems (1) and (2); its first object is to provide an image forming apparatus and an image forming method which makes it possible, even if the condition of use of the image transfer system changes with the passage of time, to detect exactly the proper position of mark images, and also makes it possible to adjust the forming positions of component color images with a good accuracy on the basis of position detection signals of high reliability.

Further, this invention has solved also the above-mentioned problems (3) and (4); its second object is to provide an image forming apparatus and an image forming method which makes it unnecessary, even if the condition of use of the image transfer system changes with the passage of time, to take trouble to form mark images avoiding belt scratches etc., and makes it possible, even if a plurality of scratches are produced on the image transfer system, to extract the positional data not influenced by the scratches for each of the component colors.

The above-mentioned first object can be accomplished by either one of the following aspects (1) to (6) of the present invention.

(1) A first image forming apparatus according to the present invention is an apparatus for forming a color image on the basis of arbitrary image information for the color image, comprising an image forming means equipped with image forming members for forming the color image through the superposition of component color images on the basis of the arbitrary image information, a first detection means for detecting the density of the color image formed by the image forming means, a second detection means for detecting the position of the color image formed by the image forming means, and a control device for controlling the image forming means on the basis of output of the first and second detection means, characterized in that the control means controls the second detection means so as to detect the density of patch images for the correction of color density, and corrects a binarization reference value to be used for detecting the positions of mark images for the registration of the component color images on the basis of a detected density signal of the patch images outputted from the second detection means.

By the first image forming apparatus according to the present invention, in the case where a color image is formed by image forming means through the superposition of the component color images on the basis of arbitrary image information, for example, by an image forming unit to make up the image forming means, a component color image is formed on an image transfer means. The density of this component color image formed on this image transfer means is detected by a first detection means. Further, the position of the component color image formed on the image transfer means is detected by a second detection means. Output signals from the first and second detection means are inputted to a control device, and on the basis of these output signals, the image transfer means or the image forming units are controlled.

With this taken as a prior condition, the control device detects the density of patch images for the correction of color density by the second detection means, and corrects a binarization reference value to be used for detecting the positions of mark images for the registration of the component color images on the basis of a detected density signal of the patch image outputted from the second detection means.

Accordingly, it is possible to correct the binarization reference value for detecting positions of the registration mark images in such a way as to adapt it to the state of use of the image transfer means or image forming units in accordance with the condition of use. Owing to this, even if the condition of use of the image transfer means changes with the passage of time due to the change of the reflected light quantity at the image transfer means, the reduction of the emission quantity of the sensors, etc., the proper positions of the registration mark images can be detected exactly; therefore, the forming positions of component color images can be adjusted at a high accuracy on the basis of a position detection signal of high reliability.

(2) A first image forming method according to the present invention is an image forming method for forming a color image by means of an image forming system through the superposition of the component color images on the basis of arbitrary image information, characterized in that in the case where a color image is formed by the image forming system, the density of the color image formed by the image forming system is detected by means of a first detection system, the position of the color image is detected by means of a second detection system, and the image forming system is controlled on the basis of the output signals from the first and second detection systems, patch images for correcting color density is previously formed by the image forming system, the density of the patch images formed by the image forming system is detected by the second detection system, and on the basis of the density detection signal of the patch image outputted from the second detection system, a binarization reference value to be used for detecting the positions of mark images for the registration of component color images is corrected.

By the first image forming method according to the present invention, it is possible to make a correction such that a binarization reference value for detecting the positions of mark images is adapted, for example, to the state of use of the image transfer system or the image forming system in accordance with the condition of use.

Accordingly, even if the condition of use changes with the passage of time due to the change of the reflected light quantity at the image transfer system or the image forming system, the reduction of the emission quantity of the sensors, etc., the proper positions of mark images can be detected exactly; therefore, the forming positions of component color images can be adjusted at a high accuracy on the basis of a position detection signal of high reliability. Owing to this, component color images can be superposed exactly in the image forming system or in the image transfer system; therefore, a color image can be transferred onto a desired transfer paper sheet at a high accuracy.

(3) A second image forming apparatus according to the present invention is an apparatus for forming a color image on the basis of arbitrary image information for a color image, comprising an image forming means equipped with an image forming member for forming the color image through the superposition of component color images on the basis of the arbitrary image information, a detection means for detecting the position of the color image formed by the image forming means, and a control device for controlling the image forming means on the basis of the output of this detection means, characterized in that the control device forms beforehand at least reversed mark images which are the reversed ones of mark images for the registration of component color images formed by the image forming means, and controls the image forming means in such a way as to adjust the forming positions of component color images on the basis of the position detection of mark images defined by the void portions (portions not filled with color toner particles) of the reversed mark images formed by the image forming means.

By the second image forming apparatus according to the present invention, in order that a color image may be formed through the superposition of component color images on the basis of arbitrary image information, for example, a color image is formed on an image transfer means by an image forming unit making up an image forming means. The position of the color image formed on this image transfer means is detected by a detection means. In the control device, it is practiced that the image transfer means or the image forming unit is controlled on the basis of the output of the detection means.

With this taken as a prior condition, the control device previously forms reversed mark images on the image transfer means, and afterwards, it controls the image forming unit in such a way as to adjust the forming positions of component color images on the basis of the positions of these mark images defined by the void portions of the reversed mark images formed on the image transfer means.

Accordingly, because the area other than the void portions defining the mark images can be covered by the reversed mark images, even if scratches etc. are produced on the image transfer means due to a change with the passage of time caused by maintenance operations or wear of parts, the proper positions of the mark images can be exactly detected. Owing to this, the forming positions of component color images can be adjusted at a high accuracy on the basis of a high-reliability position detection signal with no noise signal due to scratches or the like superposed.

(4) A second image forming method according to the present invention is an image forming method for forming a color image through the superposition of component color images on the basis of arbitrary image information, characterized in that reversed mark image information for reversing mark images for the registration of component color images is prepared beforehand, reversed mark images are formed by an image forming system on the basis of this reversed mark image information, the position of the mark images defined by the void portions of the reversed mark images formed by the image forming system is detected, and the forming positions of component color images are adjusted on the basis of the positions of the mark images defined by the void portions.

By the second image forming method according to the present invention, because reversed mark images defined as mark images by the void portions can be formed on an image transfer system or image forming member with a good reproducibility, scratches etc. which are produced on the image transfer system at the time of a maintenance operation or the like against the proper object can be covered by the reversed mark images.

Further, even if scratches etc. are produced on an image transfer system or image forming member, the proper positions of mark images can be detected; therefore, the forming positions of component color images can be adjusted at a high accuracy on the basis of a high-reliability position detection signal with no noise signal due to scratches or the like superposed. Accordingly, because component color images can be superposed exactly on the image transfer system, a color image can be transferred onto a desired transfer paper sheet at a high accuracy.

(5) A third image forming apparatus is an apparatus for forming a color image on the basis of arbitrary image information for the color image, comprising an image forming means equipped with an image forming body for forming the color image through the superposition of component color images on the basis of the arbitrary image information, a detection means for detecting the position of a color image formed by the image forming means, and a control device for controlling the image forming means on the basis of the output of this detection means, characterized in that the control device forms beforehand, at least, in accordance with the state of use, mark images or reversed mark images which are the reversed ones of mark images for the registration of component color images formed by the image forming means according to a condition of use of the image forming means, and controls the image forming means in such a way as to adjust the forming positions of component color images on the basis of the position detection of mark images or those defined by the void portions of the reversed mark images formed by the image forming means.

By the third image forming apparatus according to the present invention, in order that a color image may be formed through the superposition of component color images on the basis of arbitrary image information, for example, the color image is formed on an image transfer means by an image forming unit making up an image forming means. The position of the color image formed on image transfer means is detected by a detection means for detecting a position. In a control device, the image transfer means or the image forming unit is controlled on the basis of the output of the detection means.

With this taken as a prior condition, the control device forms mark images or reversed mark images which are the reversed ones of the mark images on the image transfer means in accordance with the state of use of the image transfer means, and controls the image forming unit in such a way as to adjust the forming positions of component color images on the basis of the position detection of mark images or those defined by the void portions of the reversed mark images formed on the image transfer means.

Accordingly, for example, in the case where an image transfer means, an image forming member, or the like is used for the first time, or in the case where an image transfer means has been just replaced with a new one, the forming positions of component color images can be adjusted on the basis of the position detection of mark images. In the case where scratches etc. are produced on the image transfer means due to a change with the passage of time caused by maintenance operations, wear of parts, etc., scratches etc. can be covered by reversed mark images; therefore, the proper positions of mark images can be exactly detected.

Owing to this, the forming positions of the component color images can be adjusted at a high accuracy on the basis of a high-reliability position detection signal with no noise signal caused by scratches etc. superposed.

(6) A third image forming method according to the present invention is an image forming method for forming a color image through the superposition of component color images by an image forming system on the basis of arbitrary image information, characterized by comprising the steps of previously preparing mark image information for forming mark images for the registration of component color images or reversed mark image information for forming reversed mark images which are the reversed ones of the mark images, afterwards, detecting the surface state of the color image formation area of the image forming system, forming mark images based on the mark image information or reversed mark images based on the reversed mark image information by an image transfer system in accordance with the surface state of the color image formation area, and adjusting the forming positions of component color images on the basis of the position detection of mark images or those defined by the void portions of the reversed mark images.

By the third image forming method according to the present invention, for example, in the case where an image transfer means, an image forming member, or the like is used for the first time, or in the case where the image transfer means has been just replaced with a new one, the forming positions of the component color images can be adjusted on the basis of position detection of the mark images. In the case where scratches etc. are produced on the image transfer means due to a change with the passage of time caused by maintenance operations, wear of parts, etc., scratches etc. can be covered by reversed mark images; therefore, the proper positions of mark images can be exactly detected.

Accordingly, the forming positions of the component color images can be adjusted at a high accuracy on the basis of a high-reliability position detection signal with no noise signal caused by scratches etc. superposed. Owing to this, because component color images can be exactly superposed on an image transfer means, a color image can be transferred onto a desired transfer paper sheet at a high accuracy.

The above-mentioned second object can be accomplished by either one of the following aspects (7) and (8) of the present invention.

(7) A fourth image forming apparatus according to the present invention is an apparatus for forming a color image through the superposition of component color images on the basis of arbitrary image information, comprising an image transfer means, image forming units for forming plural mark images for each of the component colors for the registration of component color images on the image transfer means, detection means for detecting the positions of the mark images formed by the image forming units, and a control device for controlling the image transfer means and/or image forming units on the basis of the output of the detection means, characterized in that the control device obtains position data representing the forming position of each of the mark images with respect to a reference value arbitrarily determined concerning the mark images for the registration of the component color images formed on the image transfer means, divides the position data of the mark images of each of the component colors into groups for their respective unit reference ranges, concerning the position data in the respective unit reference ranges divided in the above, makes an operation processing for converting the position data divided for each unit reference range into those based on respective reference values representing the front edge of the unit reference ranges concerned, extracts the position data representing ranges common to the mutually overlapping ranges each of which is represented by a couple of position data corresponding to the rising and falling edges of a passage timing pulse subjected to the operation processing as read position data of the mark image of the color concerned for the registration of component color images, and calculates the amounts of positional deviations of the component color images from one another on the basis of the position data extracted.

By the fourth image forming apparatus according to the present invention, in order that a color image may be formed through the superposition of component color images on the basis of arbitrary image information, plural mark images of the respective colors for the registration of component color images are formed by means of image forming units on the image transfer means. The positions of the mark images formed on the image transfer means are detected by the detection means. The control device controls the image transfer means and/or the image forming units on the basis of the output of the detection means.

With this taken as a prior condition, the control device obtains position data representing the forming position of each of the mark images with respect to an arbitrarily determined reference value concerning the mark images for the registration of component color images formed on the image transfer means, divides the position data of the mark images of the respective colors into groups for their respective unit reference ranges, concerning the position data in the respective unit reference ranges divided in the above, makes an operation processing for converting them into those based on respective reference values representing the front edge of the unit reference ranges concerned, extracts the position data representing ranges common to the mutually overlapping ranges each of which is represented by a couple of position data corresponding to the rising and falling edges of a passage timing pulse subjected to the operation processing as read positional data of the mark image of the color concerned for the registration of component color images, and calculates the amounts of positional deviation of the component color images from one another on the basis of the position data extracted in the above.

Accordingly, it is possible to eliminate the position data representing a range not overlapped by any other range which is represented by a couple of position data corresponding to the rising and falling edges of a passage timing pulse as position data concerning scratches. Owing to this, even if position data containing those concerning scratches caused by the use of the image transfer means during the passage of a period of time, position data which are not influenced by scratches can be extracted for each of the component colors. For this reason, it is unnecessary to take trouble to avoid scratches for the formation of mark images, and further, even if a plurality of scratches are produced on the image transfer means, position data which are not influenced by scratches can be extracted for each of the component colors. Owing to this, the forming positions of component color images can be adjusted at a high accuracy on the basis of high-reliability position data not influenced by a noise signal caused by scratches etc.

Furthermore, for position data of a plurality of mark images formed on the image transfer means, the removal processing of scratches has only to be practiced one time; therefore, it is unnecessary to practice the mark image formation sequence plural times, which makes it possible, compared to a conventional method, to shorten the calculation time for the amounts of positional deviations.

(8) A fourth image forming method according to the present invention is an image forming method for forming a color image through the superposition of component color images on the basis of arbitrary image information, characterized by comprising the steps of forming plural mark images of the respective colors for the registration of component color images on an image transfer system with an image formation region of one mark image defined as a unit reference range, while previously determining a reference value concerning each of the mark images for the registration of component color images formed on the image transfer system, obtaining, concerning the mark images for the registration of component color images formed on the image transfer system, position data representing the respective forming positions of the mark images with respect to the reference values, dividing the position data of the mark images of the respective colors obtained in the above for each unit reference range, concerning the position data divided for each unit reference range, carrying out an operation processing for converting them into those based on respective reference values representing the front edge of the unit reference ranges concerned, extracting the position data representing ranges common to the mutually overlapping ranges each of which is represented by a couple of position data corresponding to the rising and falling edges of a passage timing pulse subjected to the above-mentioned operation processing as position data of the respective colors for the registration of component color images, and calculating the amounts of deviations of the component color images from one another on the basis of the position data extracted in the above.

By the fourth image forming method according to the present invention, in order that a color image may be formed through the superposition of component color images on the basis of arbitrary image information, the position data representing a range not overlapped by any other range each of which is represented by a couple of position data corresponding to the rising and falling edges of a passage timing pulse can be eliminated as position data concerning scratches. Accordingly, even in the case where position data containing those concerning scratches caused by the use of the image transfer system during the passage of a period of time are obtained, it is possible to extract position data not influenced by scratches for each of the colors.

For this reason, it is unnecessary to take trouble to avoid scratches for the formation of mark images, and further, even if a plurality of scratches are produced on the image transfer system, positional data which are not influenced by scratches can be extracted for each of the colors. Owing to this, the position of color image formation can be adjusted at a high accuracy on the basis of high-reliability position data not influenced by a noise signal caused by scratches etc.

Furthermore, for position data of a plurality of series of mark images formed on the image transfer system, the removal processing of scratches has only to be practiced one time; therefore, it is unnecessary to practice the mark image formation sequence plural times, which makes it possible, compared to a conventional method, to shorten the calculation time for the amounts of positional deviations. Owing to this, a color image can be transferred onto a desired transfer paper sheet at a high accuracy, because the component color images can be exactly superposed on the image transfer system.

BRIEF DESCRIPTION OF THE DRAWINGS

FIG. 6(A)-1 to FIG. 6(A)-4 are drawings showing patch marks Pm and FIG. 6B is a drawing showing an example of the waveform representing an example of the density detection of the patch marks by the registration sensor 12A or the like;

FIG. 7(A) and FIG. 7(B) are drawings showing examples of the waveform of a density detection signal S2' by the registration sensor 12A or the like;

FIG. 10(A) and FIG. 10(B) showing an example of binarization of a position detection signal S2 by the registration sensor 12A or the like;

FIG. 22 is a waveform drawing showing an example of a signal in the case of a base level correction by the registration sensor 12A or the like;

FIG. 47(A) to FIG. 47(C) are drawings showing an example of the passage time data DT and the position data DP concerning the forming positions of the color registration marks of the first color to the fourth color (Y, M, C, and BK);

FIG. 55 is a waveform drawing showing an example of the signal of a scratch obtained by the registration sensor 12A or the like.

DETAILED DESCRIPTION OF THE PREFERRED EMBODIMENT

(1) Embodiment 1

Figure 1:
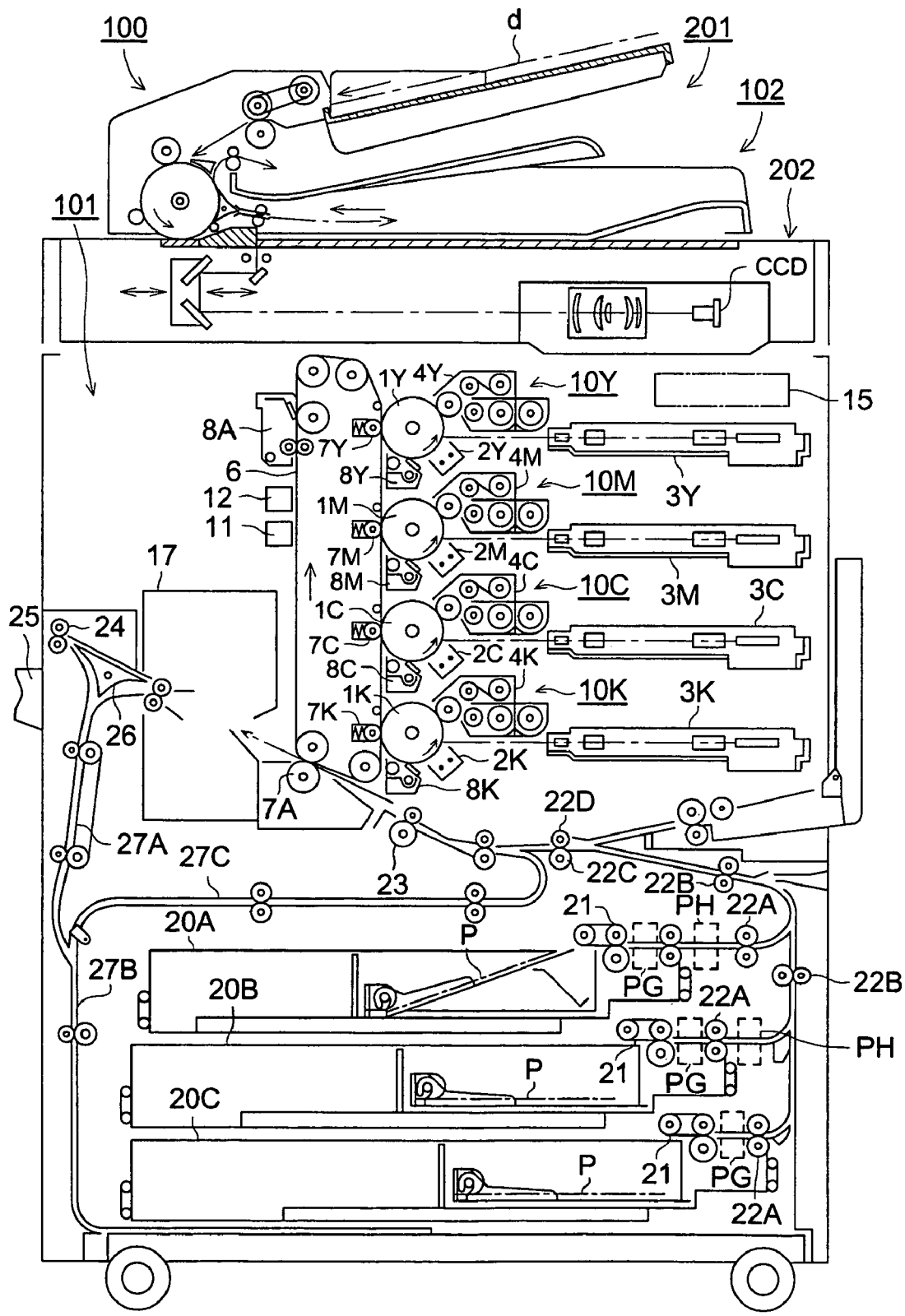
FIG. 1 is a conceptual drawing showing an example of the structure of a color image forming apparatus 100 as the embodiment 1 and the embodiment 7 of this invention.

FIG. 1 is a conceptual drawing showing an example of the structure of a color image forming apparatus 100 as an example of the embodiment of this invention.

In this example of the embodiment, it is put into practice that there is provided a control device for controlling an image transfer means or a image forming unit on the basis of output signals of a density detection system and a position detection system for a color image, wherein the density of patch images for color density correction is detected by the position detection system for a color image, and a binarization reference value (also called a control reference value) for the detection of the positions of mark images is corrected on the basis of the density detection signal of the patch images outputted from said position detection system. Thus, even if the condition of use of the image transfer means has changed with the passage of time due to the change of reflected light quantity at the image transfer means, the reduction of the emission quantity of sensors, etc., the proper positions of the mark images can be exactly detected, and on the basis of a high-reliability position detection signal, the forming positions of component color images can be adjusted at a high accuracy.

The color image forming apparatus 100 shown in FIG. 1 has an example of the structure of the first to third image forming apparatus according to the aspects of the invention (1) to (3), and is an apparatus for forming a color image on an image transfer system through the superposition of component color images on the basis of arbitrary image information.

In FIG. 1, the color image forming apparatus 100 is made up of an image forming apparatus mainframe 101 and an image reading apparatus 102. On the image forming apparatus mainframe 101, the image reading apparatus 102 made up of an automatic document feeder 201 and a document image scanning exposure device 202 is mounted. A document sheet d placed on the document table of the automatic document feeder 201 is conveyed by a conveyance means, and by means of the optical system of the document image scanning exposure device 202, an image on one or both sides of the document is subjected to scanning exposure, and is read by a line image sensor CCD.

The analog signals obtained by the reading of the line image sensor CCD are subjected to an analog processing, A/D conversion, a shading correction processing, an image compression processing, etc. in an image processing section (not shown in the drawing), to become image information. After that, the image information is transmitted to image writing sections (exposure means) 3Y, 3M, 3C, and 3K, which make up the respective image forming units.

The automatic document feeder 201 is equipped with an automatic double-sided document conveyance means. This automatic document feeder 201 reads the content of a multi-page document d fed from on the document table by a single continuous run, and the content of the document is accumulated in a storage means (an electronic RDH function). This electronic RDH function is conveniently used when the content of a multi-page document is copied by the copying function, or when a multi-page document d is transmitted by the facsimile function, for example.

The image forming apparatus mainframe 101 is what is called a tandem-type color image forming apparatus, and is composed of a plurality of image forming units (image forming system) 10Y, 10M, 10C, and 10K, an endless intermediate transfer belt 6 as an intermediate transfer member which is an example of the image transfer means (the image transfer system), a paper feed-conveyance means containing a re-feed mechanism (an ADU mechanism), and a fixing device 17 for fixing a toner image.

The image forming unit 10Y for forming an image of the color yellow (Y) comprises a photoreceptor drum 1Y as an image forming member, and a charging means 2Y, an exposure means 3Y, a developing device 4Y and a cleaning means 8Y for the image forming member for the color Y arranged at the circumference of the photoreceptor drum 1Y. The image forming unit 10M forforming an image of the color magenta (M) comprises a photoreceptor drum 1M as an image forming member, and a charging means 2M, an exposure means 3M, a developing device 4M, and a cleaning means BM for the image forming member for the color M.

The image forming unit 10C for forming an image of the color cyan (C) comprises a photoreceptor drum 1C as an image forming member, and a charging means 2C, an exposure means 3C, a developing device 4C, and a cleaning means 8C for the image forming member for the color C. The image forming unit 10K for forming an image of the color black (BK) comprises a photoreceptor drum 1K as an image forming member, and a charging means 2K, an exposure means 3K, a developing device 4K, and a cleaning means 8K for the image forming member for the color BK.

The combinations of the charging means 2Y and the exposure means 3Y, the charging means 2M and the exposure means 3M, the charging means 2C and the exposure means 3C, and the charging means 2K and the exposure means 3K make up latent image forming means respectively. As regards the development by means of the developing devices 4Y, 4M, 4C, or 4K, it is practiced a reverse development process with a developing bias voltage composed of a direct-current voltage having the polarity the same as that of the toners used (negative polarity in this example of the embodiment) and an alternate-current voltage superposed applied. The intermediate transfer belt 6 is entrained about a plurality of rollers and is supported in a way to be able to revolve.

The outline of an image forming process will be explained in the following. Images of the respective colors formed by the image forming units 10Y, 10M, 10C, and 19K are transferred successively onto the revolving intermediate transfer belt 6 by the primary transfer rollers 7Y, 7M, 7C, and 7K having a primary transfer bias voltage (not shown in the drawing) of the polarity reverse to the toners used (positive polarity in this example of the embodiment) applied respectively (primary transfer), and a synthesized color image (color toner image) is formed. The color image is transferred from the intermediate transfer belt 6 to a paper sheet P.

A paper sheet P contained in a paper feed cassette 20A, 20B, or 20C is fed by a conveying-out roller 21 and feed roller 22A which are provided in each of the paper feed cassette 20A, 20B, and 20C, and is conveyed through conveyance rollers 22B, 22C, and 22D, a registration roller 23, etc. to a secondary transfer roller 7A; thus, on one side (front side) of the paper sheet P, the color image is transferred (secondary transfer).

The paper sheet P, having a color image transferred on it, is subjected to the fixing process by the fixing device 17, and is gripped by a pair of ejection rollers 17, to be placed on an output tray 25 outside the machine. The residual toner particles remaining on the circumferential surface of the photoreceptor drums 1Y, 1M, 1C, and 1K are removed by the image forming member cleaning means 8Y, 8M, 8C, and 8K, and the next image formation cycle will start.

When another image is to be formed on the other side, the paper sheet P, having been discharged out of the fixing device 17, diverges from the sheet ejection path by a bifurcating means 26, passes through a circulating path 27A provided downward, is inverted upside down by an inversion conveyance path, which is the re-feed mechanism (ADU mechanism), passes the re-feed conveyance section 27C, and comes back to the former path at the downstream side of the conveyance roller 22D.

The paper sheet P, having be subjected to the inversion conveyance, passes through the registration roller 23, and is again conveyed to the secondary transfer roller 7A, by which another color image (a color toner image) is transferred on the other side (rear side) of the paper sheet P. The paper sheet P, having color images transferred on both the sides, are gripped by the ejection rollers to be placed on the output tray 25 outside the machine.

On the other hand, after the color image is transferred onto a paper sheet P by the secondary transfer roller 7A, the intermediate transfer belt 6, having the paper sheet P detached off from it by the curvature, is cleaned through removing the residual toner particles by the cleaning means for an intermediate transfer belt 8A. In the case of such image formations, it is desirable that for the paper sheet P, a thin paper sheet of the order 52.3 g/m$^2$ to 63.9 g/m$^2$, a normal paper sheet of the order 64.0 g/m$^2$ to 81.4 g/m$^2$, a thick paper sheet of the order 83.0 g/m$^2$ to 130.0 g/m$^2$, or a super thick paper sheet of the order 150.0 g/m$^2$ is used, the process speed is made to fall within a range of 80 mm/s to 350 mm/s, and for the environment condition, the temperature is set to fall within a range of 5° C. to 35° C., and the humidity is set to fall within a range of 15% to 85%. As regards the thickness of the paper sheet, one having a thickness falling within a range of 0.05 mm to 0.15 mm is used.

At the left of the intermediate transfer belt 6 in the upstream side of the above-mentioned cleaning means 8A, there is provided a sensor for detecting toner image density as an example of the first detection means (hereinafter referred to as a toner image density sensor 11 simply), which detects the density of a toner image formed on the intermediate transfer belt 6, to generate a density detection signal S1.

Located by this toner image density sensor, there is provided a sensor for detecting the positional deviation of a toner image as an example of the second detection means (hereinafter referred to as a registration sensor 12 simply), which detects the position of a mark image formed on the intermediate transfer belt 6 (hereinafter referred to as a color registration mark CR) to generate a position detection signal S2. In the image forming apparatus mainframe 101, there is provided a control device 15, which practices color registration mark detection processing on the basis of a density detection signal S1 and a position detection signal S2.

The color registration mark processing means the processing such that color registration marks CR for the registration of component color images are formed on the intermediate transfer belt 6, and the positions (the edge, the gravity center, or the like) of these color registration marks formed on the intermediate transfer belt 6 are detected by the registration sensor 12. This processing is practiced for the purpose of adjusting the forming positions of component color images on the basis of the positions of the color registration marks CR. In this example, even if the condition of use of the intermediate transfer belt 6 changes with the passage of time, the proper positions of the color registration marks CR can be made to be detected exactly, and it is made possible to adjust the forming positions of component color images at a high accuracy on the basis of a high-reliability position detection signal S2.

Figure 2:
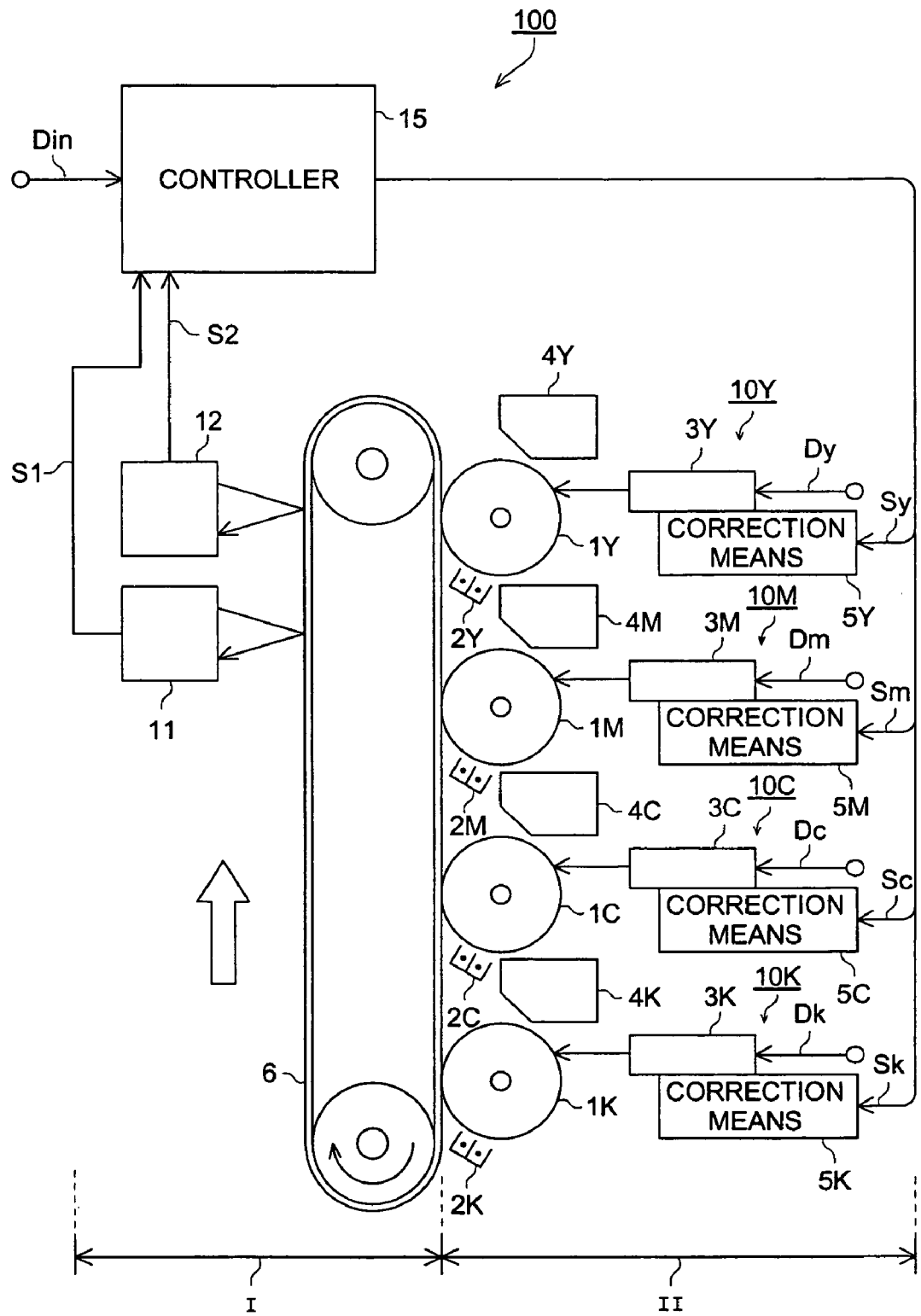
FIG. 2 is a block drawing showing an example of the structure of the image transfer system and the image forming system of a color image forming apparatus 100 as the embodiment 1 and the embodiment 7 of this invention.

FIG. 2 is a block drawing showing an example of the structure of the image transfer system and the image forming system of the color image forming apparatus 100 as the embodiment 1 of the present invention. FIG. 2 is an enlarged drawing of the intermediate transfer belt 6 and the image forming units 10Y, 10M, 10C, and 10K of the color image forming apparatus 100 of FIG. 1 shown as an image transfer system I and an image forming system II, respectively. In FIG. 2, the color image forming apparatus 100 has the control device 15. The toner image density sensor 11 is connected to the control device 15, detects the density of a toner image formed on the intermediate transfer belt 6, and outputs a density detection signal S1 to the control device 15.

To the control device 15, in addition to the toner image density sensor 11, the registration sensors 12 are connected; each of them detects the position of a toner image formed on the intermediate transfer belt 6, and outputs a position detection signal S2 to the control device 15. The control device 15 is given a role to control the image forming units 10Y, 10M, 10C, and 10K on the basis of a density detection signal Si obtained from the toner image density sensor 11 and position detection signals S2 obtained from the registration sensors 12. In this example, corrections concerning the image forming units 10Y, 10M, 10C, and 10K, etc., the adjustment of the write start position in the main scanning and sub-scanning and the position adjustment in a writing area (skew adjustment), the correction of the main scanning write clock signal (lateral magnification adjustment partial lateral magnification adjustment), etc. are made (refer to FIG. 3).

Although it depends on the contents of the control, it is also appropriate to adopt a method such that one or all of the three image forming units 10Y, 10M, and 10C are controlled with the image forming unit 10K taken as the reference; this can reduce the burden of the control device 15. Of course, it is also possible to incorporate the intermediate transfer belt 6 into the object of the control. In that case, it is appropriate to provide a zigzag run correction mechanism (not shown in the drawing) and correct a zigzag run of the intermediate transfer belt 6 for the adjustment of color deviations.

To the control device 15, the image forming units 10Y, 10M, 10C, and 10K are connected; the operation is as follows: By the image forming unit 10Y, a toner image of the color Y is formed on the intermediate transfer belt 6 on the basis of image information for the Y-color Dy, which is a component of arbitrary image information Din, by the image forming unit 10M, a toner image of the color M is formed on the intermediate transfer belt 6 on the basis of image information for the M-color Dm, by the image forming unit 10C, a toner image of the color C is formed on the intermediate transfer belt 6 on the basis of image information for the color Dc, and by the image forming unit 10K, a toner image of the color BK is formed on the intermediate transfer belt 6 on the basis of image information for the BK-color Dk.

In this example, a correction means 5Y is attached to the image writing section (exposure means) for the Y-color 3Y, and operates to adjust the forming position of an image of the color Y on the basis of a writing position correction signal for the Y-color Sy from the control device 15. In the same way, a correction means 5M is attached to the image writing section for the M-color 3M, and operates to adjust the forming position of an image of the color M on the basis of a writing position correction signal for the M-color Sm from the control device 15.

A correction means 5C is attached to the image writing section for the C-color 3C, and operates to adjust the forming position of an image of the color C on the basis of a write position correction signal for the C-color Sc from the control device 15. A correction means 5K is attached to the image writing section for the BK-color 3K, and operates to adjust the forming position of an image of the color BK on the basis of a write position correction signal for the BK-color Sk from the control device 15. In this example, as regards the calculation of the amounts of color deviations, color registration marks CR for the color BK are taken as the reference. This is done for the purpose of adjusting the writing positions of component color images of the colors Y, M, and C in such a way as to make them agree with the position of a component image of the color BK.

For example, as regards the writing position adjustment for the color Y, the writing position of the color registration mark CR of the color BK and the writing position of the color registration mark CR of the color Y are detected, and the correction value is calculated from the amount of deviation to be obtained by the conversion operation of the writing position of the color registration mark CR for the color Y into the writing position of the color registration mark CR of the color BK. In the same way, also as regards the writing position adjustment for the color M or C, the amount of the deviation of the writing position of the color registration mark of the color M or C from the writing position of the color registration mark of the color BK is detected, and from this amount of deviation, each correction value is calculated. After that, the image forming units 10Y, 10M, and 10C for the colors Y, M, and C except the image forming unit 10K for the color BK are subjected to the adjustment.

For this purpose, in the image forming unit 10K for the color BK, by the output of toner images of the color BK only onto the intermediate transfer belt 6, a normal writing position adjustment in the main scanning and sub-scanning and a lateral magnification adjustment, a partial lateral magnification adjustment, a skew adjustment, etc. in the image writing section 3K are made. This is done for the purpose of taking the color BK as the reference in the adjustment. After that, it is done to move to the color registration adjustment using a method of this invention, in which the registration adjustment for making the writing positions of images of the colors Y, M, and C agree with the writing position of an image of the color BK is practiced.

Further, by the control device 15, the image forming units 10Y, 10M, and 10C are controlled to form patch marks for color density correction as an example of the aforesaid patch images on the intermediate transfer belt 6. The density of the patch marks formed on the intermediate transfer belt 6 is detected by the registration sensor 12. After that, the densities of color registration marks CR for the registration of component color images are adjusted on the basis of the densities of the patch marks, and the image forming units 10Y, 10M, 10C, and 10K are controlled to form color registration marks CR having their density adjusted in the above-mentioned way on the intermediate transfer belt 6 by the control device 15.

The positions of color registration marks formed on the intermediate transfer belt 6 are detected by the registration sensors 12. The control device 15 becomes able to correct in real time the threshold voltage Lth in the detection of the positions of color registration marks CR on the basis of a density detection signal S2' of patch marks outputted from the registration sensor 12. The image forming units 10Y, 10M, 10C, and 10K are subjected to a control to adjust the forming positions of respective component color images on the basis of the above-mentioned positions of color registration marks CR.

In this example, the minimum value of a density detection signal S2' in the non-formation area of the patch marks and the maximum value of it in the formation area of said patch marks outputted from the registration sensor 12 are detected, and the average value is calculated on the basis of these minimum value and maximum value.

That is, in the case where the output value due to the reflection light from a non-formation area of the patch marks on the intermediate transfer belt (base) 6 and the output value due to the reflection light from a formation area of the patch marks are close to each other, the condition for determining the threshold voltage of binarization becomes worst.

For that reason, it is put into practice that, using values of the worst condition of it, the average value (the median) is derived, and the threshold voltage of binarization is determined. In this example, it is put into practice that the above-mentioned average value is taken as the binarization reference value for the detection by the registration sensors 12, and on the basis of this binarization reference value, the passage timing of a color registration mark is detected. It is also appropriate to make the binarization reference value for the detection by the registration sensors 12 a value in the neighborhood of the average value.

Of course, the process is not limited to this, and also it is appropriate to practice the following processing in one and the same sequence by the control device 15. That is, patch marks for the correction of color density are formed on the intermediate transfer belt 6, the density of the patch marks formed on the intermediate transfer belt 6 are detected by the toner image density sensor 11, and a density correction processing for adjusting the density of mark images is practiced, while the density of the patch marks formed on the intermediate transfer belt 6 is detected successively by the registration sensor 12. By the subsequent detection of the patch marks formed at the time of detecting the patch marks by the registration sensor 12, the density of a color registration mark CR which makes it possible to secure the most reliable signal level can be determined.

After that, it is done that the density of color registration marks for the registration of component color images is adjusted on the basis of the density of the patch marks, color registration marks CR having their density adjusted are formed on the intermediate transfer belt 6, the positions of the color registration marks formed on the intermediate transfer belt 6 are detected by the registration sensor 12, and a registration adjustment processing for adjusting the forming positions of component color images on the basis of the positions of the color registration marks CR.

Figure 3:
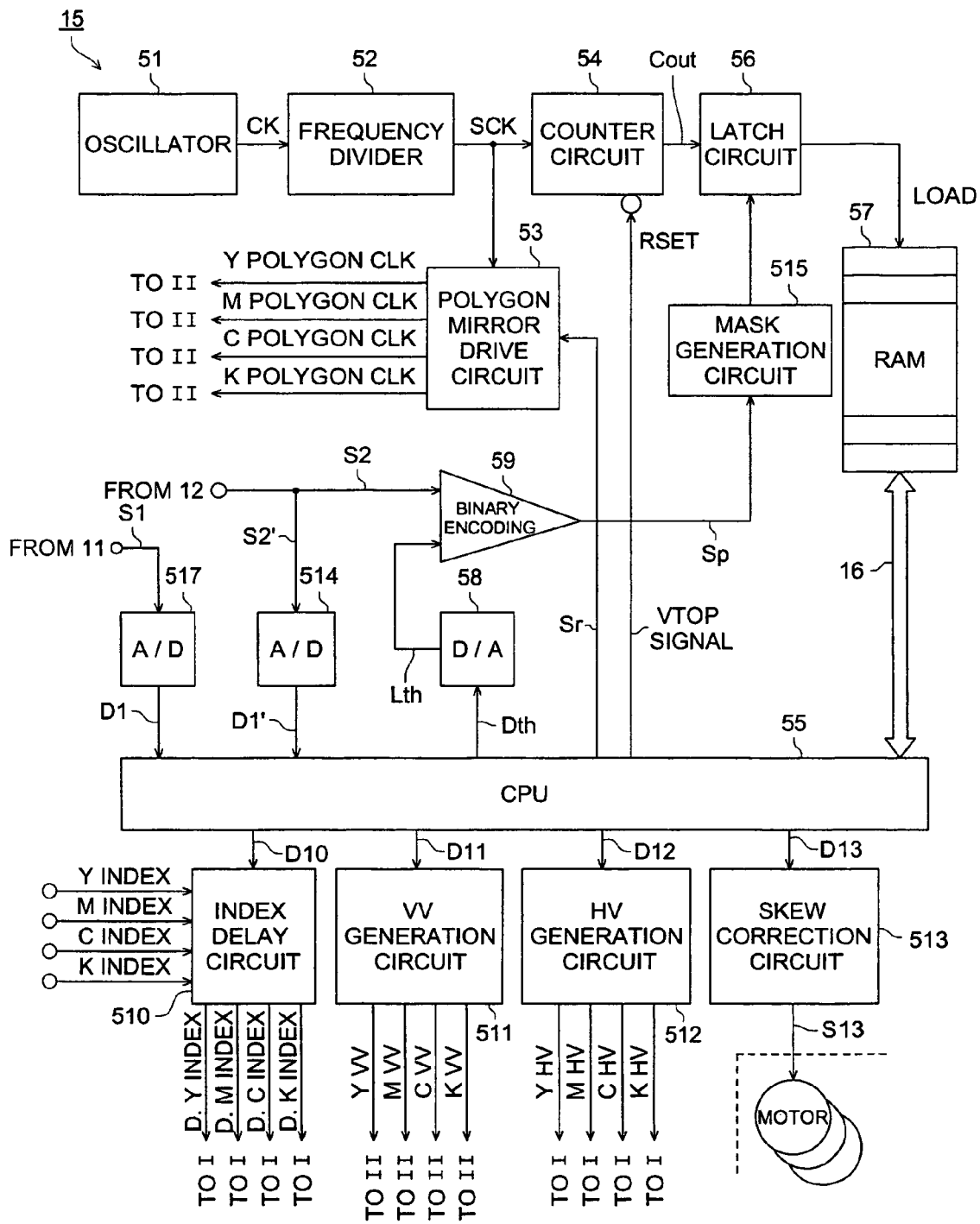
FIG. 3 is a block diagram showing an example of the internal structure of the positional deviation control system of a control device 15.

FIG. 3 is a block drawing showing an example of the internal structure of the positional deviation control system of the control device 15. The control device 15 shown in FIG. 3 comprises an oscillator 51, a frequency divider 52, a polygonal mirror driving circuit 53, a counter circuit 54, a CPU (central processing unit) 55, a latch circuit 56, a RAM 57, a digital/analog (D/A) converter 58, a comparator for binarization 59, an index delay circuit 510, a VV generating circuit 511, an HV generating circuit 512, a skew correction circuit 513, an analog/digital (A/D) converter 514, a mask generating circuit 515, etc.

The oscillator 51 generates a clock signal CK of the basic frequency. The frequency divider 52 is connected to the oscillator 51, and divides the frequency of a clock signal CK to generate a system clock signal SCK of a specified frequency.

The polygonal mirror driving circuit 53 and the counter circuit 54 are connected to the frequency divider 52. In the polygonal mirror driving circuit 53, on the basis of a rotation phase setting signal Sr from the CPU 55, a polygonal mirror drive clock signal for the color Y (hereinafter referred to as a Y polygon CLK), a polygonal mirror drive clock signal for the color M (hereinafter referred to as an M polygon CLK), a polygonal mirror drive clock signal for the color C (hereinafter referred to as a C polygon CLK), and a polygonal mirror drive clock signal for the color BK (hereinafter referred to as a BK polygon CLK) are generated from a system clock signal SCK. A Y polygon CLK is outputted to the image writing section 3Y, an M polygon CLK is outputted to the image writing section 3M, a C polygon CLK is outputted to the image writing section 3C, and a BK polygon CLK is outputted to the image writing section 3K.

In the counter circuit 54, a system clock signal SCK is counted to generate a latch signal SL with an image top signal (hereinafter referred to as a VTOP signal) received from the CPU 55 as a reset signal. A VTOP signal becomes the reference in detecting the writing position for the color BK. A latch signal SL becomes a signal showing the writing position for the color Y, M, or C. For example, the writing position for the color BK is recognized by counting a system clock signal SCK with the rise time of the VTOP signal taken as the reference.

The latch circuit 56 is connected to the counter circuit 54, and operates to latch a latch signal SL on the basis of a passage timing pulse signal Sp after masking. The RAM 57 is connected to the latch circuit 56, which operates to load the RAM 57. The RAM 57 is connected to the CPU through a data bus 16.

On the other hand, the registration sensors 12 shown in FIG. 2 are connected to the comparator 59. Further, the D/A converter 58 is connected to the comparator 59. The D/A converter 58 makes a digital/analog conversion of a threshold setting data Dth from the CPU 55 to output a threshold voltage (binarization reference value) Lth. In the comparator 59, a position detection signal S2 from the registration sensor 12 (an analog signal) is binarized on the basis of the threshold voltage Lth. The position detection signal after binarization becomes a passage timing pulse signal Sp. In this example, the most suitable threshold voltage Lth is obtained by the correction using Dth calculated by the CPU on the basis of an analog density detection signal S2' from the registration sensor 12 or a density detection signal S1 (an analog signal) in accordance with the condition of use.

A mask generating circuit 515 is connected to the comparator 59, and operates to mask the portion of a passage timing pulse signal Sp except mark images. The latch circuit is connected to the mask generating circuit 515, and operates to control a latch signal SL on the basis of a passage timing pulse signal Sp whose portion other than mark images has been masked.

Further, the registration sensor 12 is connected to the A/D converter 514, where a density detection signal S2' obtained through the detection of patch marks by said registration sensor 12 is subjected to analog/digital conversion. Density detection data D1' after A/D conversion are outputted to the CPU 55, where a threshold voltage setting data Dth is determined on the basis of density detection data D1'. By the use of this threshold voltage setting data Dth, it becomes possible to correct in real time a threshold voltage Lth for detecting the positions of color registration marks CR.

The above-mentioned density detection sensor 11 is connected to an A/D converter 517, where a density detection signal S1 is subjected to analog/digital conversion. The density detection signal D1 after AID conversion is outputted to the CPU55.

An index delay circuit 510 (hereinafter referred to also as a lateral magnification correction section) is connected to the CPU 55, and operates to delay INDEX (clock) signals for the colors Y, M, C, and BK supplied from an upper-rank control system on the basis of delay control data D10, to output delayed INDEX signals (delayed Y INDEX, delayed M INDEX, delayed C INDEX, delayed K INDEX) for the colors Y, M, C, and BK to the image forming system.

A VV generation circuit (hereinafter referred to also as a sub-scanning correction section) 511 is connected to the CPU 55, and operates to generate position correction signals for the adjustment of sub-scanning for the colors Y, M, C, and BK, Sy (YVV), Sm (MVV), Sc (CVV), and Sk (KVV) on the basis of VV generation control data D11 for correcting the writing position in the vertical direction, to output these signals, Sy, Sm, Sc, and Sk to the image forming system II.

An HV generating circuit (hereinafter referred to also as a main scanning correction section) 512 is connected to the CPU 55, and operates to generate position correction signals for the adjustment of main scanning for the colors Y, M, C, and BK, YHV, MHV, CHV, and KHV on the basis of HV generation control data D12 for correcting the writing position in the main scanning direction, to output these signals, YHV, MHV, CHV, and KHV to the image forming system. This makes it possible to adjust writing positions.

A skew correction circuit (hereinafter referred to also as a skew correction section) 513 is connected to the CPU 55, and operates to generate a skew correction signal S13 for the main scanning adjustment for the colors Y, M, C, and BK on the basis of skew correction data D13 for correcting an image inclination, to output this signal S13 to the image forming system II. A plurality of motors are connected to the skew correction circuit 513, and are controlled on the basis of skew correction signals S13.

Figure 4:
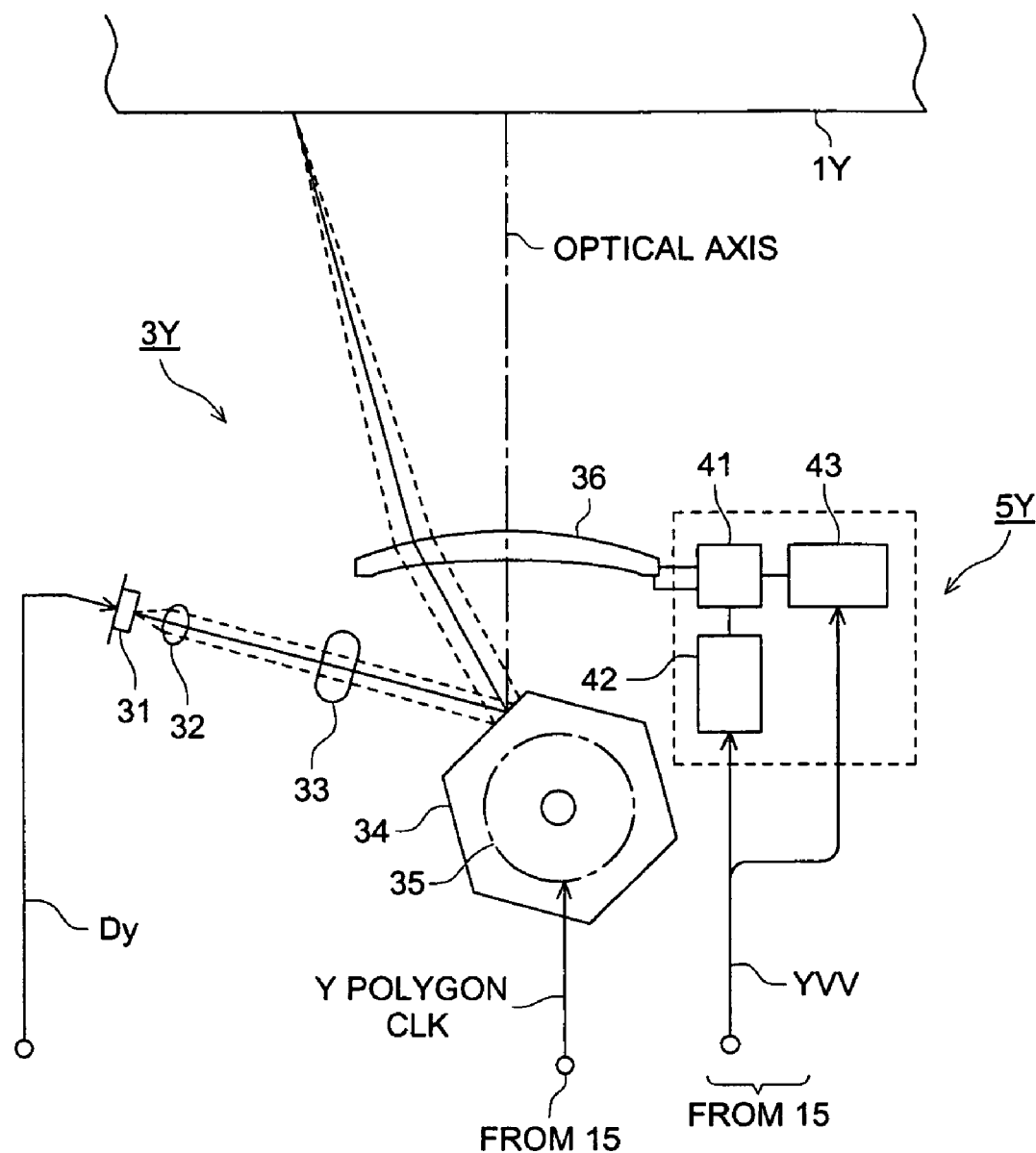
FIG. 4 is a conceptual drawing showing an example of the structure of a image writing section 3Y and its correction means 5Y for the color Y.

FIG. 4 is a conceptual drawing showing an example of the structure of the image writing section for the Y-color 3Y and its correction means 5Y. The image writing section for the Y-color 3Y comprises a semiconductor laser light source 31, optical systems 32 and 33, a polygonal mirror 34, a polygonal mirror motor 35, and an fθ lens 36. In the semiconductor laser light source 31, a laser beam is generated on the basis of image information for the Y-color Dy. A laser beam emitted from the semiconductor laser light source 31 has its beam shape corrected to a specified one by the optical systems.

This light beam is deflected in the main scanning direction by the polygonal mirror 34. The polygonal mirror 34 is rotated by the polygonal mirror motor 35 on the basis of a Y polygon CLK from the control device 15. A light beam deflected by the polygonal mirror 34 is converged on the photoreceptor drum 1Y by the fθ lens 36.

In this image writing section 3y, there is provided the correction means 5Y. The correction means 5Y comprises a lens holding mechanism 41, an fθ lens adjusting mechanism 42, etc. An fθ lens 36 is attached to the lens holding mechanism 41, which is movably attached to the fθ lens adjusting mechanism 42. By the fθ lens adjusting mechanism 42, the lens holding mechanism is moved to rotate the fθ lens about its optical axis perpendicular to the image formation surface on the basis of a position correction signal Sy (YVV) for adjustment.

This mechanism 42 is embodied by the use of an actuator (a piezoelectric element), or by the control of the pitch of a fully threaded bolt. The above-mentioned mechanism is provided for the purpose of the adjustment of the writing position of a laser beam on the photoreceptor drum 1Y. As regards the other image forming units 10M and 10C, the same processing is done. By doing this way, the positional deviations of the optical system components such as the fθ lens 36 in the image forming units 10Y, 10M, 10C, and 10K from the optimum positions can be removed.

In this example, in order to correct the binarization reference value (also called the control reference value) for detecting the positions of color registration marks, patch marks are previously formed on the intermediate transfer belt 6 through the image forming unit 10Y, 10M, 10C, or 10K. A binarization reference value is a threshold level of binarization for use in the detection of the passage timing of a color registration mark formed on the intermediate transfer belt 6, and is hereinafter referred to as a threshold voltage Lth.

Figure 5:
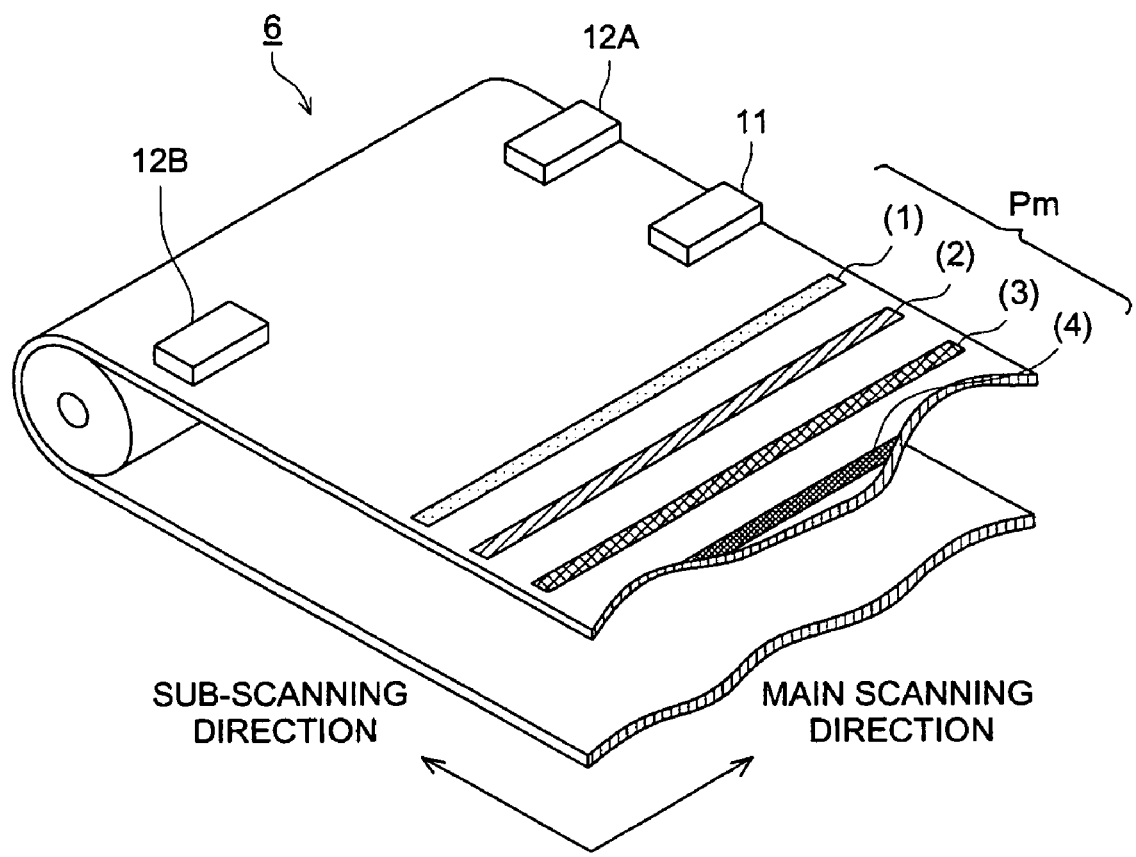
FIG. 5 is a perspective view showing an example of the arrangement of a toner image density sensor 11 and registration sensors 12A and 12B in the embodiment 1.

FIG. 5 is a perspective view showing an example of the arrangement of the toner image density sensor 11 and the registration sensors 12A and 12B. In FIG. 5, the registration sensors 12A and 12B are provided above the portions near both the edges of the intermediate transfer belt 6. In the upstream side of the registration sensor 12A, the toner image density sensor 11 is disposed. The toner image density sensor 11 and the registration sensor 12A are arranged serially (side by side) at the specified positions with respect to the running direction of the intermediate transfer belt 6. This is done for the purpose of calibrating the registration sensor 12 on the basis of a density detection signal S1 within one revolution period of the intermediate transfer belt 6. That is, the control device 15 controls, for example, the image forming unit 10K to form patch marks Pm for color density correction, namely, the patches (1) to (4) having different densities respectively on the intermediate transfer belt 6 beforehand.

Further, during one revolution of the intermediate transfer belt 6, the density of the patch marks Pm formed is detected by the toner image density sensor 11, and density correction control for adjusting the density of mark images is practiced, while the density of the patch marks formed on the intermediate transfer belt 6 is detected successively also by the registration sensors 12A and 12B. After that, the densities of the color registration marks for the registration of component color images are adjusted on the basis of the densities of the patch marks Pm.

FIG. 6(A)-1 to FIG. 6(B) are a drawing showing the patch marks Pm and a waveform drawing showing an example of density detection by the registration sensor 12A or the like. FIG. 7(A) and FIG. 7(B) are drawings showing waveform examples of a density detection signal S2' by the registration sensor 12A or the like. In any one of FIG. 6(B), FIG. 7(A), and FIG. 7(B), the abscissa represents time t, and the ordinate represents the signal level of a density detection signal S2' by the registration sensor 12A or the like.

By the above-mentioned image forming unit 10Y, 10M, 10C, or 10K, several kinds of patch mark Pm having different densities are formed on the intermediate transfer belt 6. The solid line shown in FIG. 6(B) shows a waveform of the density detection of the 4 patch marks Pm having different densities. In the case where the density of the patch mark Pm is low, as shown in FIG. 7(A), the waveform of the density detection signal S2' is sharp, and its half-value width w1 is narrow. In the case where the density of the patch mark Pm is high, as shown in FIG. 7(B), the waveform of the density detection signal S2' is dull, and its half-value width is broad.

In this example, the maximum value (MAX) of the density detection signal in the formation area of the patch marks Pm outputted from the registration sensor 12A or the like and the minimum value (MIN) in the non-formation area of the patch marks are detected by the control device 15. The density detection signal S2' in the non-formation area of the patch marks Pm represents an output level reflecting the substrate, namely, the surface of the intermediate transfer belt. Then, the maximum value of the density detection signal S2' concerning the non-formation area of the patch marks Pm and the minimum value of it concerning the formation area of the patch marks Pm are removed from the object of detection. In this example, concerning the density detection signal S2' in the formation area of the patch marks Pm, the density giving the highest signal level is detected out of the parts of the density detection signal S2' for 4 patch marks Pm, patch (1) to patch (4).

In the example shown in FIG. 6(A)-1 to FIG. 6(B), the density of the patch (1) is lowest and the density of the patch (4) is highest. In the case where the density of the patch marks Pm fluctuates, in either of the cases of low density and high density, it sometimes occurs that the reflected light quantity becomes higher in relation to the condition of the substrate. In this example, the output of patch (1)>the output of patch (2)>the output of patch (4)>the output of patch (3), that is, the output of patch (3) is lowest. The patch marks Pm may have any pattern shape so long as they can be detected by the color registration sensors 12A etc.

Figure 8:
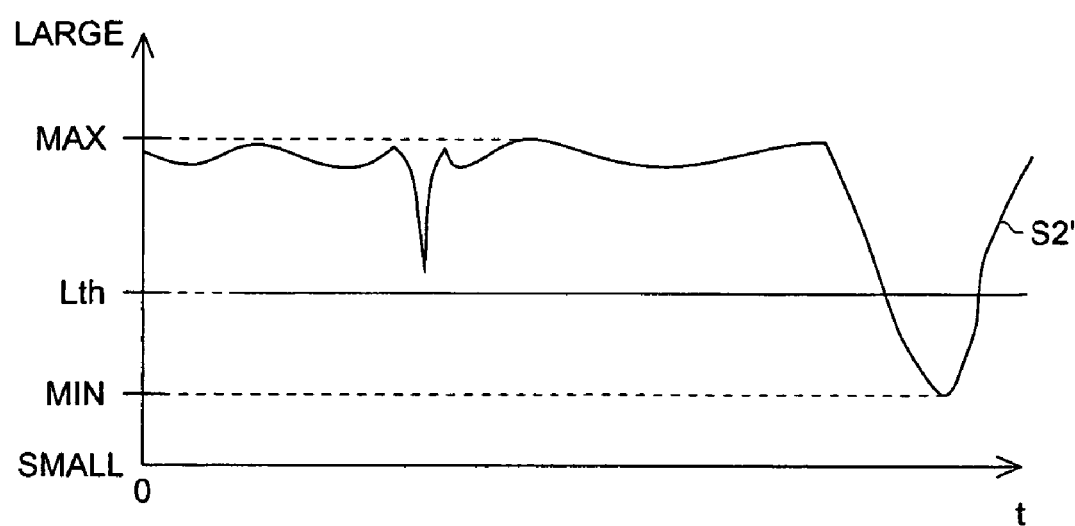
FIG. 8 is a waveform drawing showing an example of threshold setting based on the density detection of the patch marks Pm.

FIG. 8 is a waveform drawing showing an example of the setting of a threshold voltage based on the density detection of patch marks Pm by the registration sensor 12A or the like. In FIG. 8, the abscissa represents time t, and the ordinate represents the signal level of a density detection signal S2' by the registration sensor 12A or the like.

The solid line in FIG. 8 shows the waveform at the time the density of 4 patch marks Pm having different density values is detected. In FIG. 8, the average value is calculated on the basis of the maximum value (MAX) of the density detection signal S2' and the minimum value (MIN) of it, and the average value is set as the threshold voltage Lth for the registration sensors 12A etc. In this way, by setting the threshold voltage Lth to be the center of the two output levels, the stability of detection can be raised. This threshold voltage Lth is used in detecting the passage timing at the time a color registration mark formed on the intermediate transfer belt 6 passes under the registration sensor 12A or the like.

Figure 9:
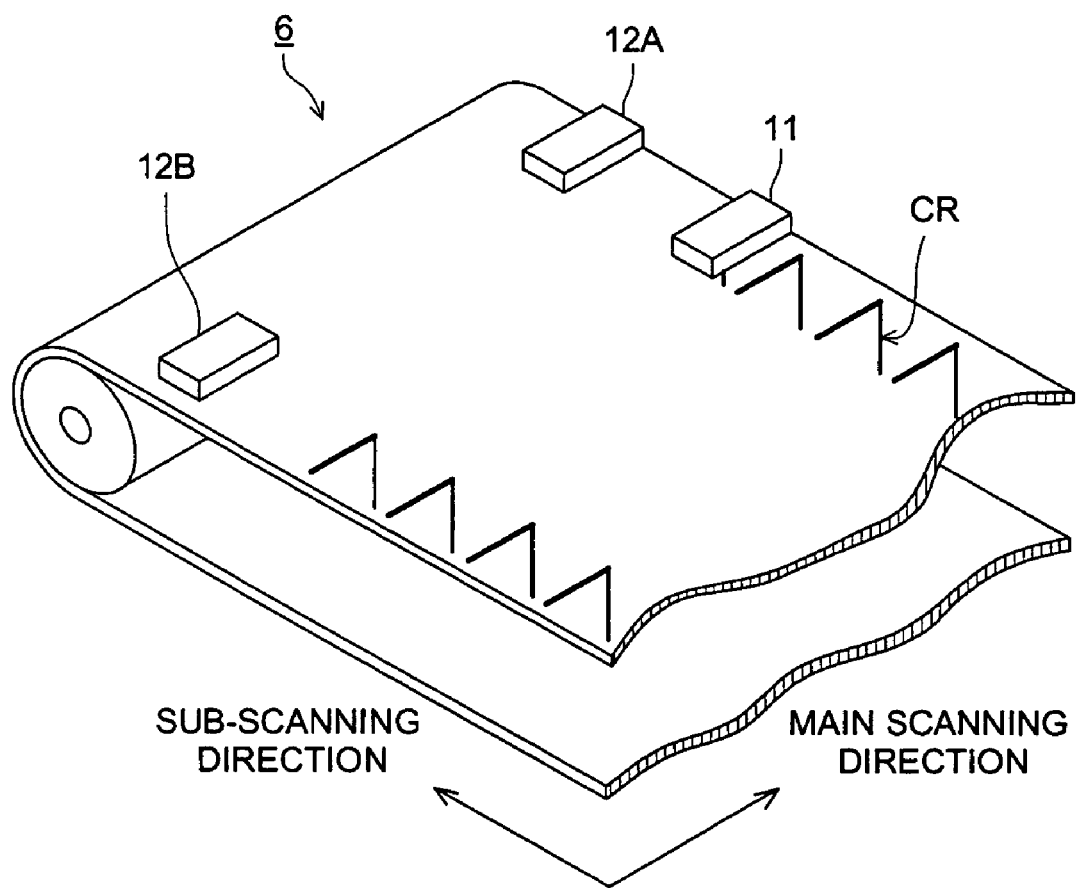
FIG. 9 is a perspective view showing an example of the detection of color registration marks CR by the registration sensors 12A and 12B in the embodiment 1 and embodiment 7.

FIG. 9 is a perspective view showing an example of the detection of color registration marks CR by the registration sensors 12A and 12B. In FIG. 9, after the density detection of the patch marks, the image forming units 10Y, 10M, 10C, and 10K are controlled to form, during the next one revolution of the intermediate transfer belt 6, for example, 7-shaped color registration marks CR having its density adjusted. The positions of the color registration marks CR formed on the intermediate transfer belt 6 are detected by the registration sensors 12A and 12B. Then, the control device 15 practices a color registration control for adjusting the forming positions of component color images on the basis of the positions of the color registration marks CR.

Figure 10:
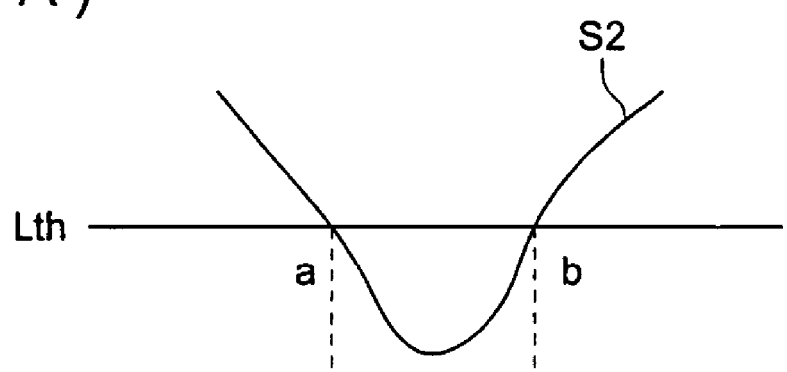
Figure 10:
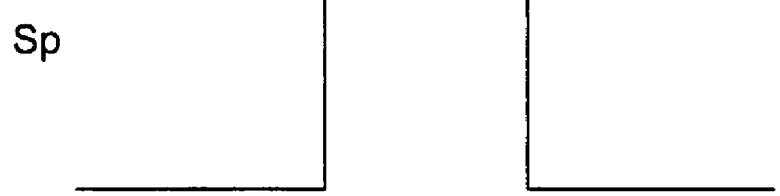

FIG. 10(A) and FIG. 10(B) are drawings showing an example of binarization of a position detection signal S2 by the registration sensor 12A or the like. In FIG. 10(A), a position detection signal S2 obtained by the registration sensor 12A or the like is binarized on the basis of the threshold voltage Lth calculated in FIG. 8. In this example, a passage timing pulse signal Sp rises at the time ta when the position detection signal S2 crosses the threshold voltage Lth at the point "a" during the decreasing of the position detection signal S2, and the passage timing pulse signal Sp falls at the time tb when the position detection signal S2 crosses the threshold voltage Lth at the point "b" during the increasing of the position detection signal S2. This passage timing pulse signal Sp is outputted from the comparator 59 through the mask generation circuit 515 to the latch circuit 56, and is used as the reference for adjusting the positional deviations of component color images, for the purpose of calculating the amounts of the deviations of the writing positions of image components of the colors Y, M, and C with respect to the writing position of the image component of the color BK.

Figure 11:
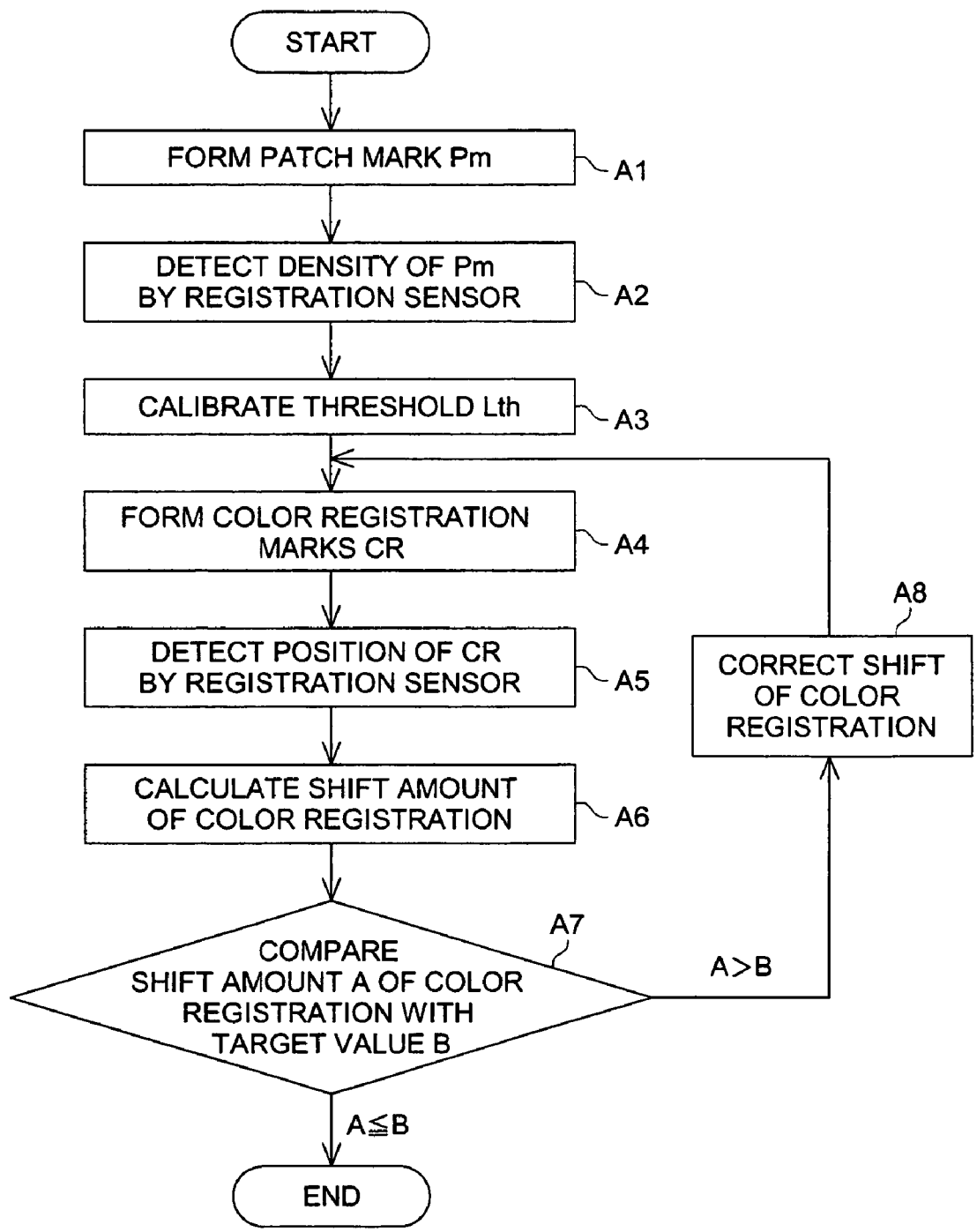
FIG. 11 is a flow chart showing an example of the operation of the color image forming apparatus 100 in the embodiment 1.

Next, a first image forming method will be explained with reference to an example of operation of the color image forming apparatus 100. FIG. 11 is a flow chart showing an example of operation of the color image forming apparatus 100.

This example is premised on it that the intermediate transfer belt 6 is provided in the image transfer system 1, and before a color image is formed on the intermediate transfer belt 6 through the superposition of component color images on the basis of arbitrary image information, the forming positions of the component color images are adjusted on the basis of the positions of color registration marks CR. Further, it is taken for example the case where the threshold voltage Lth in detecting the positions of color registration marks CR is corrected in real time before the adjustment of the forming positions of component color images. The toner image density sensor 11 (the first detection system) and the registration sensors 12A and 12B (the second detection system) are arranged above the circumference of the intermediate transfer belt 6, with the latter tow sensors 12A and 12B located at positions of the same phase next to the toner image density sensor 11 with respect to the running direction of the intermediate transfer belt 6.

With this incorporated into the image forming condition, in the steps A1 to A3 of the flow chart shown in FIG. 11, the initial adjustment concerning the detection by the registration sensors 12A and 12B is carried out, and after that, in the steps A4 to A8, the adjustment of writing position is made. In this initial adjustment, an optimum threshold voltage Lth is determined from the sensor output of the substrate and the sensor output of the marks for density detection.

In this example, in the step Al, patch marks for the color density correction are formed on the intermediate transfer belt 6. At this time, by the image forming unit 10Y, 10M, 10C, or 10K, several kinds of patch mark Pm having different density values as shown in FIG. 5 are formed on the intermediate transfer belt 6. After that, the procedure moves to the step A2, where the density of the patch marks Pm formed on the intermediate transfer belt 6 is detected by the registration sensors 12A etc. For example, a density detection signal S2' detected by the registration sensor 12A is such one as shown in FIG. 6(B).

Further, the procedure moves to the step A3, where the threshold voltage Lth for the position detection of color registration marks CR is corrected on the basis of the density detection signal S2' of the patch marks outputted from the registration sensor 12A. The threshold voltage Lth is corrected by the operation shown in FIG. 8. At this time, in the control device 15, the maximum value (MAX) of a density detection signal S2' of the non-formation area of the patch marks Pm outputted from the registration sensor 12A or the like and the minimum value (MIN) of its formation area are detected, and the average value is calculated on the basis of the maximum value and the minimum value of the density detection signal S2'. A density detection signal S2' in the non-formation area of patch marks Pm reflects the substrate, that is, the surface of the intermediate transfer belt 6.

This average value is determined to be the threshold voltage Lth for the detection of the registration marks by the registration sensors 12. Further, the density values of color registration marks CR for the registration of component color images are adjusted on the basis of the density of the patch marks Pm. By forming the color registration marks CR on the basis of the density of the patch marks Pm detected in the above, it is possible to make the density of color registration marks CR formed most suitable for the position detection by the registration sensors 12. Further, toner consumption amount and adjustment time for the formation of color registration marks can be reduced.

Then, color registration marks CR (mark images) having their density adjusted are formed on the intermediate transfer belt 6 in the step A4. After that, the positions of the color registration marks CR formed on the intermediate transfer belt 6 are detected by the registration sensors 12 in the step A5. At this time, the passage timing of a color registration mark is detected on the basis of the threshold voltage Lth shown in FIG. 10(A). After that, in the step 6, the amounts of color deviations are calculated on the basis of passage timings, for the purpose of adjusting the forming positions of component color images on the basis of the positions of the color registration marks CR.

Then, the procedure moves to the step A7, where the amounts of color deviations are compared with the target value. If the amounts of color deviations are not greater than the target value, the processing is completed without adjusting the forming positions of component color images. If the amounts of color deviations exceed the target value, the procedure moves to the step A8, where color deviation correction is made. In this color deviation correction, for example, in the correction means for the Y-color 5Y, the fθ lens adjusting mechanism 42 is driven on the basis of a position correction signal Sy (YVV), and the lens holding mechanism 41 is moved to rotate the Fθ lens about its optical axis perpendicular to the image formation surface for adjustment. By doing this, the writing position of a laser beam on the photoreceptor drum 1Y can be adjusted.

Then, the procedure moves back to the step A4, and the above-mentioned processings are repeated, for the purpose of making the amounts of color deviations zero to adjust the forming positions of component color images to the optimum. After that, by the image forming units 10Y, 10M, 10C, and 10K having the image forming position adjusted to the optimum, a color image can be formed on the intermediate transfer belt 6 in the same way as conventional methods.

As explained in the above, according to the color image forming apparatus 100 and the image forming method as the embodiment 1 of the present invention, it can be put into practice that the density of patch marks Pm for color density correction is detected by the registration sensors 12, and the threshold voltage Lth for detecting the positions of the color registration marks CR is corrected on the basis of the density detection signals S2' of the patch marks Pm outputted from said registration sensors 12.

Accordingly, it is possible to make a correction such that the threshold voltage Lth for detecting the positions of color registration marks CR is adapted for the state of the intermediate transfer belt 6 or the image forming units 10Y, 10M, 10C, and 10K in accordance with the condition of use. On top of it, because the density of color registration marks can be optimized, a high accuracy in the detection processing of color registration marks can be secured.

Owing to this, even if the condition of use changes with the passage of time due to the change of reflection light quantity at the intermediate transfer belt 6 and the decrease of the light emission quantity of the sensors, the proper positions of color registration marks can be exactly detected; therefore, the forming positions of component color images can be adjusted at a high accuracy on the basis of a high-reliability position detection signal S2. Accordingly, because component color images can be exactly superposed on the intermediate transfer belt 6, it is possible to transfer a color image on a desired paper sheet P at a high accuracy.

(2) Embodiment 2

Figure 12:
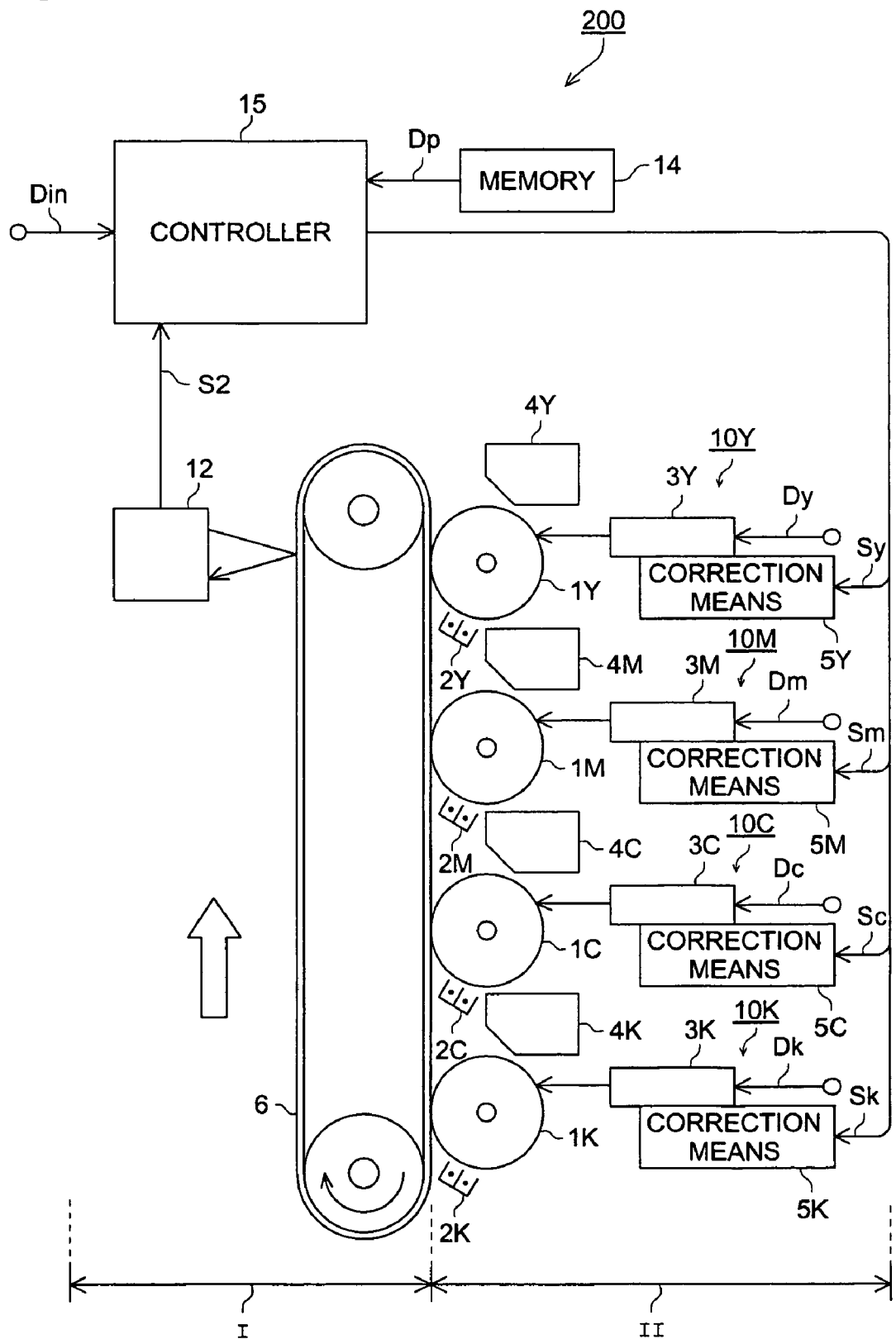
FIG. 12 is a block drawing showing an example of the structure of the image transfer system and the image forming system of a color image forming apparatus 200 as the embodiment 2 of this invention.

FIG. 12 is a block drawing showing an example of the structure of the image transfer system and the image forming system of a color image forming apparatus 200 as the embodiment 2 of the present invention.

In this example of the embodiment, it is put into practice that, in order that a color image may be formed through the superposition of component color images on the basis of arbitrary image information, there is provided a control device 15 for controlling an intermediate transfer belt 6 and image forming units 10Y, 10M, 10C, and 10K on the basis of reversed mark images as the reversed ones of mark images for the registration of component color images, and at least, reversed mark images are formed beforehand on the intermediate transfer belt 6, and after that, the forming positions of component color images are adjusted on the basis of the position detection of mark images defined by the void portions of these reversed mark images. Thus, even if scratches etc. are produced on the intermediate transfer belt 6 due to the change with the passage of time caused by maintenance operations and wear of parts, a color image can be transferred onto a desired paper sheet P at a high accuracy.

The color image forming apparatus 200 shown in FIG. 12 is an apparatus for forming a color image through the superposition of component color images on the basis of arbitrary image information. Said apparatus 200 comprises the intermediate transfer belt 6, and operates to transfer a color image onto a desired paper sheet P. Along this intermediate transfer belt 6, the image forming units 10Y, 10M, 10C, and 10K are provided to practice the formation of a color image. Registration sensors 12 as an example of the detection means are provided, for example, at the left side with respect to the intermediate transfer belt 6 shown in the drawing, and are given a role to detect the positions of mark images formed on the intermediate transfer belt 6.

The registration sensors 12 are connected to the control device 15, by which the intermediate transfer belt 6 and the image forming units 10Y, 10M, 10C, and 10K are controlled on the basis of the output of these registration sensors 12. The control device 15 controls the image forming units 10Y, 10M, 10C, and 10K in such a way that at least reversed color registration marks RCR as the reversed ones of mark images for the registration of component color images are previously formed on the intermediate transfer belt 6, and the forming positions of component color images are adjusted on the basis of the position detection of mark images defined by the void portions of the reversed color registration marks RCR. For example, by the control device 15, on the basis of the output of the registration sensors 12A etc., with the reversed color registration mark RCR for the color BK taken as the reference, the image forming units 10Y, 10M, and 10C for the other colors Y, M, and C are controlled. By this control, the writing positions for the colors Y, M, and C are adjusted to come to agree with the writing position for the color BK.

A storage device 14 is connected to the control device 15, and a plurality of kinds of reversed mark image information (hereinafter referred to as reversed mark image data DP) for reversing mark images for the registration of component color images are stored in it. Of course, the way of handling the data is not restricted to this, and also it is appropriate that mark image information for forming mark images for the registration of component color images is stored in the storage device 14 beforehand, and at the time of detecting color registration marks, reversed mark image data DP are prepared on the basis of the mark image information and the pattern width. This is done for the purpose of forming reversed color registration marks RCR obtained as the reversed ones of mark images on the basis of reversed mark image data DP on the intermediate transfer belt 6.

In this example, a developing device 4Y for forming a toner image of the color Y on the intermediate transfer belt 6 is provided in the image forming unit 10Y, a developing device 4Y for forming a toner image of the color M on the intermediate transfer belt 6 is provided in the image forming unit 10M, a developing device 4C for forming a toner image of the color M is provided in the image forming unit 10C, and a developing device 4K for forming a toner image of the color BK is provided in the image forming unit 10K; toner images formed on the intermediate transfer belt 6 by these developing devices 4Y, 4M, 4C, and 4K on the basis of the reversed mark image data DP for the colors Y, M, C, and BK form the reversed registration marks RCR of the respective colors, and the void portions with no toner particles deposited represent the mark images. In addition, as regards items having the same name and sign as those explained in the embodiment 1, the explanation will be omitted because they have the same function.

Figure 13:
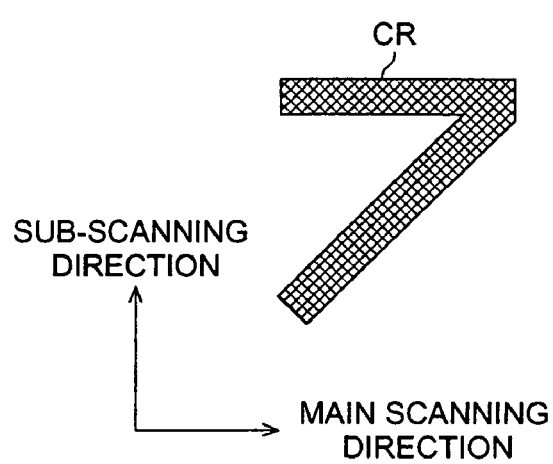
FIG. 13(A) and FIG. 13(B) are image drawings showing the examples of the structure of a mark image and a reversed mark image.
Figure 13:
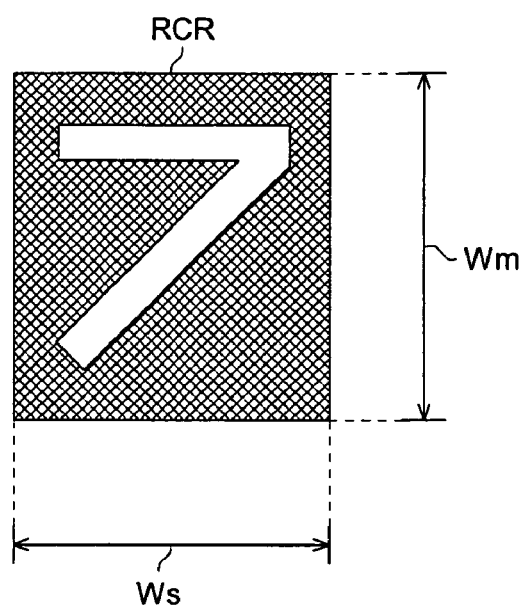

FIG. 13(A) and FIG. 13(B) are conceptual drawing showing an example of the structure of a mark image and a reversed mark image having the same pattern as that used in the first image forming apparatus 100. To take the running direction of the intermediate transfer belt 6 as the sub-scanning direction, and the direction perpendicular to this sub-scanning direction as the main scanning direction, the registration mark CR is made up of a line segment parallel to the main scanning direction and an oblique line segment not perpendicular to the main scanning direction meeting together at a point. This shape is devised for the purpose of detecting the positional deviation in the main scanning direction from the timings when the above-mentioned two line segments of the color registration mark pass under the registration sensor 12.

The reversed color registration mark RCR shown in FIG. 13(B) is an example of the reversed mark image; this is the rectangular-shaped pattern surrounding the mark image formed of the void portion. This reversed registration mark RCR is applied to the second image forming apparatus 200 explained with reference to FIG. 2. In FIG. 13(B), Wm denotes the length of the pattern of the reversed color registration mark RCR in the sub-scanning direction, and is the range of toner image formation in the sub-scanning direction. Ws denotes the pattern width of the reversed color registration mark RCR in the main scanning direction, and is the range of toner image formation in the main scanning direction.

According to the method of forming the color registration mark shown in FIG. 13(A), it is considered that if belt scratches or the like are present on the part where no toner particle is deposited due to the change of the intermediate transfer belt 6 with the passage of time, sometimes an erroneous detection is made due to a noise caused by the belt scratches by the registration sensor 12A or the like. Therefore, it is made possible to cover belt scratches by using reversed registration marks of a method of the present invention shown in FIG. 13(B).

In this example, a position detection signal S2 of a mark image defined by the void portion of the reversed color registration mark RCR is outputted from the registration sensor 12. The position detection signal S2 is obtained by the detection of the edge of the void portion, and in order to carry out image processing in the same way as the case of non-reversed mark images, only it is necessary to reverse the edge detection logic of this position detection signal S2.

To state it concretely, it is practiced to connect an inverter to the output of the registration sensor 12 to invert the signal logic, and mask the area except the reversed mark formation area by the use of hardware for the position detection signal S2. This is done for the purpose of detecting the portion not covered with toner particles, that is, the position of the mark image at a high accuracy, in the case where the range uniformly covered with toner particles is limited in the sub-scanning direction on the intermediate transfer belt 6.

In this example, reversed color registration marks RCR are formed to have arbitrary pattern widths Ws in the main scanning direction; the pattern widths of the reversed color registration marks RCR are varied arbitrarily for the purpose of reducing the toner consumption for the detection of color registration marks.

Figure 14:
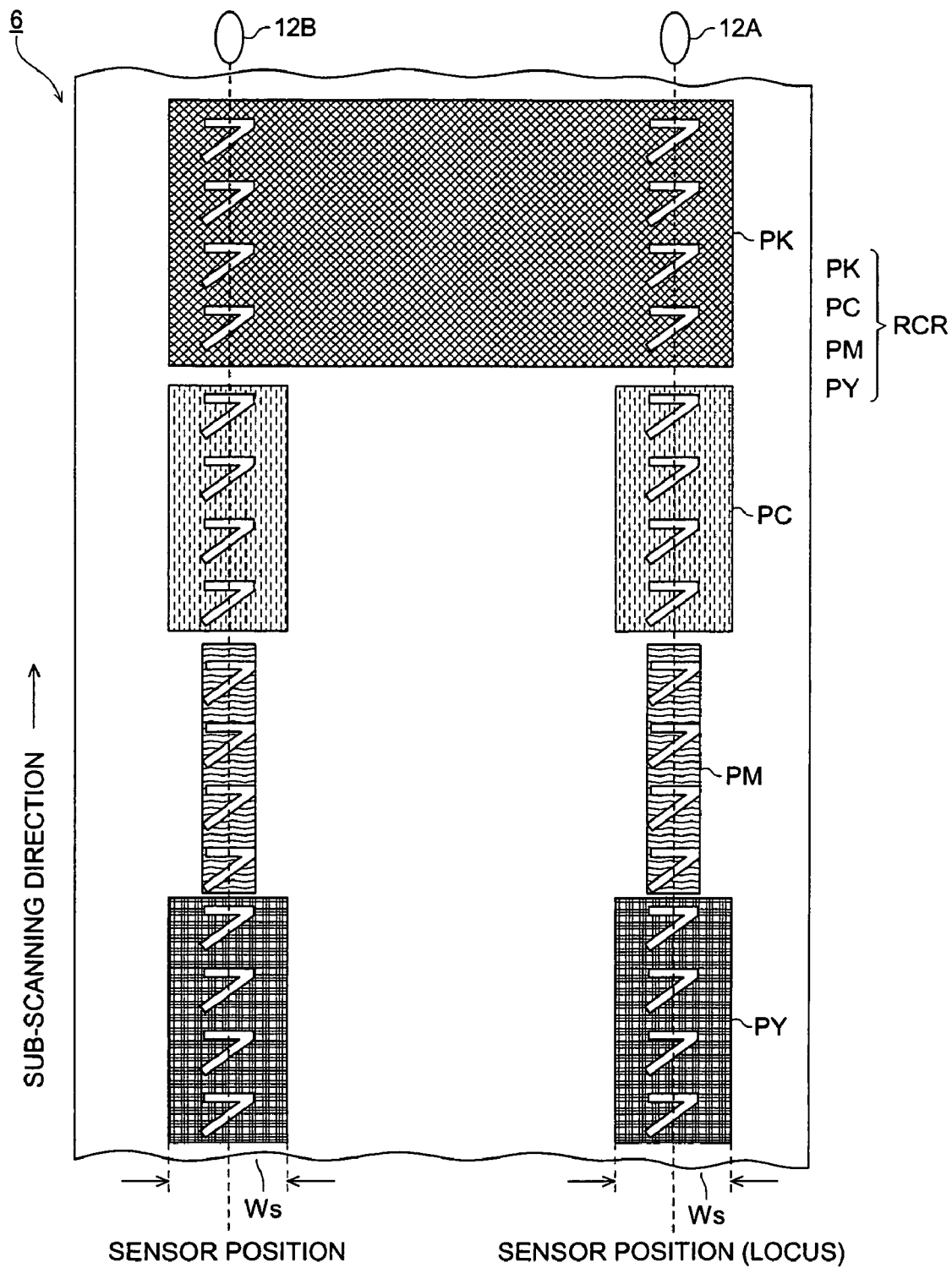
FIG. 14 is a conceptual drawing showing an example of the formation of reversed color registration marks RCR for the colors BK, C, M, and Y.

FIG. 14 is a conceptual drawing showing an example of formation of reversed color registration marks RCR for the colors BK, C, M, and Y.

The reversed color registration mark RCR for the color BK (hereinafter referred to as the BK-color reversed pattern PK simply), the reversed color registration mark RCR for the color C (hereinafter referred to as C-color reversed pattern PC simply), the reversed color registration mark RCR for the color M (hereinafter referred to as M-color reversed pattern PM simply), and the reversed color registration mark RCR for the color Y (hereinafter referred to as Y-color reversed pattern PY simply) shown in FIG. 14 are an example of patterns formed serially in the sub-scanning direction on the intermediate transfer belt 6.

The case where the reversed patterns PK, PC, PM, and PY are detected by the two registration sensors 12A and 12B is shown. With respect to the running direction of the intermediate transfer belt 6, the registration sensor 12A is provided above a position near the right edge of the belt 6, and the registration sensor 12B is provided above a position near the left edge of the belt 6. The broken lines represent the apparent loci of the two registration sensors due to the revolution of the intermediate transfer belt 6.

In this example of patterns, the two BK-color reversed patterns PK are integrally formed in the main scanning direction; the mark portions are formed as the void portions in a toner image which is uniform over the whole width, and are detected by the registration sensors 12A and 12B respectively. If all the reversed patterns are formed in a uniform toner image over the whole width in the main scanning direction in the above-mentioned way, toner consumption increases. Therefore, it is appropriate to form a uniform toner image in the narrow area near the mark portion, to limit the pattern width Ws like the reversed patterns PC, PM, and PY for the colors C, M, and Y respectively. Thus, the toner consumption can be suppressed.

In the example of the reversed pattern PM for the color M, the pattern width Ws of the reversed pattern PM is made narrower than the width of the mark image. In this case, the toner consumption can be suppressed to the minimum. The reversed pattern PM has a structure such that a plurality of partial figure patterns partitioning the void portions are arranged, and is different from the reversed patterns PK, PC, and PY for the colors BK, C, and Y respectively having a rectangular pattern structure surrounding the whole of the mark images formed of the void portions.

Reversed mark image data DP for forming these plural kinds of reversed pattern, PY, PM, PC, and PK are stored in the storage device 14. It is appropriate to select the reversed patterns PY, PM, PC, and PK in accordance with the state of use of the intermediate transfer belt 6.

Further, in the case where two or more kinds of reversed color registration mark are formed serially in the sub-scanning direction on the intermediate transfer belt 6, the image forming units 10Y, 10M, 10C, and 10K are controlled by the control device 15 in such a way as to make the lower edge portion of a reversed color registration mark of one kind formed on the intermediate transfer belt 6 overlap the upper edge portion of a reversed color registration mark of another kind, for example, by one pixel.

In this way, as in the example of the reversed pattern PM for the color M and the reversed pattern PY for the color Y shown in FIG. 14, concerning the range to be covered uniformly with toner particles on the intermediate transfer belt 6, it is possible to make the toner image for the color M overlap the toner image for the color Y. By doing this way, on top of it that the reading of mark images by the use of hardware can be easily limited, the density of a color image after the superposition of the component color images can be also confirmed.

Figure 15:
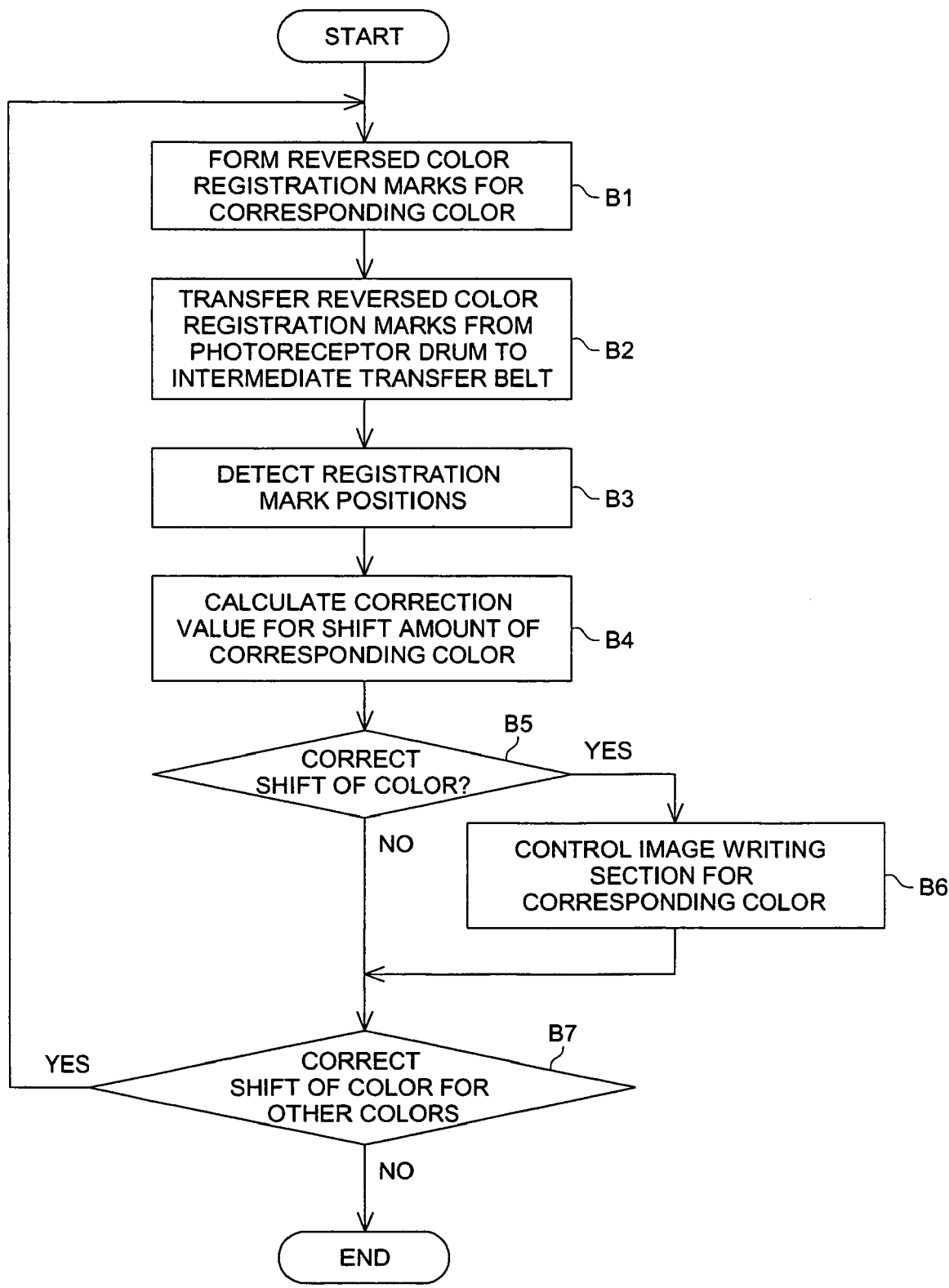
FIG. 15 is a flow chart showing an example of the operation of the color image forming apparatus 200.

Next, the second image forming method will be explained with reference to an example of the operation of the second color image forming apparatus 200. FIG. 15 is a flow chart showing an example of the operation of the color image forming apparatus 200.

This example of the embodiment relates to a case where a color image is formed through the superposition of the component color images on the intermediate transfer belt 6 on the basis of arbitrary image information, and reversed mark image data DP for reversing mark images for the registration of the component color images are prepared beforehand. The reversed mark image data DP are read out from the storage device 14 such as a ROM. Of course, it is also appropriate to prepare reversed mark image data DP on the basis of the mark image information and the pattern width at the time of detecting color registration marks. Now, take it for instance the case where color deviations are corrected in the order the color C, M, and Y on the basis of the color BK. The correction of color deviations are made in such a way that the writing positions for the colors Y, M, and C are modified on the basis of the writing position for the color BK.

With this incorporated into the image formation condition, reversed color registration marks RCR of one of the component colors are formed on the basis of reversed mark image data DP for the color concerned in the step B1 of the flow chart shown in FIG. 15. In this example, a BK color reversed pattern PK is formed at first on the photoreceptor drum 1K by the image forming unit 10K. After that, the procedure moves to the step B2, where the reversed color registration mark RCR is transferred from the photoreceptor drum onto the intermediate transfer belt 6. In this example, the BK-color reversed pattern PK is transferred from the photoreceptor drum 1K to form the BK-color reversed pattern PK on the intermediate transfer belt 6.

In this example, when a toner image is formed on the intermediate transfer belt 6 on the basis of reversed mark image data DP, the portion of the toner image formed on the intermediate transfer belt 6 makes up the BK color reversed pattern PK (reversed color registration mark), and the void portions not covered with toner particles make up the mark images. Then, it is practiced to detect the position of the mark images defined by the void portions in the BK-color reversed pattern PK by the registration sensors 12A etc. in the step B3.

Further, in the step B4, it is practiced to calculate the correction value for the BK color deviation on the basis of the positions of the mark images defined by the void portions in the control device 15. After that, the procedure moves to the step B5, whether or not color deviation correction is to be practiced is judged by the control device 15. Whether or not color deviation correction is to be practiced is judged by comparing the deviation value with a control target value determined beforehand.

If the color deviation amount exceeds the target value and a color deviation correction is required, the procedure moves to the step B6, where the image writing section 3K is controlled by the control device 15. In this color deviation correction, in the correction means for the BK-color 5K, the Fθ lens adjusting mechanism 42 is driven on the basis of a position correction signal Sy (YVV), and the lens holding mechanism 41 is moved to rotate the Fθ lens about its optical axis perpendicular to the image formation surface for adjustment. By doing this, the writing position of a laser beam on the photoreceptor drum 1K can be adjusted.

If the color deviation amount is not greater than the target value and no color deviation correction is required in the step B5, the procedure moves to the step B7, and whether or not the detection of color registration marks for the other colors is to be practiced is judged. Because the detection of color registration marks for the other colors, namely, for the colors C, M, and Y, is to be practiced, the procedure moves back to the step B1.

Then, in the step B1, C-color reversed patterns PC are formed on the photoreceptor drum 1C by the image forming units 10C on the basis of reversed mark image data DP, in the step B2, the C-color reversed patterns PC are transferred from the photoreceptor drum 1C onto the intermediate transfer belt 6, and in the step B3, the positions of the mark images defined by the void portions in the C-color reversed patterns PC are detected by the registration sensors 12A etc.

Further, in the step B4, it is practiced to calculate the correction value of the color deviation amount on the basis of the positions of the mark images defined by the void portions in the control device 15. At this time, in the control device 15, the writing position of the reversed color registration mark RCR for the color BK and the writing position of the reversed color registration mark RCR for the color C are detected, and the correction value is calculated from the amount of deviation in the case where the writing position of the reversed color registration marks RCR for the color C is converted into the writing position of the reversed color registration marks RCR for the color BK.

After that, the procedure moves to the step B5, and whether or not a color deviation correction is to be practiced is judged by the control device 15. Whether or not a color deviation correction is to be practiced is judged by comparing the deviation amount with a control target value determined beforehand in the same way as the case of the color BK. If the color deviation amount exceeds the target value, and a color deviation correction is required, the procedure moves to the step B6, where the image writing section 3C is controlled by the control device 15. In this color deviation correction, in the correction means 5C for the color C, the Fθ lens adjusting mechanism 42 and the optical axis adjusting mechanism 43 are driven on the basis of a position correction signal Sc (CVV), and the lens holding mechanism 41 is moved to rotate the Fθ lens about its optical axis perpendicular to the image formation surface for adjustment. By doing this, the writing position of a laser beam on the photoreceptor drum 1C can be adjusted.

Then, in the step B1, M-color reversed patterns PM are formed on the photoreceptor drum 1M by the image forming units 10M on the basis of reversed mark image data DP, in the step B2, the M-color reversed patterns PM are transferred from the photoreceptor drum 1M onto the intermediate transfer belt 6, and in the step B3, the positions of the mark images defined by the void portions in the M-color reversed patterns PM are detected by the registration sensors 12A etc.

Further, in the step B4, it is practiced to calculate the correction value of deviation amount for the color M on the basis of the positions of the mark images defined by the void portions in the control device 15. At this time, in the control device 15, the writing position of the reversed color registration marks RCR for the color BK and the writing position of the reversed color registration marks RCR for the color M are detected, and the correction value is calculated from the amount of deviation in the case where the writing position of the reversed color registration marks RCR for the color M is converted into the writing position of the reversed color registration marks RCR for the color BK.

After that, the procedure moves to the step B5, and whether or not a color deviation correction is to be practiced is judged by the control device 15. Whether or not a color deviation correction is to be practiced is judged by comparing the deviation amount with a control target value determined beforehand.

If the color deviation amount exceeds the target value, and a color deviation correction is required, the procedure moves to the step B6, where the image writing section 3M is controlled by the control device 15. In this color deviation correction, in the correction means 5M for the color M, the Fθ lens adjusting mechanism 42 is driven on the basis of a position correction signal Sm (MVV), and the lens holding mechanism 41 is moved to rotate the Fθ lens about its optical axis perpendicular to the image formation surface for adjustment. By doing this, the writing position of a laser beam on the photoreceptor drum 1M can be adjusted.

Further, in the step B1, Y-color reversed patterns PY are formed on the photoreceptor drum 1Y by the image forming units 10C on the basis of reversed mark image data DP, in the step B2, the Y-color reversed patterns PY are transferred from the photoreceptor drum 1Y onto the intermediate transfer belt 6, and in the step B3, the positions of the mark images defined by the void portions in the Y-color reversed patterns PY are detected by the registration sensors 12A etc.

Further, in the step B4, it is practiced to calculate the correction value of the color deviation amount on the basis of the position of the mark images defined by the void portions in the control device 15. At this time, in the control device 15, the writing position of the reversed color registration marks RCR for the color BK and the writing position of the reversed color registration marks RCR for the color Y are detected, and the correction value is calculated from the amount of deviation in the case where the writing position of the reversed color registration marks RCR for the color Y is converted into the writing position of the reversed color registration marks RCR for the color BK.

After that, the procedure moves to the step B5, and whether or not a color deviation correction is to be practiced is judged by the control device 15. Whether or not a color deviation correction is to be practiced is judged by comparing the deviation amount with a control target value determined beforehand.

If the color deviation amount exceeds the target value, and a color deviation correction is required, the procedure moves to the step B6, where the image writing section 3Y is controlled by the control device 15. In this color deviation correction, in the correction means 5Y for the color Y, the Fθ lens adjusting mechanism 42 is driven on the basis of a position correction signal Sy (YVV), and the lens holding mechanism 41 is moved to rotate the Fθ lens about its optical axis perpendicular to the image formation surface for adjustment. By doing this, the writing position of a laser beam on the photoreceptor drum 1Y can be adjusted.

As explained in the above, according to a color image forming apparatus and an image forming method as the embodiment 2 of the present invention, it is practiced that, by the control device 15, a BK-color reversed pattern PK is formed beforehand on the intermediate transfer belt 6, and after that, the image writing section 3C is controlled so as to adjust the position of forming the component image of the color C on the basis of the position of the mark images defined by the void portions of the C-color reversed patterns PC formed on the intermediate transfer belt 6. Also as regards the color M and Y, it is practiced that the image writing section 3M and the image writing section 3Y are controlled so as to adjust the forming positions of the component images of the colors M and Y.

Accordingly, because the area except the void portions defining the mark images can be covered with reversed color registration marks (toner images) of the colors Y, M, C, and BK, even if scratches etc. are produced on the intermediate transfer belt 6 due to the change with the passage of time caused by the maintenance operations and wear of parts, the proper positions of the mark images can be exactly detected.

Owing to this, the forming positions of component color images can be adjusted at a high accuracy on the basis of a high-reliability position detection signal S2 with no noise signal due to scratches etc. superposed. On top of it, for the calculation of color deviation values, the structure based on a conventional method can be used as it is with almost no alteration. Further, because the reading of portions other than reversed color registration marks RCR is excluded by the use of hardware, and on top of it, toner consumption can be suppressed. Accordingly, because component color images can be superposed exactly on the intermediate transfer belt 6, a color image can be transferred onto a desired paper sheet P without being influenced by the change with the passage of time.

(3) Embodiment 3

Figure 16:
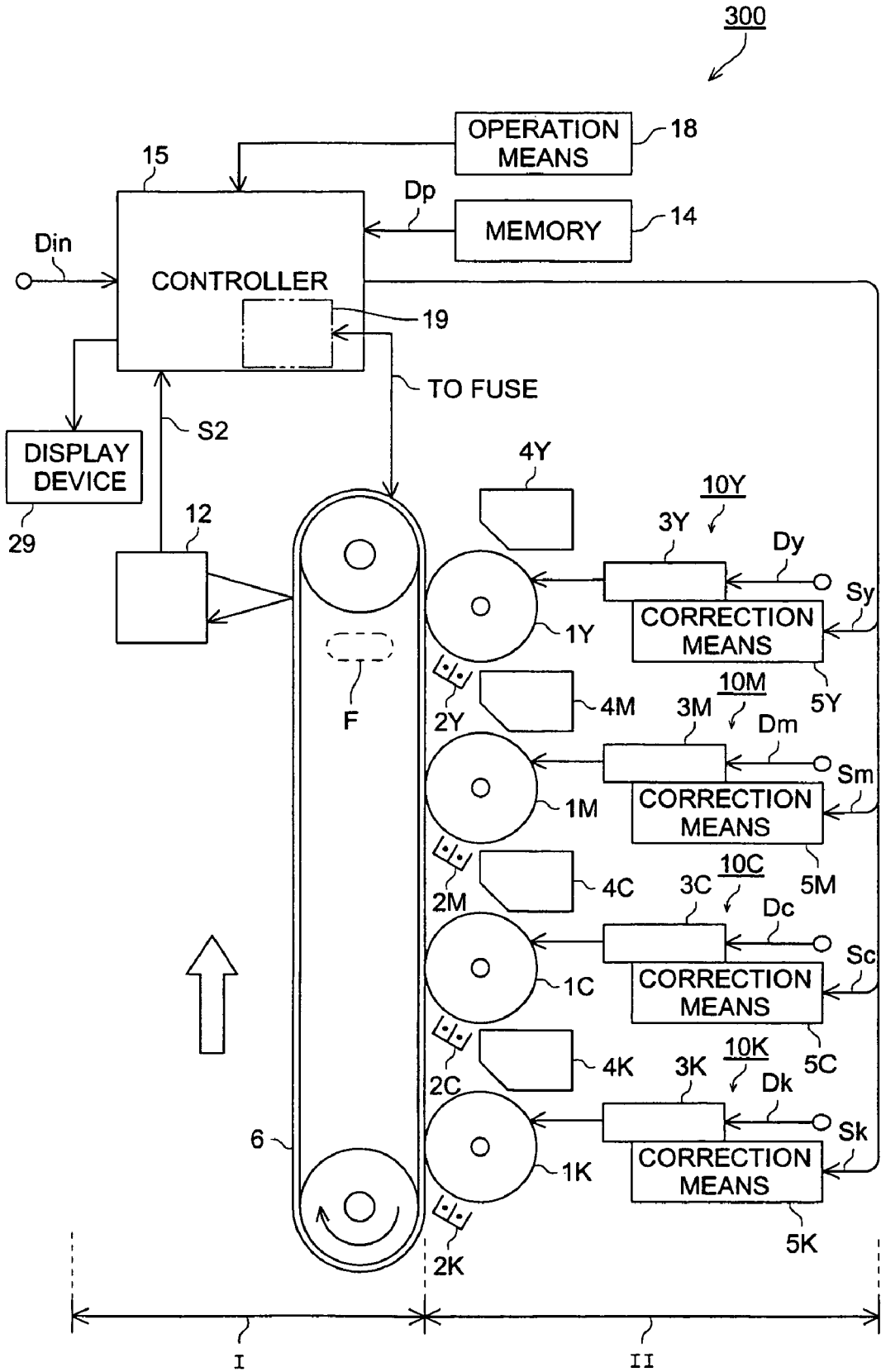
FIG. 16 is a block drawing showing an example of the structure of the image transfer system and the image forming system of a color image forming apparatus 300 as the embodiment 3 of this invention.

FIG. 16 is a block drawing showing an example of the structure of the image transfer system and the image forming system of a color image forming apparatus 300 as the embodiment 3 of the present invention.

In this example of the embodiment, there is provided a control device 15 for controlling an intermediate transfer belt 6 and image forming units 10Y, 10M, 10C, and 10K on the basis of the position detection of mark images, mark images or reversed registration marks RCR obtained by reversing said mark images for the registration of component color images are formed on the intermediate transfer belt 6, and the image forming units 10Y, 10M, 10C, and 10K are controlled so as to adjust the forming positions of component color images on the basis of the position detection of non-reversed mark images or mark images defined by the void portions of reversed color registration marks formed on the intermediate transfer belt 6.

Owing to this, in the case where a new intermediate transfer belt 6 is used for the first time, or in the case where an old intermediate transfer belt 6 is replaced with a new one, the forming positions of component color images can be adjusted on the basis of the position detection of mark images. On the other hand, even if scratches etc. are produced on the intermediate transfer belt 6 due to the change with the passage of time caused by maintenance operations, wear of parts, etc., the forming positions of component color images can be adjusted at a high accuracy on the basis of a high-reliability position detection signal S2 with no noise signal due to scratches etc. superposed.

The color image forming apparatus 300 shown in FIG. 16 is an apparatus for forming a color image through the superposition of the component color images on the basis of arbitrary image information. Said image forming apparatus 300 comprises the intermediate transfer belt 6, and is given a function to transfer a color image onto a desired paper sheet P. Along this intermediate transfer belt 6, there are provided the image forming units 10Y, 10M, 10C, and 10K given a function to form a color image. A plurality of registration sensors 12 which are an example of the detection means are disposed above the intermediate transfer belt 6, and are given a role to detect the positions of the mark images formed on the intermediate transfer belt 6.

The control device 15 is connected to the registration sensors 12, and controls the intermediate transfer belt 6 and the image forming units 10Y, 10M, 10C, and 10K on the basis of the output of these registration sensors 12. The control device 15, at least, in accordance with the state of use of the intermediate transfer belt 6, controls obtained by reversing said mark images for the registration of component color images are formed on the intermediate transfer belt 6, and the positions of forming component color images are adjusted on the basis of the position detection of the color registration marks CR or the color registration marks CR defined by the void portions of the reversed color registration marks RCR formed on the intermediate transfer belt 6.

A storage device 14 is connected to the control device 15, and is given a role to store mark image information for forming color registration marks CR and reversed mark image data DP for forming reversed color registration marks RCR. Of course, the way of handling the information is not limited to this, and also it is appropriate that mark image information for forming mark images for the registration of component color images are stored in the storage device 14, and at the time of the detection of color registration marks CR, reversed mark image data DP are prepared on the basis of the mark image information and the pattern width, in order to form reversed color registration marks RCR as the reversed ones of the mark images on the intermediate transfer belt 6 on the basis of the reversed mark image data DP.

In this example, with the running direction of the intermediate transfer belt 6 taken as the sub-scanning direction and the direction perpendicular to the sub-scanning direction taken as the main scanning direction, the plural registration sensors 12 are arranged in the main scanning direction. By doing this, the surface state of the color image formation surface of the intermediate transfer belt 6 (hereinafter referred to as the registration mark formation area) can be detected with respect to its plural divisional parts for the respective sensors. Accordingly, for each of the divisional registration mark formation areas extending in the sub-scanning direction to be detected by the concerned registration sensor 12, mark image information or reversed mark image information for forming color registration marks CR or reversed color registration marks RCR can be selected from the storage device 14.

In this example, a developing device 4Y for forming a toner image of the color Y on the intermediate transfer belt 6 is provided in the image forming unit 10Y, a developing device 4M for forming a toner image of the color M is provided in the image forming unit 10M, a developing device 4C for forming a toner image of the color C is provided in the image forming unit 10C, and a developing device 4K for forming a toner image of the color BK is provided in the image forming unit 10K; toner image portions of the colors Y, M, C, and BK formed on the intermediate transfer belt 6 make up the reversed registration marks RCR of the respective colors, and the void portions where no toner particle exists represent the mark images. In addition, as regards items having the same name and sign as those explained in the embodiment 1, the explanation will be omitted because they have the same function.

The control device 15 detects the surface state of the registration mark formation area of the intermediate transfer belt 6 by means of the registration sensors 12, and judges whether or not the surface state of the intermediate transfer belt 6 is good on the basis of the output of the registration sensors 12 to control the selection and reading of information in the storage device 14. In this example, the registration sensors 12, the storage device 14, and the control device 15 make up a mark detection judging means 80.

In the mark detection judging means 80, the surface state of the registration mark formation area of the intermediate transfer belt 6 is detected, and in the control device 15, a detection unable flag FG is prepared. This detection unable flag FG is used as the basis of the judgment concerning whether or not the registration sensors 12 will make an erroneous detection at the time of the detection of color registration marks.

In this example, the control device 15 receives the detection output of the registration sensors 12, and controls the image forming units 10Y, 10M, 10C, and 10K so as to form color registration marks CR or reversed color registration marks RCR as the reversed ones of said color registration marks CR on the registration mark formation area in accordance with the surface state of the intermediate transfer belt 6.

Now, let it be the first adjustment mode, a mode in which it is practiced the processing of forming color registration marks CR on the intermediate transfer belt 6 on the basis of mark image information (hereinafter referred to also as the first mark producing method), and adjusting the forming positions of component color images on the basis of the position detection of the color registration marks CR formed on the intermediate transfer belt 6. Further, let it be the second adjustment mode, a mode in which it is practiced the processing of forming reversed color registration marks RCR on the intermediate transfer belt 6 on the basis of reversed mark image data DP (hereinafter referred to also as the second mark producing method), and adjusting the forming positions of component color images on the basis of the position detection of the marks images defined by the void portions of the reversed color registration marks RCR formed on the intermediate transfer belt 6.

To this control device 15, an operation means 18 and a display device 29 are connected, and an operation to set (select) either the first adjustment mode or the second adjustment mode is carried out. In the control device 15, it is practiced to control the intermediate transfer belt 6 and the image forming units 10Y, 10M, 10C, and 10K on the basis of the output of the operation means 18. A setting screen at the time of image formation is displayed on the display device 29. A touch panel with the operation means 18 incorporated is used for the display device 29.

For example, if the surface state of the registration mark formation area is good, or if the first adjustment mode is set, it is practiced that color registration marks CR are formed on the intermediate transfer belt 6 by the first mark producing method, and the forming positions of component color images are adjusted on the basis of the position detection of the color registration marks CR formed on the intermediate transfer belt 6.

Further, if the surface state of the registration mark formation area is inferior to a reference value determined beforehand, of if the second adjustment mode is set, it is practiced that reversed color registration marks RCR are formed on the intermediate transfer belt 6 by the second mark producing method, and the forming positions of component color images are adjusted on the basis of the position detection of the color registration marks CR defined by the void portions of the reversed color registration marks RCR formed on the intermediate transfer belt 6.

In this example, a fuse F for detecting a new belt is further provided at the intermediate transfer belt 6. This fuse F is connected to a discrimination circuit 19. The discrimination circuit 19 is provided, for example, in the control device 15, operates to output a new belt detection signal based on the melting-off or no melting-off of the fuse F, and melts off the fuse F on the basis of an externally set signal.

In this example, the control device 15 controls the image forming units 10Y, 10M, 10C, and 10K so as to form color registration marks CR or reversed color registration marks RCR as the reversed ones of said color registration marks CR on the registration mark formation area of the intermediate transfer belt 6 on the basis of a new belt detection signal obtained from the discrimination circuit 19 for the intermediate transfer belt 6.

Further, in the case where the control device 15 has already controlled the image forming units 10Y, 10M, 10C, and 10K on the basis of the second adjustment mode, if a new belt detection signal Snd obtained from the discrimination circuit 19 indicates that "the intermediate transfer belt is new", the control device 15 is made to switch over the mode from the second to the first, to control the image forming units 10Y, 10M, 10C, and 10K. This is done for the purpose of switching over the mark producing method from the second to the first.

Figure 17:
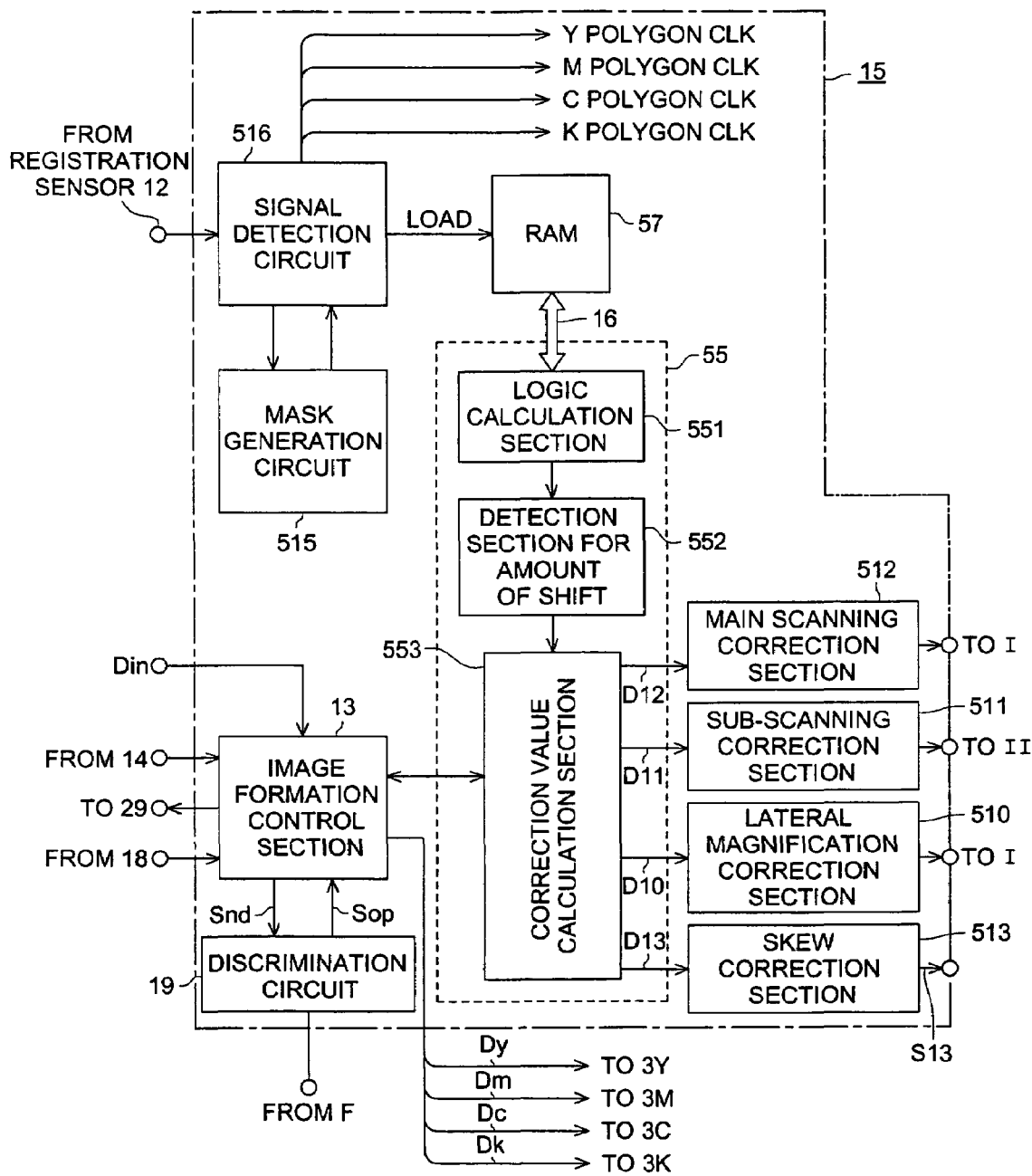
FIG. 17 is a block diagram showing an example of the internal structure of the positional deviation control system and the image formation control system of the control device 15.

FIG. 17 is a block drawing showing an example of the internal structure of the positional deviation control system and the image formation control system of the control device 15.

The control device shown in FIG. 17 is such one that further comprises, in addition to the positional deviation control system shown in FIG. 3, an image formation control system; as regards the image formation control system, it is equipped with an image formation control section 13 and the discrimination circuit 19, and as regards the positional deviation control system, it is equipped with a CPU 55, a RAM 57, a lateral magnification correction section 510, a sub-scanning correction section 511, a main scanning correction section 512, a skew correction section 513, a mask generation circuit 515, and a signal detection circuit 516. The signal detection circuit 516 is composed of an oscillator 51, a frequency divider 52, a polygonal mirror driving circuit 53, a counter circuit 54, a latch circuit 56, a D/A converter 58, and a comparator 59 as shown in FIG. 3.

The CPU 55 comprises a logic operation section 551, a deviation amount detection section 552, and a correction value calculation section 553. In the logic operation section 551, it is practiced to read out data from the RAM 57 and make logic operations. In the deviation amount detection section 552, it is practiced to detect color deviation amounts and output color deviation detection values. In the correction value calculation section 553, it is practiced to calculate correction values such as delay control data D10 for correcting the writing position, VV generation control data D11, HV generation control data D12, and skew correction data D13 on the basis of color deviation detection values.

The delay control data D10 are outputted from the correction value calculation section 553 to the lateral magnification correction section 510. The VV generation control data D11 are outputted from the correction value calculation section 553 to the sub-scanning correction section 511. The HV generation control data D12 are outputted from the correction value calculation section 553 to the main scanning correction section 512. The skew correction data D13 are outputted from the correction value calculation section 553 to the skew correction section 513. In addition, as regards items having the same name and the same sign as those shown in FIG. 3, the explanation will be omitted.

In the image formation control system 13, arbitrary image information Din is subjected to image processing, and image information for the Y-color Dy is separated and outputted to the image writing section (the exposure means) 3Y. In the same way, it is practiced that image information for the M-color Dm is outputted to the image writing section 3M, image information for the C-color Dc is outputted to the image writing section 3M, and image information for the BK-color Dk is outputted to the image writing section 3K.

To the image control system 13, the storage device 14, the operation means 18, and the discrimination circuit 19 shown in FIG. 16 are connected. In the discrimination circuit 19, it is practiced that a new belt detection signal Snd based on the melting-off or no melting-off of the fuse F provided at the intermediate transfer belt 6 is outputted and the fuse F is melted off on the basis of an externally set signal Sop.

Now, let the level "L" denote the signal logic of a new belt detection signal Snd in the case where the intermediate transfer belt is new, and let the level "H" denote the signal logic of a new belt detection signal Snd in the case where the intermediate transfer belt 6 has been used at least once; then, in the discrimination circuit 19, in the case where the fuse F is not melted off, a new belt detection signal Snd of the level "L" is outputted to the image formation control system 13. In the case where the fuse F is forcibly melted off on the basis of an externally set signal Sop, a new belt detection signal Snd of the level "H" is outputted to the image formation control system 13. An externally set signal Sop is made to be outputted through the operation means 18 to the discrimination circuit 19.

Figure 18:
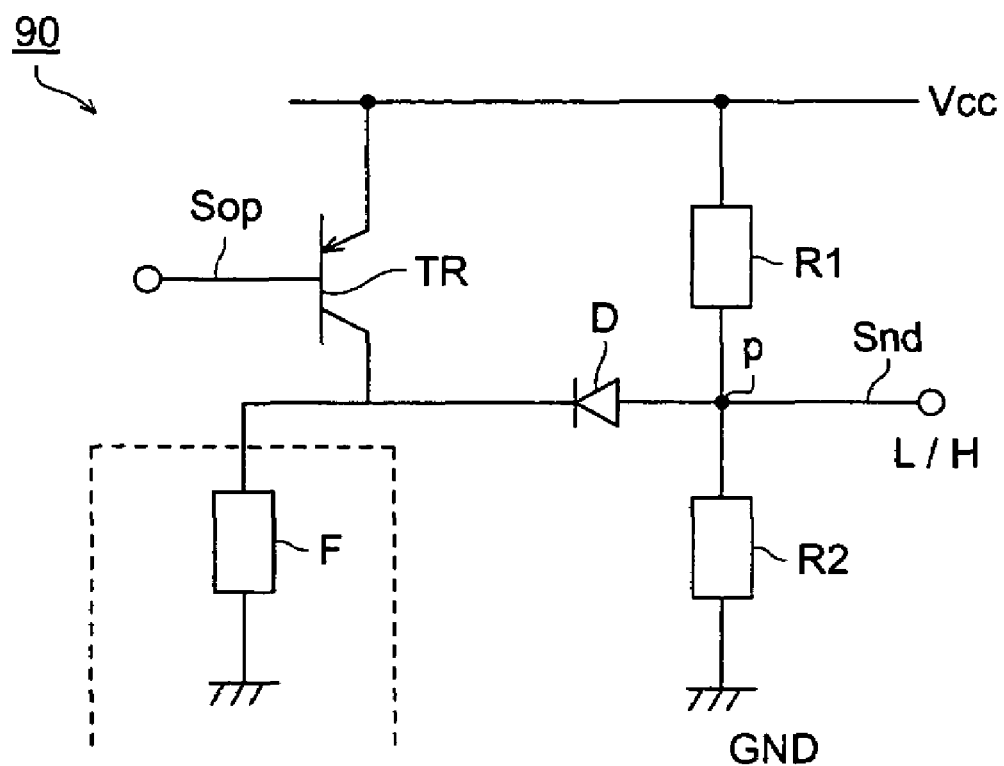
FIG. 18(A) and FIG. 18(B) are circuit diagrams showing an example of the structure of a new belt detection circuit 90.

FIG. 18(A) and FIG. 18(B) is a circuit diagram showing an example of the structure of a new belt detection circuit 90. The new belt detection circuit 90 shown in FIG. 18(A) is an example of the discrimination circuit 19, and comprises a pnp-type bipolar transistor TR, resistors R1 and R2, and a diode D. The resistors R1 and R2 are serially connected, and these serially connected resistors R1 and R2 are connected between the source line VCC and the ground line GND. The anode of the diode D is connected to the connection point p between the resistors R1 and R2, and the cathode is connected to the fuse F for the detection of a new belt.

Further, the emitter of the transistor TR is connected to the source line VCC, and the collector is connected to each of the fuse F and the cathode of the diode D. To the base of the transistor TR, an externally set signal Sop for controlling the forcible opening is supplied. In this example, when an externally set signal Sop of the high level (hereinafter referred to as "H" level) is supplied to the base of the transistor TR, the transistor TR turns on, to let an over current flow through the fuse F, and the fuse F is opened (melted off).

The electric potential at the series connection point p has the same level as the new belt detection signal Snd of the low level (hereinafter referred to as the "L" level) at the time the fuse is not melted off (closed). When the fuse F is melted off, it comes to have the same level as the new belt detection signal Snd of the "H" level, which is the division of the electric potential difference between the source line VCC and the ground line GND by the resistors R1 and R2 at the point p.

Although a fuse F is used in this example, it is also appropriate to memorized data indicating whether the belt unit is new or old in a volatile memory chip such as an EEPROM instead of it.

Figure 19:
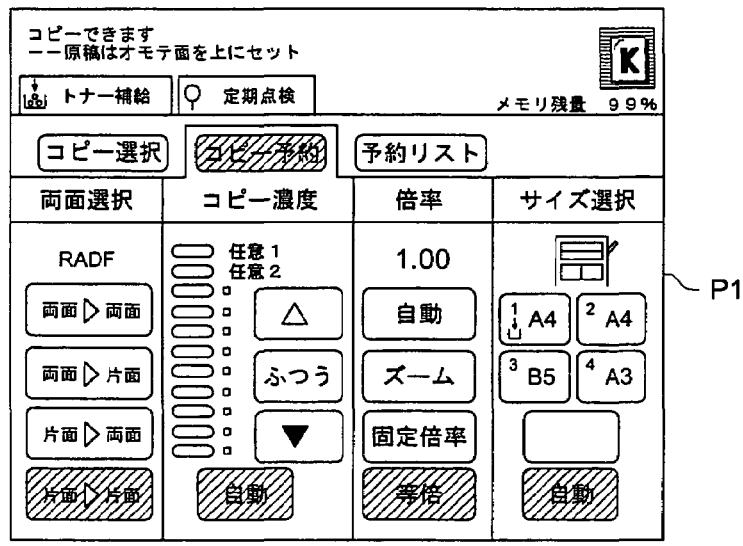
FIG. 19(A) to FIG. 19(C) are conceptual drawings showing examples of an operation screen P1 at the time of image formation in a display device 29.
Figure 19:
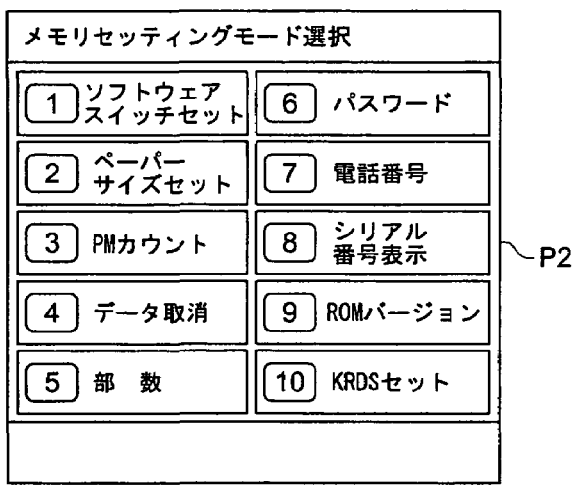
Figure 19:
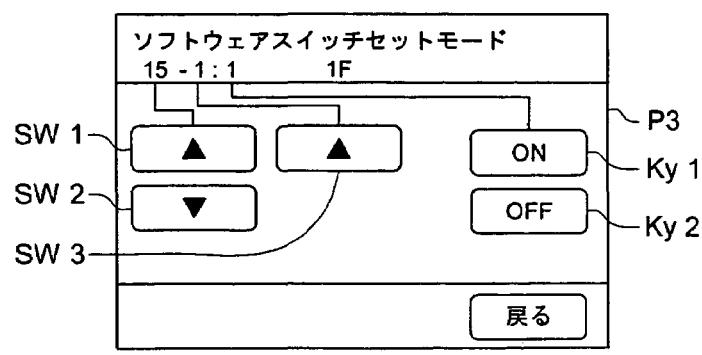

FIG. 19(A) to FIG. 19(C) are conceptual drawings showing examples of display on the operation screen at the time of image formation in the display device 29. In this example, when the copy mode is selected by the use of the operation means 18, an operation screen for key operations P1 as shown in FIG. 19(A) is displayed on the display device 29. On this operation screen P1, a message such as "Copying possible. Set your document with front page upside." is indicated, while software switches such as "Copy setting", "Copy reserving", and "Reservation list" are indicated. FIG. 19(A) shows the case where "Copy reserving" is selected.

When the software switch "Copy setting" is selected on this operation screen P1, a memory setting mode screen as shown in FIG. 19(B) is displayed. The memory setting mode screen P2 is usually operated by a service man or the like at the time of the installation of apparatus. In this memory setting mode screen, item keys such as "1 Software switch setting", "2 Paper size setting", "3 PM countcycle", "4 Data cancel", "5 Number of copies", "6 Password setting", "7 Telephone number setting", "8 Indication of serial number", "9 Indication of ROM version", and "10 KRDS setting" are indicated.

When the "1 Software switch setting" is selected out of these item keys, a software switch mode screen P3 as shown in FIG. 19(C) is displayed. In this software switch mode screen P3, an operation to set (select) either the first adjustment mode or the second adjustment mode is done. This is a screen to make it possible to set either non-reversed color registration marks CR or reversed registration marks RCR on the screen.

In the example of the software switch mode screen P3 shown in FIG. 19(C), concerning the mark detection by the registration sensors 12 etc., the second mark producing method is selected. In this example, in the software switch mode screen P3, the message "Software switch mode", "15-1:1", for example, as the "NO-A:B" in the registration mark setting screen, three software switches SW1, SW2, and SW3, an "ON" key Ky1 for settling, and an "OFF" key Ky2 for resetting are indicated.

In this screen P3, by the use of the software switches SW1 and SW2, for example, the color registration mark selection number NO="15" is selected. The software switch SW3 is used when either the automatic selection or the manual selection is set concerning the mark producing method, and when either the first or the second mark producing method is set. Automatic selection is set by the selection bit A=0, and manual selection is set by the selection bit A=1. The first mark producing method is set by the selection bit B=0, and the second mark producing method is set by the selection bit B=1.

The "ON" key Ky1 is used a setting is settled, and the "OFF" key Ky2 is used when a setting is reset. Accordingly, in this example, "15-1:1" indicates that the selection number of the color registration mark is "15", and as regards the mark producing method, the second producing method has been selected by manual selection. In addition to this, as regards the detection of color registration marks CR, it is also carried out to set by which registration sensor, 12A or 12B, the detection is to be made, and by which mark producing method the color registration marks CR are to be formed.

Figure 20:
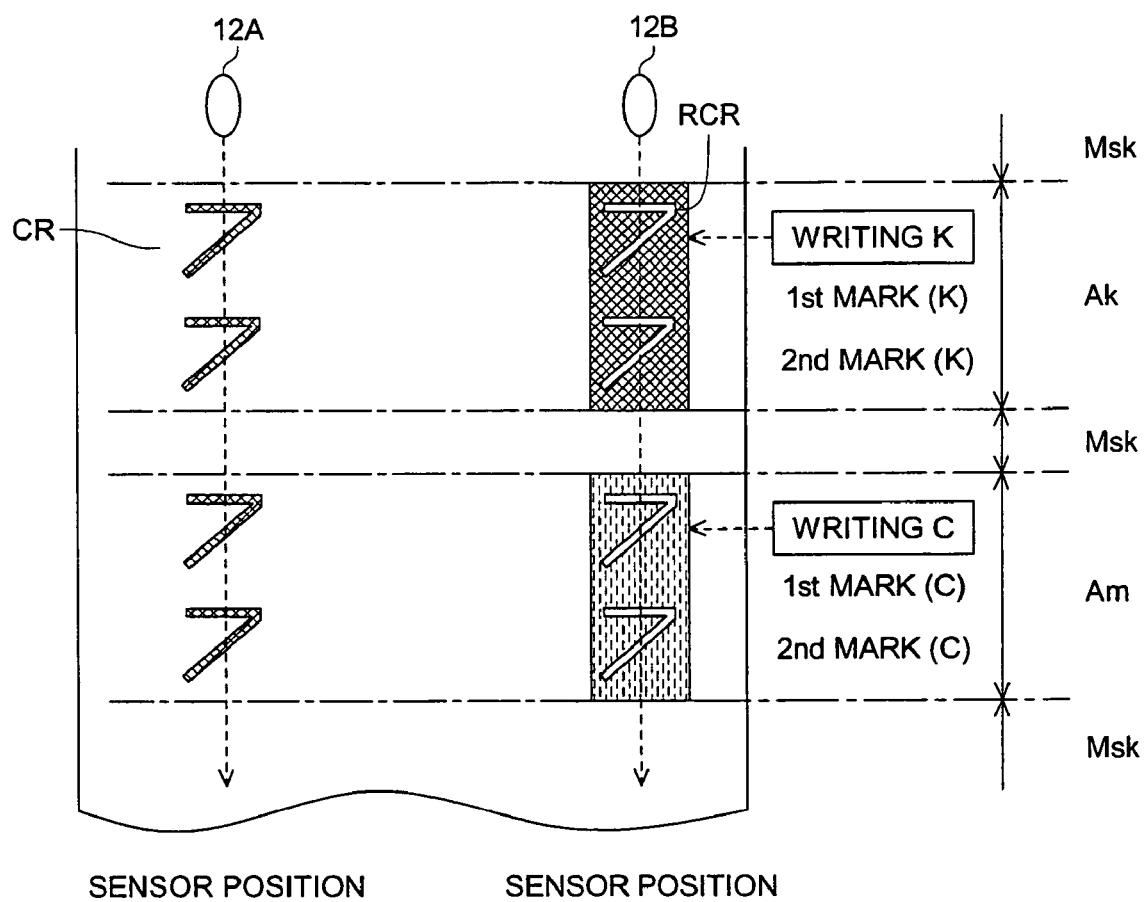
FIG. 20 is a conceptual drawing showing an example of the formation of non-reversed color registration marks CR and reversed color registration marks RCR on an image transfer member 6.

FIG. 20 is a conceptual drawing showing an example of the formation of non-reversed and reversed color registration marks CR and RCR on the intermediate transfer belt 6.

In this example, it is practiced that non-reversed color registration marks CR on the intermediate transfer belt 6 are detected by the registration sensor 12A, and reversed color registration marks RCR on the intermediate transfer belt 6 are detected by the registration sensor 12B.

In summary, non-reversed color registration marks CR and reversed color registration marks RCR are formed by the first or second mark producing method which is automatically or manually set by the software switch mode screen shown in FIG. 19(C), by the first or second mark producing method which is automatically selected on the basis of the new belt detection circuit 90, or by the first or second mark producing method which is automatically selected on the basis of the result of detection of the state of use of the intermediate transfer belt 6.

On the left side part of the intermediate transfer belt 6 which is apparently traced by the registration sensor 12A, non-reversed color registration marks CR of the colors BK, M, etc. are formed in the same way as a conventional method. On the right side part of the intermediate transfer belt 6 that is apparently traced by the registration sensor 12B, reversed color registration marks RCR of the color BK are formed in the writing K. In this example, the first mark (K) and the second mark (K) are serially formed and this registration mark formation area is a signal reading area Ak.

Further, in the writing M, registration marks of the color M are formed; in this example, the first mark (M) and the second mark (M) are serially formed, and this registration mark formation area becomes a signal reading area Am. An area other than these reversed color registration marks RCR of the colors BK, M, etc., for example, an area between the signal reading area Ak and the signal reading area Am is made to be a signal masking area Msk.

The processing for this signal masking area Msk is done in such a way that a passage timing pulse signal Sp is masked by a mask generation circuit 515 shown in FIG. 3 and FIG. 17. Further, in the deviation amount detection section 552 shown in FIG. 17, the relative amount of deviations of the first mark (M), the second mark (M), . . . , etc. are calculated, for the purpose of superposing the component color images with a good reproducibility.

Figure 21:
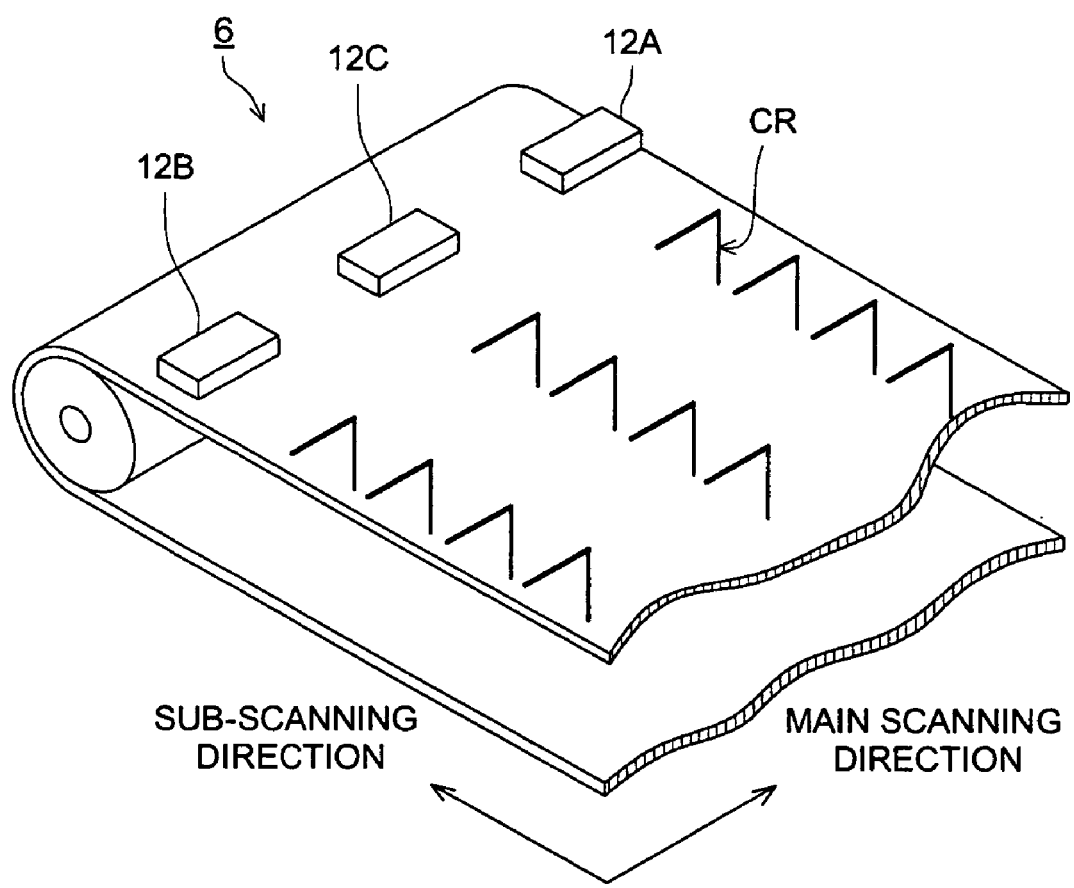
FIG. 21 is a perspective view showing another example of the arrangement of the registration sensor 12A, etc.

FIG. 21 is a perspective view showing another example of arrangement of the registration sensors 12A etc. In this example, with the running direction of the intermediate transfer belt 6 taken as the sub-scanning direction, and the direction perpendicular to the sub-scanning direction taken as the main scanning direction, a plurality of detection devices are arranged in the sub-scanning direction, and the detection of the state of the registration mark formation area of the intermediate transfer belt 6 is separately borne by the plural detection devices.

In the example of arrangement shown in FIG. 21, three registration sensors 12A to 12C are arranged. The registration sensor 12A is disposed in the right side with respect to the running direction of the intermediate transfer belt 6, the registration sensor 12B is disposed in the left side, and the registration sensor 12C is disposed at the center, to make up a detection system based on a 3 row scheme of left, right and center. For scratches produced on the registration mark formation area of the intermediate transfer belt 6 by the change with the passage of time, a mask generation method adapted for the distribution of the scratches can be selected.

That is, the surface state of the registration mark formation area of the intermediate transfer belt 6 is divided into plurality of parts of which the detection can be borne separately by this arrangement of sensors. Accordingly, for each of the divisional registration mark formation areas extending to the sub-scanning direction to be detected by the respective registration sensors 12, mark image information or reversed mark image information for forming color registration marks or reversed color registration marks can be read out selectively from the storage device 14.

Compared to the detection system of a left-and-right two-row scheme shown in FIG. 9, the detection system of a left-center-right three-row scheme makes it possible to set the first adjustment mode or the second adjustment mode for each of the divisional registration mark formation areas. Accordingly, it is possible to select either the first mark producing method or the second mark producing method for each of the registration sensors 12A, 12B, and 12C. By doing this, the toner amount of marks can be suppressed, and the influence of belt scratches on the detection of color registration marks can be also suppressed.

Figure 22:
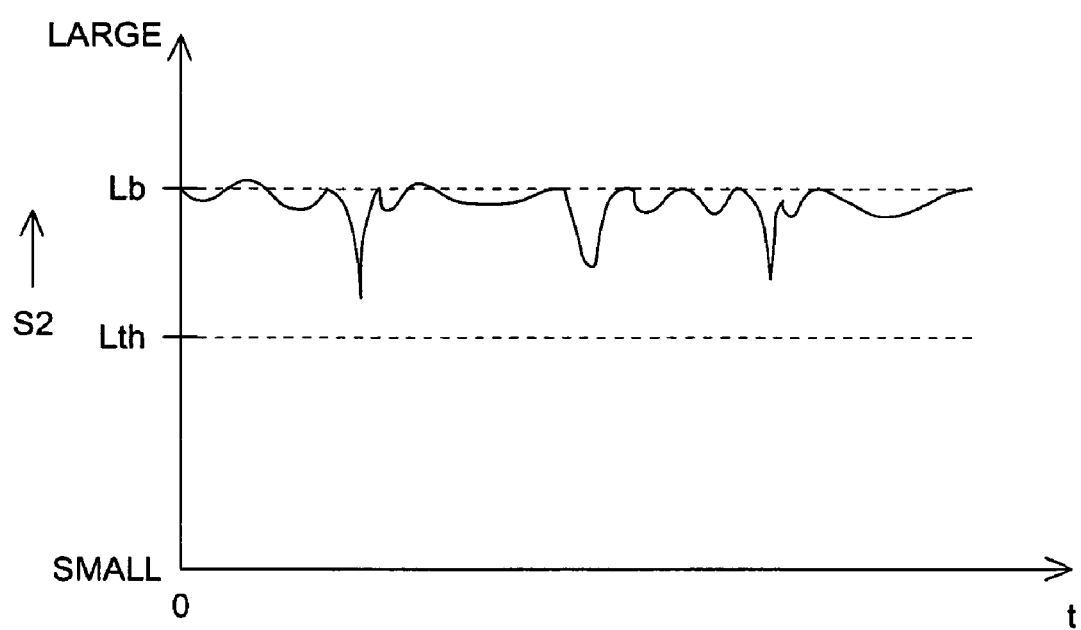

FIG. 22 is a waveform drawing showing an example of signal obtained at the time of the correction of the base level by the registration sensors 12A etc. In FIG. 22, the abscissa represents time t, and the ordinate represents the signal level of a position detection signal S2 at the time of the correction of the base level by the registration sensors 12A etc. The solid line shown in FIG. 22 is a waveform expressing the state of the registration mark formation area of the intermediate transfer belt 6 before the formation of color registration marks. The level Lb denotes the base correction level of the position detection signal S2. Lth denotes the threshold voltage.

This waveform is obtained by the detection of the registration mark formation area by the registration sensor 12A or the like through one revolution of the intermediate transfer belt 6. This processing of obtaining a waveform is called a base level correction. Whether or not an obstruction of the detection of color registration marks is present judged by whether or not a signal level lower than the threshold voltage Lth is present. According to the signal example shown in FIG. 22, a position detection signal S2 which does not come down to the threshold voltage Lth in spite of containing belt scratches etc. is detected. FIG. 22 show the case where there are no scratches becoming the obstruction of the detection of color registration marks on the intermediate transfer belt 6.

Subsequently, as regards the third image forming method of the present invention, the operation of the color image forming apparatus 300 will be explained with reference to three examples of practice.

EXAMPLE 1

Figure 23:
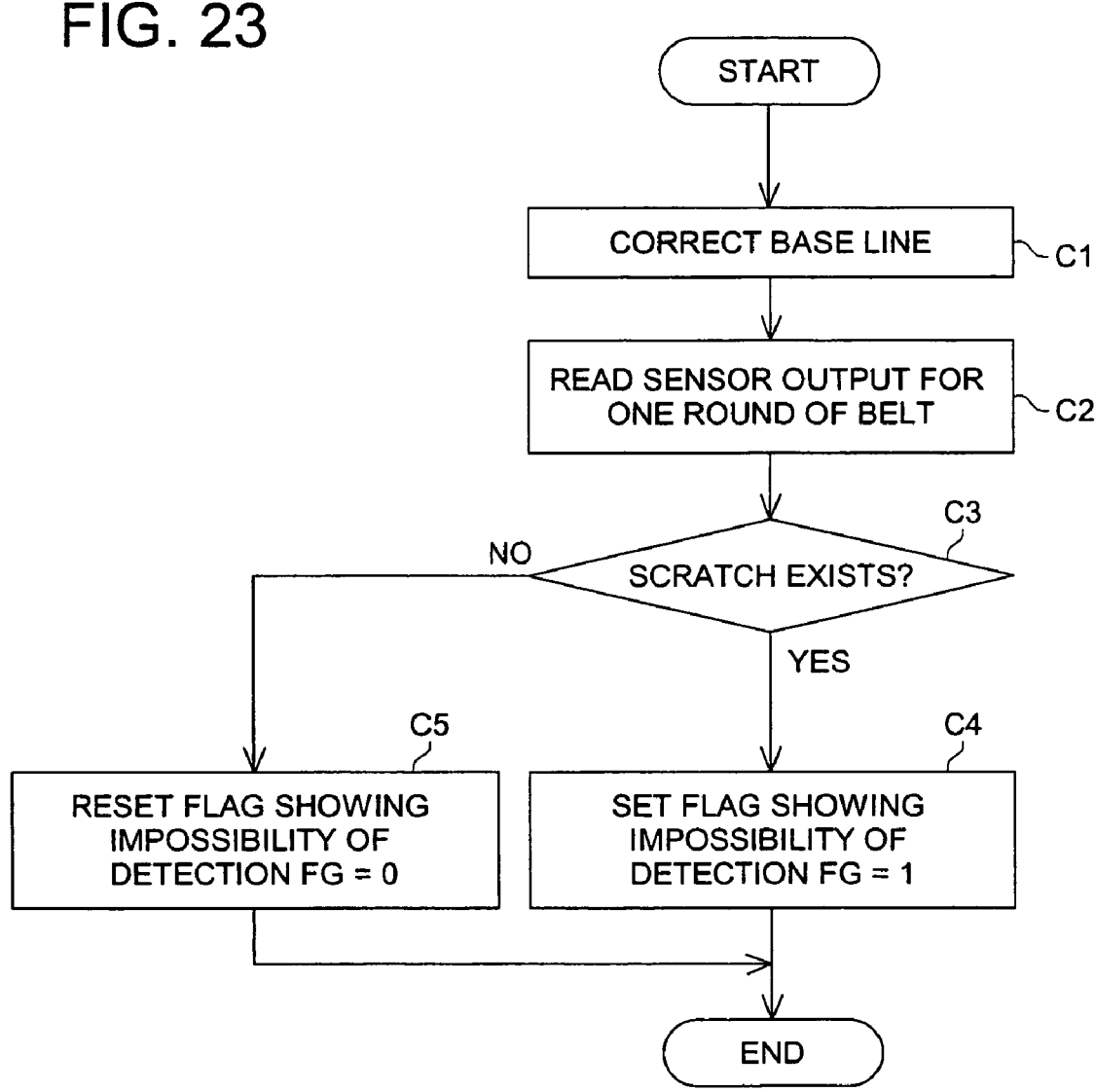
FIG. 23 is a flow chart showing an example of the operation (at the time of detecting the presence or absence of a scratch) of the color image forming apparatus 300 as the first example of this invention.

FIG. 23 is a flow chart showing an example of the operation (at the time of the detection of presence or absence of scratches) of the color image forming apparatus 300 as the first example of the present invention.

In this example, there is provided the mark detection judgement means 80 consisting of the registration sensors 12, the storage device 14, and the control device 15 explained in FIG. 16; by the registration sensors 12, the surface state of the registration mark formation area of the intermediate transfer belt 6 is detected, and in the control device 15, a detection unable flag FG is prepared. This detection unable flag FG is adopted as the basis of judgement concerning whether or not an erroneous detection is to be made by the registration sensors 12A etc. at the time of the detection of color registration marks.

With this taken as an operation condition, first, in order to detect the surface state of the registration mark formation area of the intermediate transfer belt 6, a base level correction processing is practiced in the step C1 of the flow chart shown in FIG. 23. In this processing, the registration mark formation area is cleaned through the driving of the endless-shaped intermediate transfer belt 6, and the procedure moves to the step C2, where the sensor output of the registration sensors 12A, 12B, etc. for one revolution of the belt are read in the RAM 57 or the like, for the purpose of sampling the noises during at least one revolution period of the intermediate transfer belt 6. Then, the procedure moves to the step C3, where it is judged if there is a scratch on the registration mark formation area of the intermediate transfer belt 6.

Figure 55:
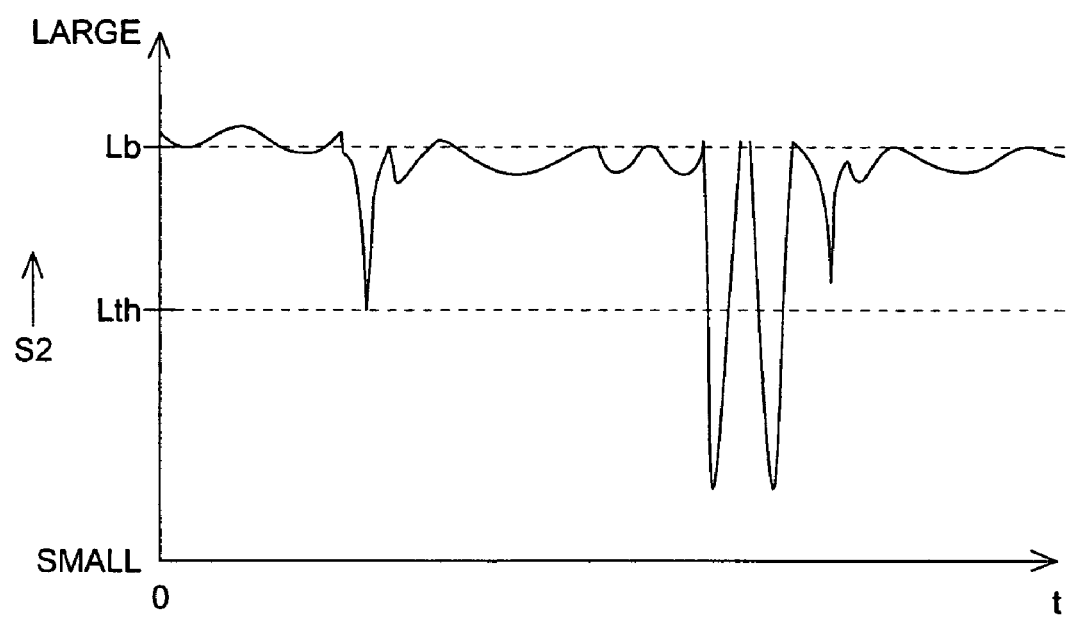

As regards the judgement of a scratch being present or not made at this time, before color registration marks CR are formed, if there is a scratch, a position detection signal S2 which comes down to a level much lower than the threshold voltage Lth from the base correction level Lb as shown in FIG. 55 is detected. If the intermediate transfer belt is a new one before no color registration mark is formed, a position detection signal S2 of a base correction level as shown in FIG. 22 is to be detected. If scratches are produced on the registration mark formation area of the intermediate transfer belt 6 due to the change with the passage of time, a position detection signal S2 of a level coming down lower than the threshold voltage Lth is detected. This position detection signal S2 is binarized by the comparator 59 at the time of the detection of color registration marks, is converted into a passage timing pulse signal Sp, and is outputted through the mask generation circuit 515 to the latch circuit 56.

In the case where a position detection signal S2 of a level coming down to a value lower than the threshold voltage Lth in the detection (grasping) processing of the state of use of the intermediate transfer belt 6, there is a possible risk of an erroneous detection being made after the formation of color registration marks. Therefore, if it is judged that there is a scratch on the intermediate transfer belt 6 in the step C3, the detection unable flag FG is set to establish FG=1 in the step C4. In contrast with this, if it is judged that there is no scratch on the intermediate transfer belt 6 in the step C3, the detection unable flag FG is reset to establish FG=0 in the step C5. The detection unable flag FG is temporarily memorized in the RAM 57.

Example of Setting of Positional Deviation Adjustment Mode

Figure 24:
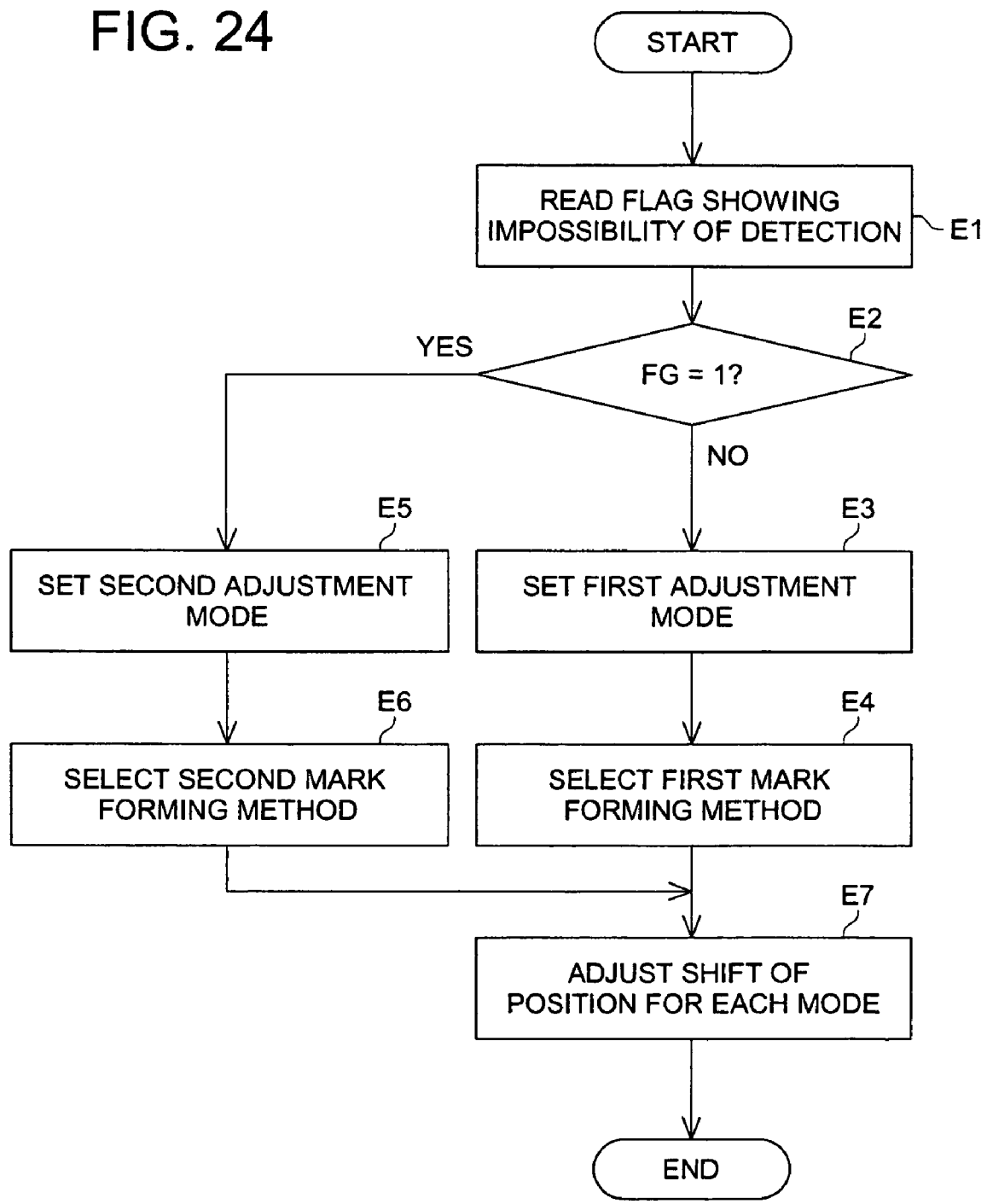
FIG. 24 is a flow chart showing an example of the setting of a positional deviation adjustment mode in the color image forming apparatus 300.

FIG. 24 is a flow chart showing an example of setting of the positional deviation adjustment mode in the color image forming apparatus 300.

In this example, when mark images are transferred onto the intermediate transfer belt 6, the control device 15 judges whether or not the surface state of the intermediate transfer belt 6 is good, and in accordance with this surface state of the intermediate transfer belt 6 being good or not good, it makes a control to form color registration marks CR or reversed color registration marks RCR as the reversed ones of said color registration marks CR for the registration of the component color images on said intermediate transfer belt 6. In this example, it is practiced that the first adjustment mode or the second adjustment mode is set in accordance with the result of the judgement of the control device 15, and after that, the first mark producing method or the second mark producing method is selected to carry out the mark detection.

As for the method of forming color registration marks CR, the first mark producing method in which the effective mark portions to make up non-reversed color registration marks CR are toner images, and the second mark producing method in which areas other than the effective mark portions to make up reversed color registration marks RCR are toner images are prepared. Of course, mark image information for forming color registration marks CR and reversed mark image data DP for forming reversed color registration marks RCR are also prepared beforehand.

With this taken as an operation condition, in the step E1 of the flow chart shown in FIG. 24, the CPU 55 reads out the detection unable flag FG corresponding to the surface state of the registration mark formation area from the RAM 57. Then, in the step E2, it judges whether or not the detection unable flag FG=1. If the equation FG=1 is not established, in other words, in the case where FG=0 and the surface state of the registration mark formation area is good, the procedure moves to the step E3, where the first adjustment mode is set, and after that, the procedure moves to the step E6, where the first mark producing method is selected. Then, the procedure moves to the step E7.

In contrast with the above, if the detection unable flag FG=1 in the step E2, in other words, in the case where the position detection signal S2 concerning the surface state of the registration mark formation area has a level lower than a threshold voltage determined beforehand, the procedure moves to the step E5, where the second adjustment mode is set. After that, procedure moves to the step E6, where the second mark producing method is selected. Then, the procedure moves to the step E7. In the step E7, positional deviation adjustment processings are carried out on the basis of the respective adjustment modes.

For example, if the first adjustment mode is set in the above-mentioned step E3, mark image information is read out according to the first mark producing method, and color registration marks CR based on this mark image information are formed on the intermediate transfer belt 6. The positions of the color registration marks formed on the intermediate transfer belt 6 are detected by the registration sensors 12A and 12B.

On the basis of the position detection of the color registration marks CR formed on the intermediate transfer belt 6, the adjustment of the forming positions of component color images are carried out. By the control device 15, on the basis of the output of the registration sensors 12A etc., with the color registration marks for the color BK taken as the reference, the image forming units 10C, 10M, and 10Y for the other colors C, M, and Y are controlled. By this control, the writing positions for the colors C, M, and Y are adjusted to come to agree with the writing position for the color BK.

Further, if the second adjustment mode is set in the step E5, reversed mark image data DP are read out according to the second mark producing method, and reversed color registration marks RCR based on this reversed mark image data DP are formed on the intermediate transfer belt 6 by the image forming units 10Y, 10M, 10C, and 10K. It is practiced to adjust the forming positions of component color images on the basis of the position detection of the mark images defined by the void portions of these reversed color registration marks RCR formed on the intermediate transfer belt 6.

Another Example at the Time of Detecting a Scratch Being Present or Not

Figure 25:
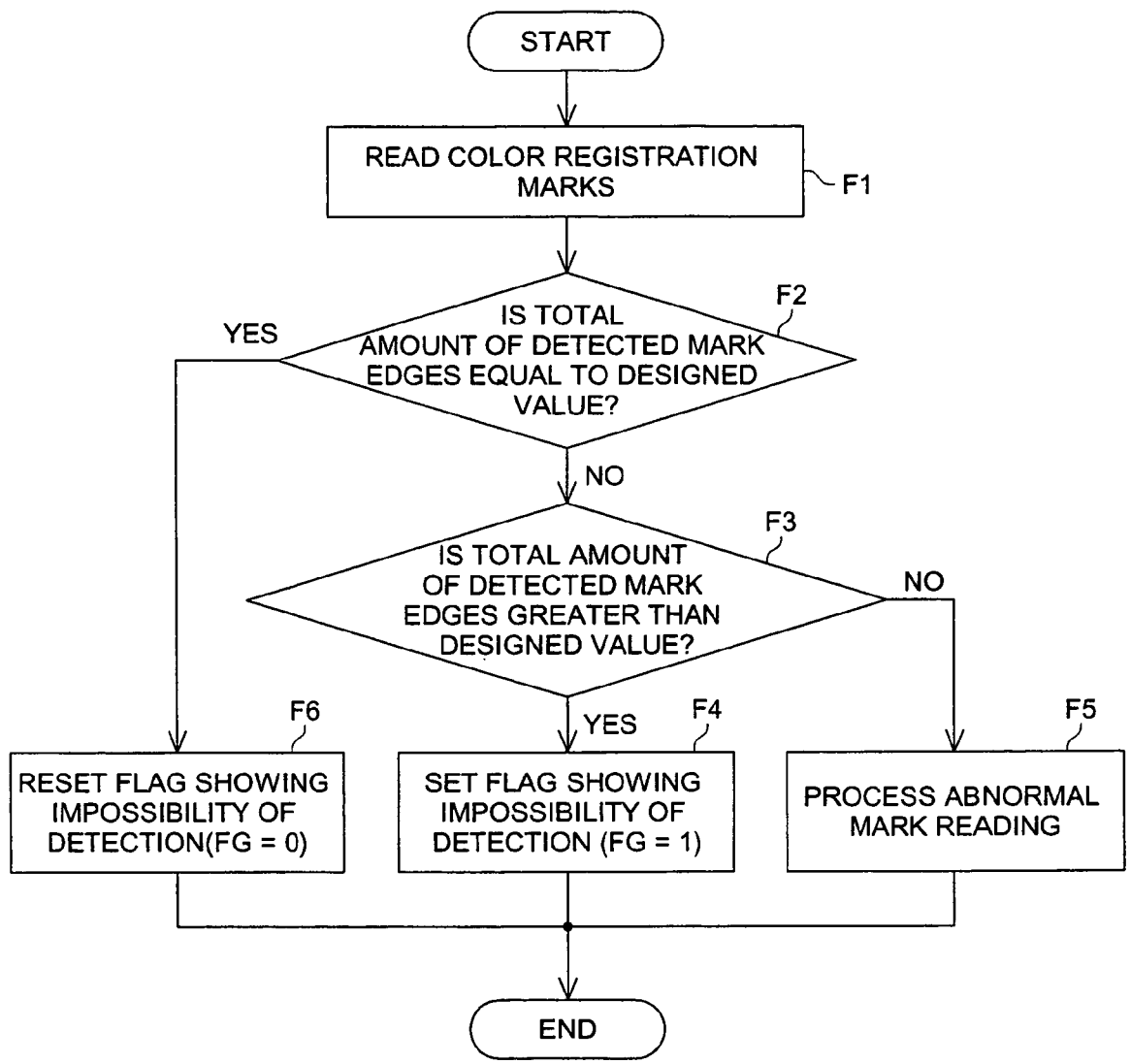
FIG. 25 is a flow chart showing another example of the operation (at the time of detecting the presence or absence of a scratch) of the color image forming apparatus 300.

FIG. 25 is a flow chart showing another example of the operation (at the time of detecting a scratch being present or not) of the color image forming apparatus 300.

In this example, there is provided the mark detection judging means consisting of the registration sensors 12, the storage device 14, and the control device 15 explained in FIG. 16; when the surface state of the registration mark formation area of the intermediate transfer belt 6 is detected by the registration sensors 12, non-reversed color registration marks CR are formed and the total number of the mark edges are compared with the design value; after that, the detection unable flag is set on the basis of the result of the comparison, and then, the adjustment mode is reconsidered.

That is, as regards non-reversed color registration marks CR, the number of mark edges to be detected at the time of detecting the marks is definite beforehand according to the design value. If there is such a scratch as to induce an erroneous detection on the intermediate transfer belt 6, the number of mark edges detected does not agree with the design value. Owing to it, the result of the calculation of color deviations becomes inappropriate to make it impossible to carry out the correction processing normally. This number of mark edges detected is adopted as the basis of the judgement whether the detection is to be regarded as an erroneous one or not. Accordingly, regardless of the presence or absence of a scratch, non-reversed color registration marks CR are formed on the intermediate transfer belt 6 by the first mark producing method.

With this taken as a prior condition, first, in order to detect the surface state of the registration mark formation area of the intermediate transfer belt 6, the sensing process of non-reversed color registration marks CR is practiced in the step F1 of the flow chart shown in FIG. 25. Then, the procedure moves to the step F2, where the number of mark edges are compared with the design value. If the total number of mark edges does not agree with the design value, the procedure moves to the step F3. In the step F3, If the total number of mark edges exceeds the design value is judged. If the total number of mark edges exceeds the design value, because the surface state of the registration mark formation area is deteriorated due to the change with the passage of time, the procedure moves to the step F4, where the detection unable flag FG is set, and FG=1 is established.

Further, if the total number of mark edges agrees with the design value in the step F2, because the surface state of the registration mark formation area is good, the procedure moves to the step F6, where the detection unable flag FG is reset, which establishes FG=0. The detection unable flag FG is memorized temporarily in the RAM 57. The processing after that is carried out in such a way as to follow the example of setting of the positional deviation adjustment mode shown in FIG. 24.

Besides, if the total number of mark edges does not reach the design value in the step F3, the procedure moves to the step F5, where a processing for abnormal mark reading is practiced. In this processing, that the formation of non-reversed color registration marks CR is not good, that setting of positional deviation adjustment mode from now on should not be made, etc. are indicated on the display device. As regards the processing after that, the same processings as those of the flow chart shown in FIG. 24.

As explained in the above, according to the color image forming apparatus and its image forming method of the example 1 of this invention, there is provided the mark detection judging means consisting of the registration sensors 12, the storage device 14, and the control device 15, the surface state of the registration mark formation area of the intermediate transfer belt 6 is detected by the registration sensors 12, and the detection unable flag FG is prepared in the control device 15. At the time of detecting color registration mark edges, whether or not an erroneous detection is to be made by the registration sensors 12A etc. is judged by the detection unable flag FG.

Accordingly, in the case where the intermediate transfer belt 6 is newly used, in the case where said intermediate transfer belt 6 has been just replaced with a new one, etc., the forming position of component color images can be adjusted on the basis of the position detection of color registration marks CR. In the case where scratches etc. are produced on the intermediate transfer belt 6 owing to the change with the passage of time caused by maintenance operations, wear of parts, etc., the scratches etc. can be covered by reversed color registration marks RCR; therefore, the proper positions of mark images can be exactly detected.

Owing to this, the forming positions of component color images can be adjusted on the basis of a high-reliability position detection signal S2 with no noise signal due to scratches etc. superposed. Further, because component color images can be exactly superposed on the intermediate transfer belt 6, it is possible to transfer a color image on a desired paper sheet P at a high accuracy.

EXAMPLE 2

Figure 26:
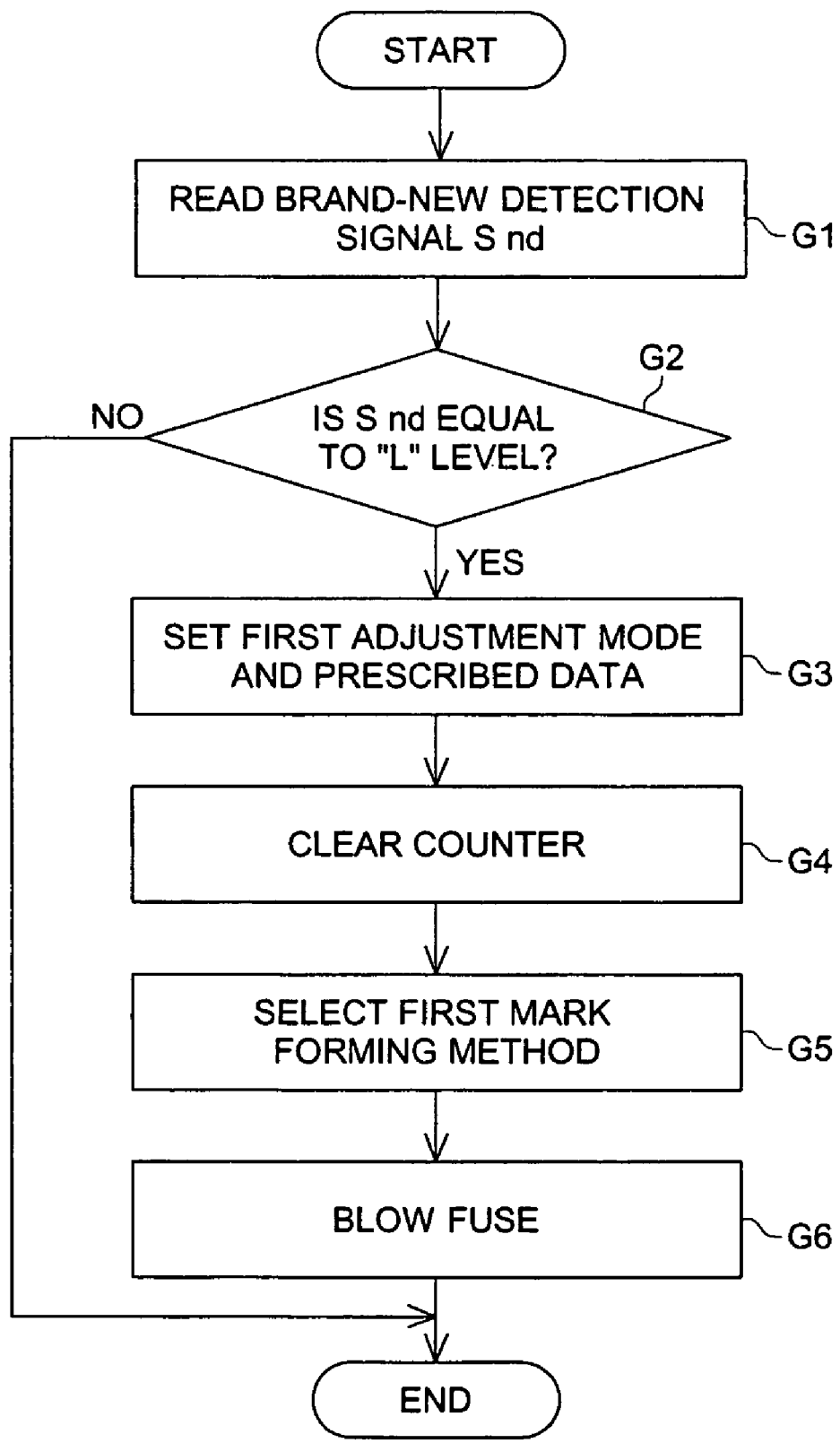
FIG. 26 is a flow chart showing an example of the operation of the color image forming apparatus 300 as the second example of this invention.

FIG. 26 is a flow chart showing an example of the operation of the color image forming apparatus 300 as the second example of the present invention.

In this example, a fuse F for detecting a new belt is attached to the intermediate transfer belt 6, and a new belt unit detection circuit 90 (NEW detection means) for melting off said fuse F is provided in the control device 15; in the case where the intermediate transfer belt 6 is newly used or in the case where said intermediate transfer belt 6 has been just replaced with a new one, the fuse F is melted off. In accordance with the result of the judgement concerning whether the fuse F is melted off or not, the mark producing method is switched over, to carry out the detection of registration marks.

This is based on it that the fuse F is in the through-conduction state when the intermediate transfer belt (the belt unit) 6 is new, and the belt unit can be judged as one in use when the fuse F is opened. As the result of this, image position adjusting processing is carried out in the first adjustment mode for adjusting the forming positions of component color images on the basis of a new belt detection signal Snd obtained from this new belt unit detection circuit 90.

With this taken as an operation condition, the control device 15 reads out a new belt detection signal Snd from the new belt unit detection circuit 90 in the step G1 of the flow chart shown in FIG. 26. Then, it is judged in the step G2 whether or not the new belt detection signal Snd is of "L" level. If the new belt detection signal Snd is of "L" level, because the belt unit is new, the procedure moves to the step G3, where the first adjustment mode is set, and a processing for setting predetermined data required is carried out.

After that, the procedure moves to the step G4, where the counter is cleared, and further, the procedure moves to the step G5, where the selection of the first mark producing method etc. are practiced. Then, the procedure moves to the step G6, where the melting-off processing of the fuse F is carried out. In this processing, the fuse F is forcibly opened by it that an externally set signal Sop is supplied to the new belt unit detection circuit 90, the transistor TR turns on, and an excessive electric current is made to flow through the fuse F to melt it off, and the belt is brought in a state of use. After the fuse F is opened, a new belt detection signal of "H" level is supposed to be outputted from the new belt unit detection circuit 90 to the control device 15.

In this example, it is practiced that non-reversed color registration marks CR are formed on the registration mark formation area of the intermediate transfer belt 6 on the basis of a new belt detection signal Snd of "L" level obtained from the new belt unit detection circuit 90. If the new belt detection signal Snd is not of "L" level in the step G2, that is, if the new belt detection signal is of "H" level and the belt unit is already in use, the procedure is completed without carrying out the new belt processing.

Besides, as shown in the first example, in the case where the setting has been switched over from the first adjustment mode to the second adjustment mode, and the control device controls the image forming units 10Y, 10M, 10C, and 10K on the basis of the second adjustment mode, when the belt unit is replaced with a new one and the new belt detection signal Snd becomes of "L" level, that is, "the intermediate transfer belt 6 is new" is indicated, it is practiced to switch over the processing automatically from the second adjustment mode to the first adjustment mode.

As explained in the above, according to the color image forming apparatus and its image forming method of the second example of the present invention, the fuse F for detecting a new belt is attached to the intermediate transfer belt 6, the control device 15 is equipped with the new belt detection circuit 90, and when the intermediate transfer belt 6 is newly used or when the intermediate transfer belt 6 has been just replaced with a new one, the fuse F is melted off. In accordance with the result of the judgement concerning whether the fuse F is melted off or not, the mark producing method is switched over, to carry out the detection of registration marks.

Accordingly, in the case where the intermediate transfer belt 6 is newly used, in the case where said intermediate transfer belt 6 has been just replaced with a new one, etc., the forming position of component color images can be adjusted on the basis of the position detection of color registration marks CR. In the case where scratches etc. are produced on the intermediate transfer belt 6 owing to the change with the passage of time caused by maintenance operations, wear of parts, etc., the scratches etc. can be covered by reversed color registration marks RCR; therefore, the proper positions of mark images can be exactly detected.

Owing to this, the forming positions of component color images can be adjusted on the basis of a high-reliability position detection signal S2 with no noise signal due to scratches etc. superposed. Further, because component color images can be exactly superposed on the intermediate transfer belt 6, it is possible to transfer a color image on a desired paper sheet P at a high accuracy.

EXAMPLE 3

Figure 27:
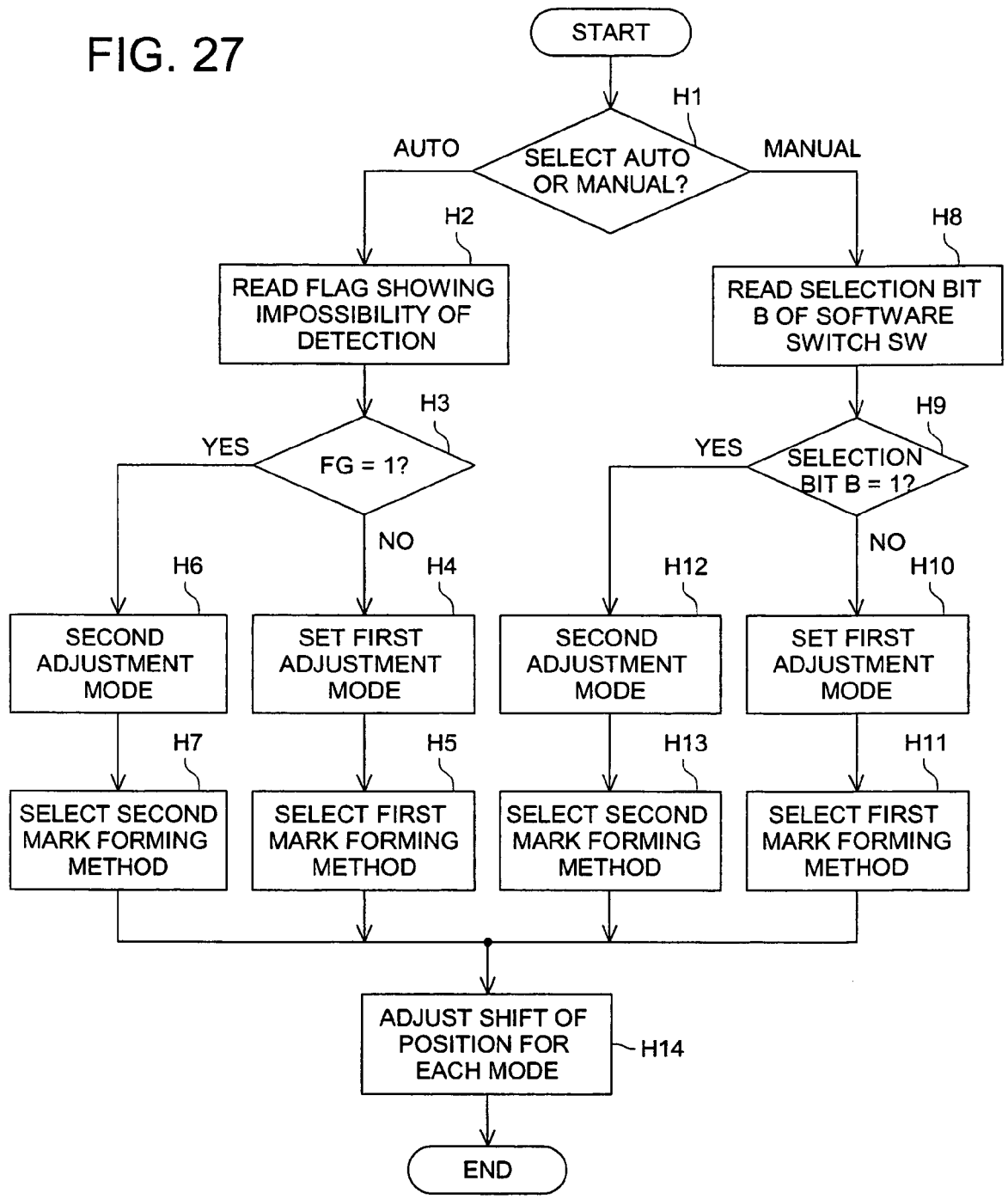
FIG. 27 is a flow chart showing an example of the operation of the color image forming apparatus 300 as the third example of this invention.

FIG. 27 is a flow chart showing an example of the operation of the color image forming apparatus 300 as the third example of the present invention.

This example is premised on the case where automatic or manual selection is set by the use of the operation means 18 shown in FIG. 16, and on the basis of this, either the first adjustment mode or the second adjustment mode is set.

With this taken as a condition of operation, the control is bifurcated in the control device 15 through the setting of automatic or manual selection in the step H1 of the flow chart shown in FIG. 27. Automatic or manual selection is set by the operation screen P1 for key operation. If the selection bit A of the software switch SW3 is "0", and automatic selection is set, the procedure moves to the step H2, where it is judged by the control device 15 whether the detection unable flag FG is "1" or "0". If the detection unable flag FG=0, the procedure moves to the step H4, where the first adjustment mode is set, and the procedure moves to the step H5, where the firs mark producing method is selected. After that, the procedure moves to the step H14.

If the detection unable flag FG=1 in the step H2, the procedure moves to the step H6, where the second adjustment mode is set, and the procedure moves to the step H7, where the second mark producing method is selected. After that, the procedure moves to the step H14.

Further, in the case where the selection bit A of the software switch SW3 is "1", and manual selection is set in the step H1, the procedure moves to the step H8, where the selection bit B of the software switch SW3 is read. Then, the procedure moves to the step H9, where it is judged whether the selection bit B is "1" or "0". If the selection bit B is "0", the procedure moves to the step H10, where the first adjustment mode is set, and the procedure moves to the step H1 , where the first mark producing method is selected. After that, the procedure moves to the step H14.

If the selection bit B is "1" in the step H2, the procedure moves to the step H12, where the second adjustment mode is set, and the procedure moves to the step H13, where the second mark producing method is selected. After that, the procedure moves to the step H14. In the step H14, in the same way as the second example, positional deviation processing is carried out on the basis of the selected adjustment mode.

For example, in the case where the first adjustment mode is set in the above-mentioned step H4 or H9, mark image information is read out according to the first mark producing method in the step H5 or H 11, and color registration marks CR based on this mark image information are formed on the intermediate transfer belt 6. The positions of the color registration marks CR formed on the intermediate transfer belt 6 are detected by the registration sensors 12A and 12B. It is practiced to adjust the forming positions of component color images on the basis of the position detection of these color registration marks CR formed on the intermediate transfer belt 6. With the color registration marks CR for the color BK taken as the reference, the control device 15 controls the image forming units 10C, 10M, and 10Y for the other colors C, M, and Y. By this control, the writing positions for the colors C, M, and Y are adjusted to come to agree with the writing position for the color BK.

Further, in the case where the second adjustment mode is set in the step H6 or H12, reversed mark image data DP are read out according to the second mark producing method, and reversed color registration marks RCR based on the reversed mark image data DP are formed on the intermediate transfer belt 6 by the image forming units 10Y, 10M, 10C, and 10K. On the basis of the position detection of the mark images defined by the void portions of these reversed color registration marks RCR formed on the intermediate transfer belt 6, it is practiced to adjust the forming positions of component color images.

As explained in the above, according to the color image forming apparatus and its image forming method of the third example of the present invention, automatic or manual selection is set by the use of the operation means 18, and on the basis of this, it is practiced to set either the first adjustment mode or the second adjustment mode.

Accordingly, in the case where the intermediate transfer belt 6 is used for the first time, in the case where said intermediate transfer belt 6 has been just replaced with a new one, etc., the forming positions of component color images can be adjusted on the basis of the position detection of color registration marks CR. In the case where scratches etc. are produced on the intermediate transfer belt 6 owing to the change with the passage of time caused by maintenance operations, wear of parts, etc., the scratches etc. can be covered by reversed color registration marks RCR; therefore, the proper positions of mark images can be exactly detected.

Owing to this, the forming positions of component color images can be adjusted on the basis of a high-reliability position detection signal S2 with no noise signal due to scratches etc. superposed. On top of it, the amount of toner used in the formation of color registration marks can be suppressed. Further, because component color images can be exactly superposed on the intermediate transfer belt 6, it is possible to transfer a color image on a desired paper sheet P at a high accuracy.

(4) Embodiment 4

Figure 28:
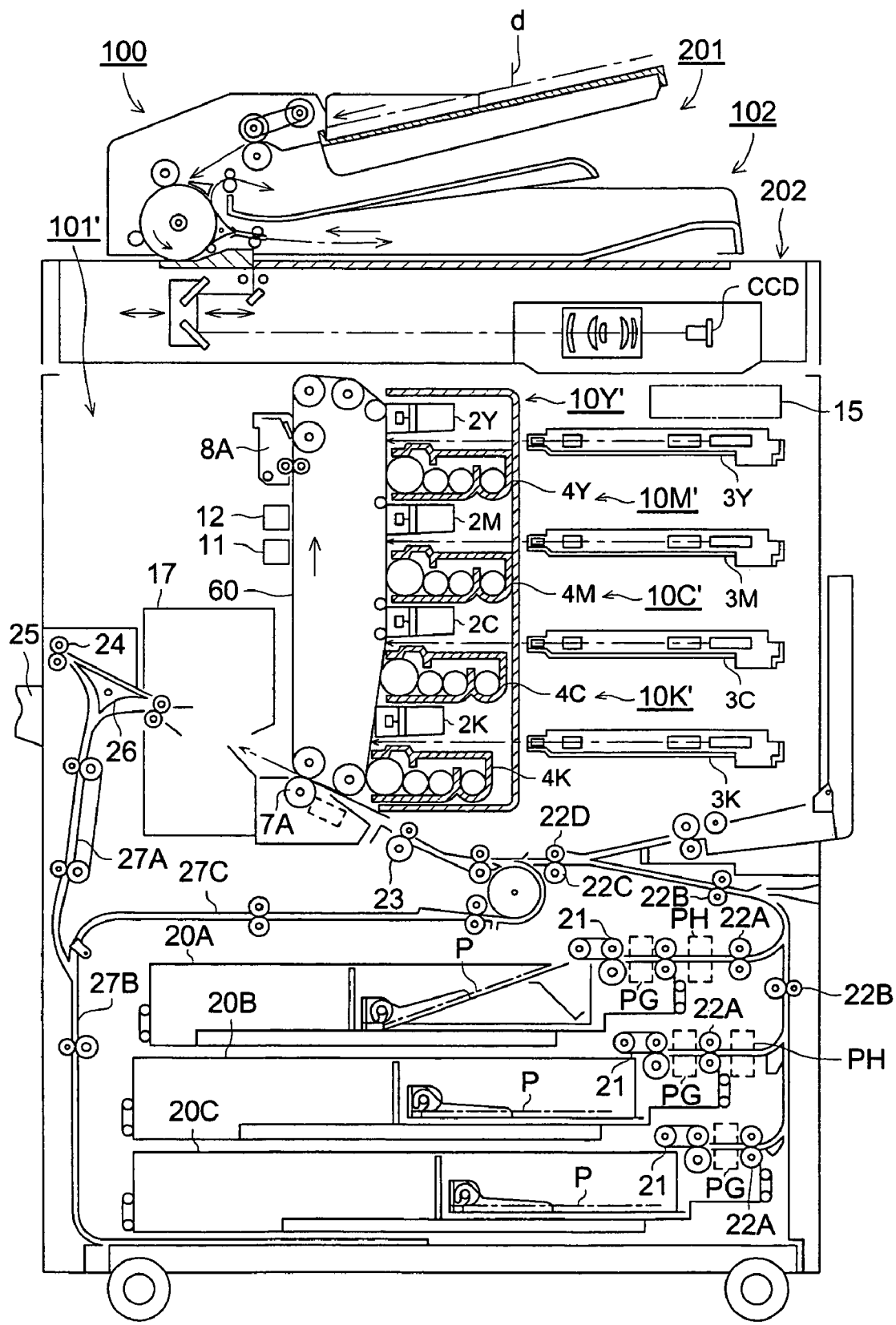
FIG. 28 is a conceptual drawing showing an example of the structure of a color image forming apparatus

FIG. 28 is a conceptual drawing showing an example of the structure of a color image forming apparatus 400 as the embodiment 4 of the present invention.

In this example of the embodiment, the intermediate transfer belt 6 as explained in the first to third image forming apparatus is omitted, and instead of it, a photoreceptor belt 60 to be commonly used by the image forming systems for the four component colors is provided, and on this photoreceptor belt 60, a color image is formed.

Of course, also in this example of the embodiment, there is provided a control device for controlling image forming units 10Y', 10M', 10C', and 10K' on the basis of the output of a density detection system and a position detection system of a color image. In this control device 15, the density of patch images for color density correction is detected by the position detection system of color images, and a binarization reference value for the position detection of mark images are corrected on the basis of a density detection signal of the patch images outputted from said position detection system.

Further, it is put into practice that even if the condition of use of the photoreceptor belt 60 is changed with the passage of time owing to the change of reflected light quantity at the photoreceptor 60, the reduction of light emission quantity of the sensors, etc., the proper positions of the mark images can be exactly detected, and the forming positions of component color images can be adjusted at a high accuracy on the basis of high-reliability position detection signals.

The color image forming apparatus 400 shown in FIG. 28 has another example of the structure of the image forming apparatus of the present invention, and is an apparatus for forming a color image through the superposition of the component color images on the photoreceptor belt 60 on the basis of arbitrary image information.

In FIG. 28, the color image forming apparatus 400 is made up of an image forming apparatus mainframe 101' and an image reading apparatus 102. On the image forming apparatus mainframe 101', the image reading apparatus 102 made up of an automatic document feeder 201 and a document image scanning exposure device 202 is mounted. A document sheet d placed on the document table of the automatic document feeder 201 is conveyed by a conveyance means, and by means of the optical system of the document image scanning exposure device 202, an image on one or both sides of the document is subjected to scanning exposure, and is read by a line image sensor CCD.

The analog signals obtained by the reading of the line image sensor CCD are subjected to an analog processing, A/D conversion, a shading correction processing, an image compression processing, etc. in an image processing section (not shown in the drawing), to become image information. After that, the image information is transmitted to image writing sections (exposure means) 3Y, 3M, 3C, and 3K, which make up the respective image forming units.

The automatic document feeder 201, in the same way as the first to third image forming apparatus, is equipped with an automatic double-sided document conveyance means. This automatic document feeder 201 reads the content of a multi-page document d fed from on the document table by a single continuous run, and the content of the document is accumulated in a storage means (an electronic RDH function). This electronic RDH function is conveniently used when the content of a multi-page document is copied by the copying function, or when a multi-page document d is transmitted by the facsimile function, for example.

The image forming apparatus mainframe 101' is what is called a tandem-type color image forming apparatus, and is composed of a plurality of image forming units (image forming system) 10Y', 10M', 10C', and 10K', an endless-shaped photoreceptor belt 60 as an example of the image forming member, a paper feed-conveyance means containing a re-feed mechanism (an ADU mechanism), and a fixing device 17 for fixing a toner image.

Compared to the first to third image forming apparatus of this invention, the image forming unit 10Y' for forming a component image of the color yellow (Y) has a photoreceptor drum and a cleaning means for the image forming member 8Y etc. taken away to the outside of the unit, and the photoreceptor belt 60 as the image forming member is commonly used by the four image forming systems for the respective colors. The image forming unit 10Y' comprises a charging means 2Y, the exposure means 3Y, and a developing means 4Y which are arranged at the respective specified positions around the photoreceptor belt facing to it. The image forming unit 10M' for forming a component image of the color magenta (M) comprises a charging means 2M, the exposure means 3M, and a developing means 4M.

The image forming unit 10C' for forming a component image of the color cyan (C) comprises a charging means 2C, the exposure means 3C, and a developing means 4C. The image forming unit 10K' for forming a component image of the color black (BK) comprises a charging means 2K, the exposure means 3K, and a developing means 4K.

The combinations of the charging means 2Y and the exposure means 3Y, the charging means 2M and the exposure means 3M, the charging means 2C and the exposure means 3C, and the charging means 2K and the exposure means 3K make up latent image forming means respectively. As regards the development by means of the developing devices 4Y, 4M, 4C, or 4K, it is practiced a reverse development process with a developing bias voltage composed of a direct-current voltage having the polarity the same as that of the toners used (negative polarity in this example of the embodiment) and an alternate-current voltage superposed applied. The photoreceptor belt 60 is entrained about a plurality of rollers and is supported in a way to be able to revolve.

The outline of an image forming process will be explained in the following. Electrostatic latent images of the respective colors are formed on the photoreceptor belt 60 by the image forming units 10Y', 10M', 10C', and 10K', and these electrostatic latent images are developed with the toners of the respective colors. A bias voltage (not shown in the drawing) of the polarity reverse to the toners used (positive polarity in this example of the embodiment) is applied to the photoreceptor belt 60. A synthesized color image (color toner image) is formed on the photoreceptor belt 60. After that, the color image is transferred from the photoreceptor belt 60 to a paper sheet P.

Further, a paper sheet P contained in a paper feed cassette 20A, 20B, or 20C is fed, in the same way as the first to third image forming apparatus of this invention, by a conveying-out roller 21 and feed roller 22A which are provided in each of the paper feed cassette 20A, 20B, and 20C, and is conveyed through conveyance rollers 22B, 22C, and 22D, a registration roller 23, etc. to a transfer roller 7A; thus, on one side (front side) of the paper sheet P, the color image is transferred.

The paper sheet P, having a color image transferred on it, is subjected to a fixing process by the fixing device 17, and is gripped by a pair of ejection rollers 17 to be placed on an output tray 25 outside the machine. The residual toner particles remaining on the circumferential surface of the photoreceptor belt 60 are removed by the image forming member cleaning means 8A, and the next image formation cycle will start. In addition, as regards the double-sided image formation processing and a paper sheet P, the explanation will be omitted because they have already been explained in FIG. 1.

At the left of the photoreceptor belt 60 in the upstream side of the above-mentioned cleaning means 8A, there is provided a sensor for detecting toner image density as an example of the first detection means (hereinafter referred to as a toner image density sensor 11 simply), which detects the density of a monochromatic (toner) image formed on the photoreceptor belt 60 to generate a density detection signal S1. Of course, the position of the sensor 11 is not limited to this, and it is also appropriate to dispose the toner image density sensor 11 and registration sensors 12 at a position shown by the broken line in FIG. 28 between the transfer roller 7A and the registration roller 23.

Located by this toner image density sensor, there are provided a plurality of sensors for detecting the positional deviation of a toner image as an example of the second detection means (hereinafter referred to as the registration sensors 12 simply), which detect the positions of mark images formed on the photoreceptor belt 60 (hereinafter referred to as color registration marks CR), to generate position detection signals S2. In the image forming apparatus mainframe 101', there is provided a control device 15, which practices color registration mark detection processing on the basis of a density detection signal S1 and position detection signals S2.

The color registration mark processing here is done in such a way that color registration marks CR for the registration of component color images are formed on the photoreceptor belt 60, and the positions (the edge, the gravity center, or the like) of these color registration marks formed on the photoreceptor belt 60 are detected by the registration sensors 12. This processing is practiced for the purpose of adjusting the forming positions of component color images on the basis of the positions of the color registration marks CR. In this example too, in the same way as the first to third image forming apparatus of this invention, even if the condition of use of the photoreceptor belt 60 changes with the passage of time, it is possible that the proper positions of the color registration marks CR are detected exactly, and the forming positions of component color images are adjusted at a high accuracy on the basis of high-reliability position detection signals S2.

Figure 29:
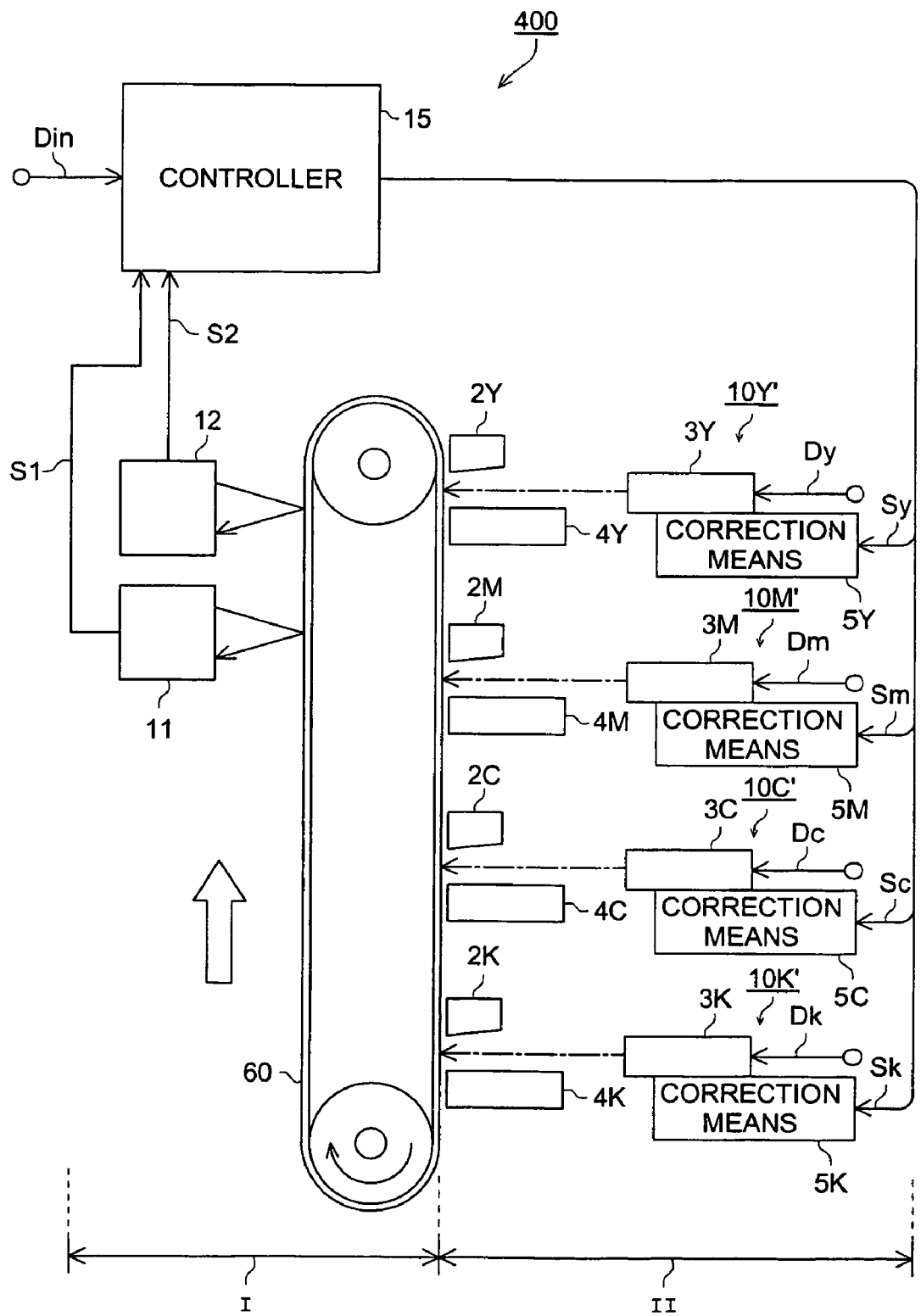
FIG. 29 is a block drawing showing an example of the structure of the image transfer system and the image forming system of a color image forming apparatus 400 as the embodiment 4 of this invention.

FIG. 29 is a block drawing showing an example of the structure of the image transfer system and the image forming system of the color image forming apparatus 400 as the embodiment 4 of the present invention. FIG. 29 is an enlarged drawing of the photoreceptor belt 60 and the image forming units 10Y', 10M', 10C', and 10K' of the color image forming apparatus 400 of FIG. 29 shown as an image transfer system I and an image forming system 11 respectively. In FIG. 29, the color image forming apparatus 400 has the control device 15. The toner image density sensor 11 is connected to the control device 15, detects the density of a toner image (monochromatic image) formed on the photoreceptor belt 60, and outputs a density detection signal S1 to the control device 15.

To the control device 15, in addition to the toner image density sensor 11, the registration sensors 12 are connected; each of these detects the position of a toner image (monochromatic image) formed on the photoreceptor belt 60, and outputs a position detection signal S2 to the control device 15. The control device 15 is supposed to control the image forming units 10Y', 10M', 10C', and 10K' on the basis of a density detection signal S1 obtained from the toner image density sensor 11 and position detection signals S2 obtained from the registration sensors 12. In this example, corrections concerning the image forming units 10Y', 10M', 10C', and 10K', etc., the adjustment of the write start position in the main scanning and sub-scanning and the position adjustment in a writing area (skew adjustment), the correction of the main scanning write clock signal (lateral magnification adjust menu partial lateral magnification adjustment), etc. are made (refer to FIG. 3).

Although it depends on the contents of the control, it is also appropriate to adopt such a method as to control one or all of the three image forming units 10Y', 10M', and 10C' with the image forming unit 10K' taken as the reference; this can reduce the burden of the control device 15. Of course, it is also possible to incorporate the photoreceptor belt 60 into the object of the control. In that case, it may be appropriate to provide a zigzag run correction mechanism (not shown in the drawing) and correct a zigzag run of the photoreceptor belt 60 for the correction of color deviations.

To the control device 15, the image forming units 10Y', 10M', 10C', and 10K' are connected; the operation is as follows: by the image forming unit 10Y', a toner image of the color Y is formed on the photoreceptor belt 60 on the basis of image information for the Y-color Dy, which is a component of arbitrary image information Din, by the image forming unit 10M', a toner image of the color M is formed on the photoreceptor belt 60 on the basis of image information for the M-color Dm, by the image forming unit 10C', a toner image of the color C is formed on the photoreceptor belt 60 on the basis of image information for the C-color Dc, and by the image forming unit 10K', a toner image of the color BK is formed on the photoreceptor belt 60 on the basis of image information for the BK-color Dk.

In this example, a correction means 5Y is attached to the image writing section (exposure means) for the Y-color 3Y, and is given a function to adjust the forming position of an image of the color Y on the basis of a writing position correction signal for the Y-color Sy from the control device 15. In the same way, a correction means 5M is attached to the image writing section for the M-color 3M, and is given a function to adjust the forming position of an image of the color M on the basis of a writing position correction signal for the M-color Sm from the control device 15.

A correction means 5C is attached to the image writing section for the C-color 3C, and is given a function to adjust the forming position of an image of the color C on the basis of a writing position correction signal for the C-color Sc from the control device 15. A correction means 5K is attached to the image writing section for the BK-color 3K, and is given a function to adjust the forming position of an image of the color BK on the basis of a writing position correction signal for the BK-color Sk from the control device 15. In this example, as regards the calculation of the amounts of color deviations, color registration marks CR for the color BK are taken as the reference. This is done for the purpose of adjusting the writing positions of component images of the colors Y, M, and C to make them agree with the writing position of a component image of the color BK.

As regards the writing position adjustment for the color Y, as has been explained in the embodiment 1, the writing position of the color registration marks CR of the color BK and the writing position of the color registration marks CR of the color Y are detected, and the correction value is calculated from the amount of deviation obtained by the conversion operation of the writing position of the color registration mark CR of the color Y into the writing position of the color registration mark CR of the color BK. In the same way, also as regards the writing position adjustment for the color M or C, the amount of the deviation of the writing position of the color registration marks of the color M or C from the writing position of the color registration marks of the color BK is detected, and from this amount of deviation, each correction value is calculated. After that, the image forming units 10Y', 10M', and 10C' for the colors Y, M, and C except the image forming unit 10K for the color BK are subjected to the adjustment.

For this purpose, in the image forming unit 10K for the color BK, by the output of toner images of the color BK only onto the photoreceptor belt 60, a normal writing position adjustment in the main scanning and sub-scanning and a lateral magnification adjustment, a partial lateral magnification adjustment, a skew adjustment, etc. in the image writing section 3K are made. This is done for the purpose of taking the color BK as the reference in the adjustment. After that, the process is moved to the color registration adjustment using a method of this invention, in which the registration adjustment for making the writing positions of component images of the colors Y, M, and C agree with the writing position of a component image of the color BK is practiced.

Further, by the control device 15, the image forming units 10Y', 10M', and 10C' are controlled to form patch marks for the color density correction as an example of the aforesaid patch image on the photoreceptor belt 60. The density of the patch marks formed on the photoreceptor belt 60 is detected by the registration sensors 12. After that, the densities of color registration marks CR for the registration of component color images are adjusted on the basis of the densities of the patch marks, and the image forming units 10Y', 10M', 10C', and 10K' are controlled to form color registration marks CR having their density adjusted in the above-mentioned way on the photoreceptor belt 60 by the control device 15.

The positions of color registration marks formed on the photoreceptor belt 60 are detected by the registration sensors 12. The control device 15 becomes able to correct in real time the threshold voltages Lth for the detection of the positions of color registration marks CR on the basis of a density detection signal S2' of patch marks outputted from the registration sensor 12. The image forming units 10Y', 10M', 10C', and 10K' are subjected to a control to adjust the forming positions of component color images on the basis of the above-mentioned positions of color registration marks CR.

In this example, the minimum value of a density detection signal S2' in the non-formation area of the patch marks and the maximum value of it in the formation area of said patch marks outputted from the registration sensor 12 are detected, and the average value is calculated on the basis of these minimum value and maximum value.

That is, the reason of the calculation being done in the above-mentioned way is that the relation between the output value due to the reflection light from a base area without the patch marks and the output value due to the reflection light from a formation area of the patch marks being close to each other makes the condition for determining the threshold voltage of binarinzation worst. Therefore, by the use of values corresponding to the above-mentioned worst case, the average value (the median) is derived to determine the threshold voltage of binarinzation. In this example, with the aforesaid average value determined to be the binarization reference value for the detection by the registration sensor 12, the passage timing of a color registration mark CR is detected on the basis of the above-mentioned binarization reference value. The binarization reference value for the detection by the registration sensor 12 may be a value close to the average value.

Of course, the way of position detection is not restricted to this, and also it is appropriate that, in one and the same sequence, patch marks for the correction of color density are formed on the photoreceptor belt 60 by the control device 15, the density of the patch marks formed on the photoreceptor belt 60 are detected by the toner image density sensor 11, while the density of the patch marks formed on the photoreceptor belt 60 is detected successively by the registration sensors 12. By the successive detection of the patch marks formed in detecting the patch marks by the registration sensors 12, the density of a color registration mark CR of any color to make it possible to secure the most reliable signal level can be determined.

After that, the density of color registration marks for the registration of component color images is adjusted on the basis of the density of the patch marks, color registration marks CR with their density adjusted are formed on the photoreceptor belt 60, the positions of the color registration marks formed on the photoreceptor belt 60 are detected by the registration sensors 12, and it is carried out a registration adjustment processing for adjusting the forming positions of component color images on the basis of the positions of the color registration marks CR.

In addition, as regards the example of the internal structure of the positional deviation correction system of the control device 15, please refer to FIG. 3.

Figure 30:
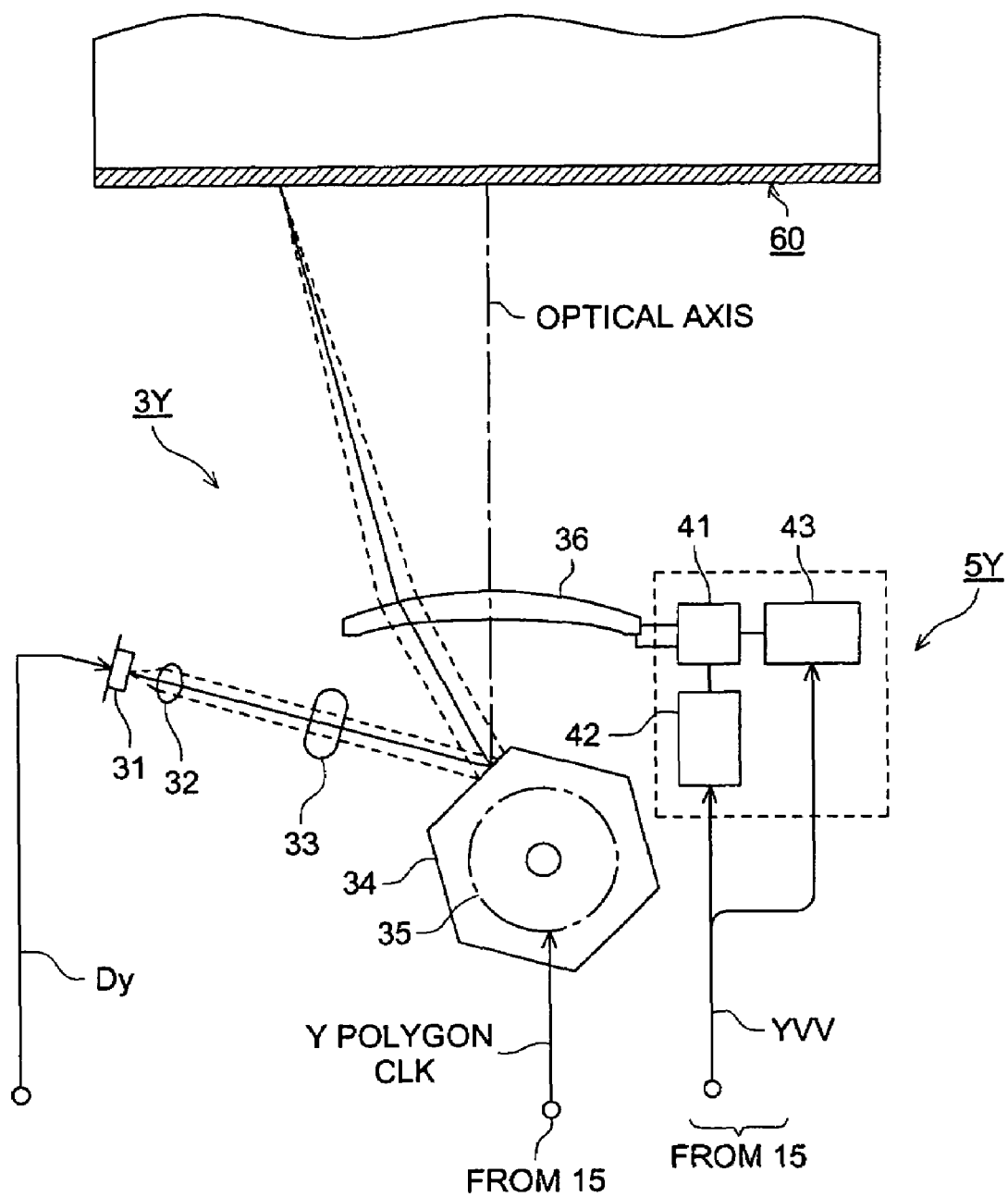
FIG. 30 is a conceptual drawing showing an example of the structure of a writing section for the Y-color 3Y and its correction means 5Y.

FIG. 30 is a conceptual drawing showing an example of the structure of the image writing section for the Y-color 3Y and its correction means 5Y. The image writing section for the Y-color 3Y comprises a semiconductor laser light source 31, optical systems 32 and 33, a polygonal mirror 34, a polygonal mirror motor 35, and an Fθ lens 36. In the semiconductor laser light source 31, a laser beam is generated on the basis of image information for the Y-color Dy. A laser beam emitted from the semiconductor laser light source 31 has its beam shape corrected to a specified one by the optical systems.

This light beam is deflected in the main scanning direction by the polygonal mirror 34. The polygonal mirror 34 is rotated by the polygonal mirror motor 35 on the basis of a Y polygon CLK from the control device 15. A light beam deflected by the polygonal mirror 34 is converged on the photoreceptor belt 60 by the Fθ lens 36.

In this image writing section 3y, there is provided the correction means 5Y. The correction means 5Y comprises a lens holding mechanism 41, an fθ lens adjusting mechanism 42, an optical axis adjusting mechanism 43, etc. An fθ lens 36 is attached to the lens holding mechanism 41, which is movably attached to the fθ lens adjusting mechanism 42 [and the optical axis adjusting mechanism 43]. By the fθ lens adjusting mechanism 42, the lens holding mechanism is moved to rotate the fθ lens about its optical axis perpendicular to the image formation surface on the basis of a position correction signal Sy (YVV).

The optical axis adjusting mechanism 43 makes an operation of adjustment by moving the lens holding mechanism 41 in the Z-direction (the direction of the optical axis). This mechanism 42 is embodied by the use of an actuator (a piezoelectric element), and by the control of the pitch of a full-threaded bolt. The above-mentioned mechanisms are provided for the purpose of the adjustment of the writing position of a laser beam on the photoreceptor belt 60. As regards the other image forming units 10M' and 10C', the same processing is done. By doing this way, the positional deviations of the optical system components such as the fθ lens 36 in the image forming units 10Y', 10M', 10C', and 10K' from the optimum positions can be removed.

In this example, in order to correct the binarization reference value for detecting the positions of color registration marks, patch marks are previously formed on the photoreceptor belt 60 by means of the image forming unit 10Y', 10M', 10C', or 10K'. A binarization reference value is a threshold level of binarization for use in the detection of the passage timing of a color registration mark formed on the photoreceptor belt 60.

Figure 31:
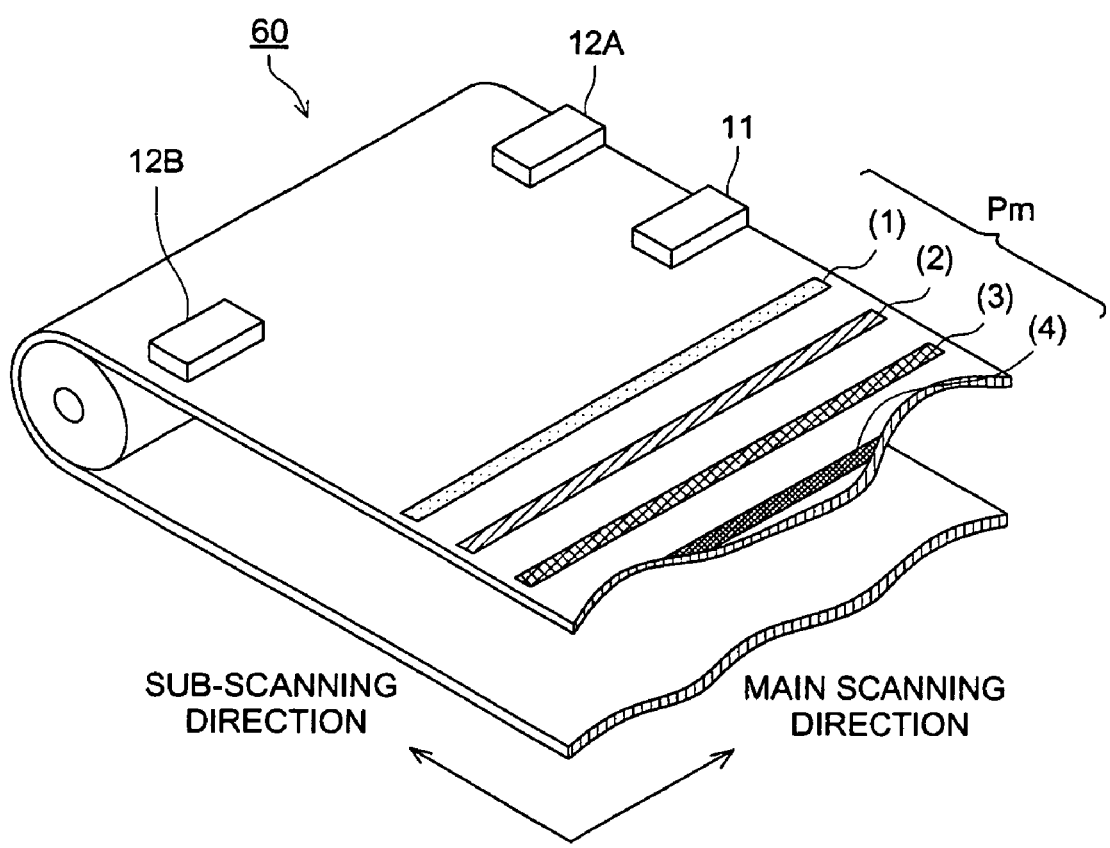
FIG. 31 is a perspective view showing an example of the arrangement of the toner image density sensor 11 and the registration sensors 12A and 12B.

FIG. 31 is a perspective view showing an example of the arrangement of the toner image density sensor 11 and the registration sensors 12A and 12B. In FIG. 31, the registration sensors 12A and 12B are provided above the portions near both the edges of the photoreceptor belt 60. In the upstream side of the registration sensor 12A, the toner image density sensor 11 is provided.

The positions of the toner image density sensor 11 and the registration sensors 12A and 12B are not limited to the positions shown in FIG. 31, but it is also appropriate to dispose them at the position between the transfer roller 7A and the registration roller 23 shown by the broken line of FIG. 28. In the case where the sensors are disposed in this position, because the detection position of color registration marks CR is close to the image formation position, compared to the case where they are disposed close to the image forming member cleaning means 8A in the upstream side of it with respect to the belt running direction, positional deviations can be detected earlier, which contributes greatly to the high-speed making of the image processing.

In this example, the toner image density sensor 11 and the registration sensor 12A are arranged serially (side by side) at the specified positions with respect to the running direction of the photoreceptor belt 60. This is done for the purpose of calibrating the registration sensors 12 on the basis of a density detection signal S1 within one revolution period of the photoreceptor belt 60. That is, the control device 15 controls, for example, the image forming unit 10K' so as to form patch marks Pm for the color density correction, namely, patches (1) to (4) having different densities respectively on the photoreceptor belt 60 beforehand.

Further, during one revolution of the photoreceptor belt 60, the density of the patch marks Pm having been formed is detected by the toner image density sensor 11, while the density of the patch marks formed on the photoreceptor belt 60 is detected successively by the registration sensors 12A etc. After that, the densities of the color registration marks for the registration of component color images are adjusted on the basis of the density values of the patch marks Pm.

Figure 6:
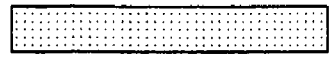
Figure 6:
Figure 6:
Figure 6:
Figure 6:
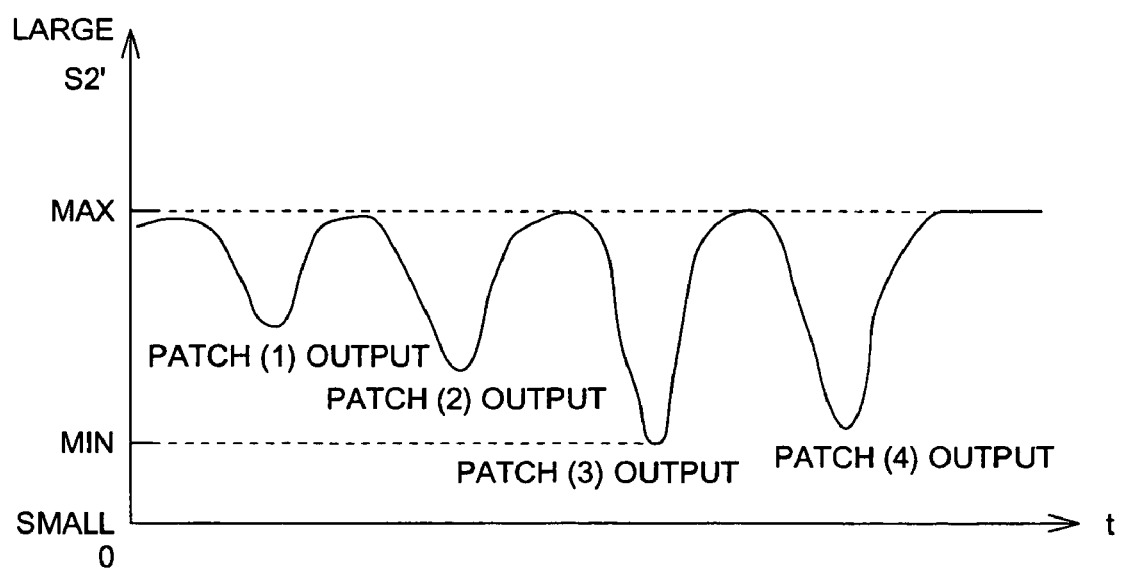
Figure 7:
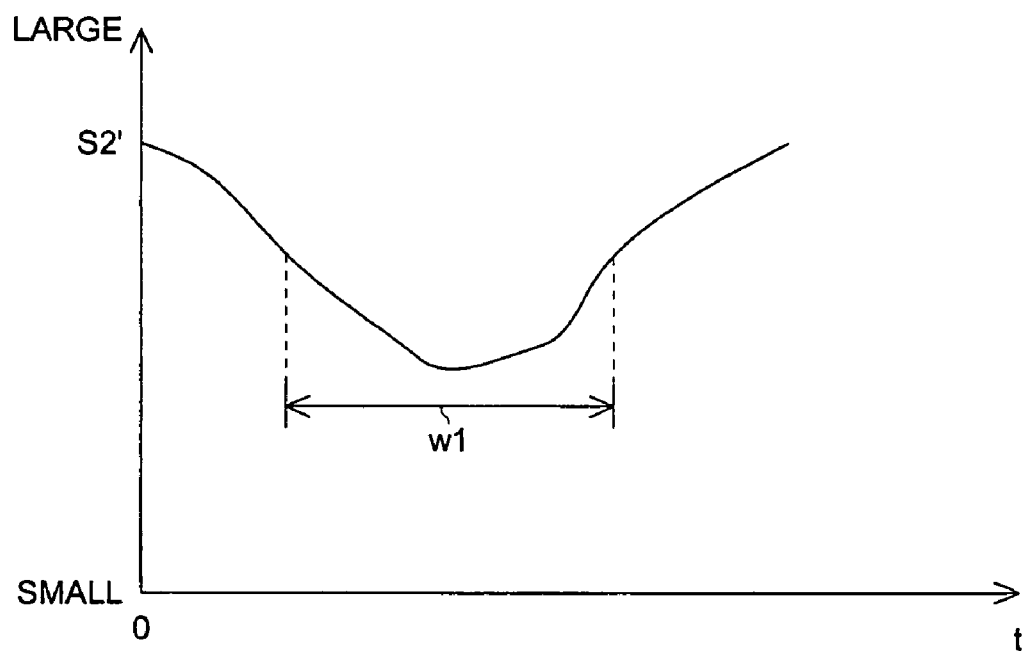
Figure 7:
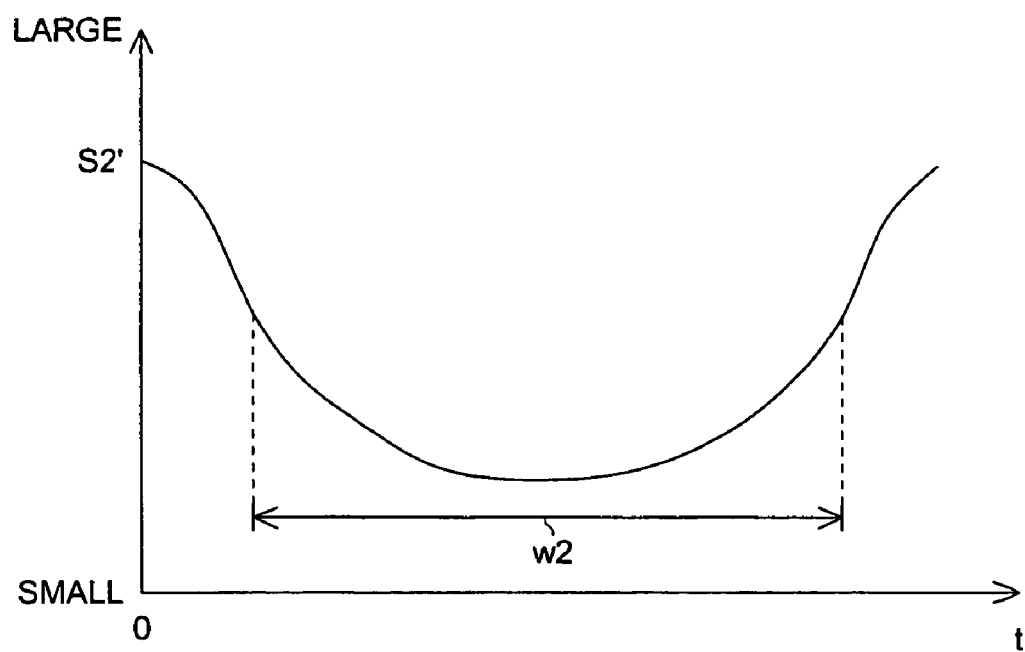

In addition, as regards the example of the density detection of the patch marks Pm by the registration sensors 12A etc., please refer to FIG. 6, and as regards the example of the waveform of a density detection signal S2' by the registration sensor 12A or the like, please refer to FIG. 7(A) and FIG. 7(B). Further, as regards the example of setting a threshold voltage based on the density detection of the patch marks Pm by the registration sensor 12A or the like, please refer to FIG. 8.

Figure 32:
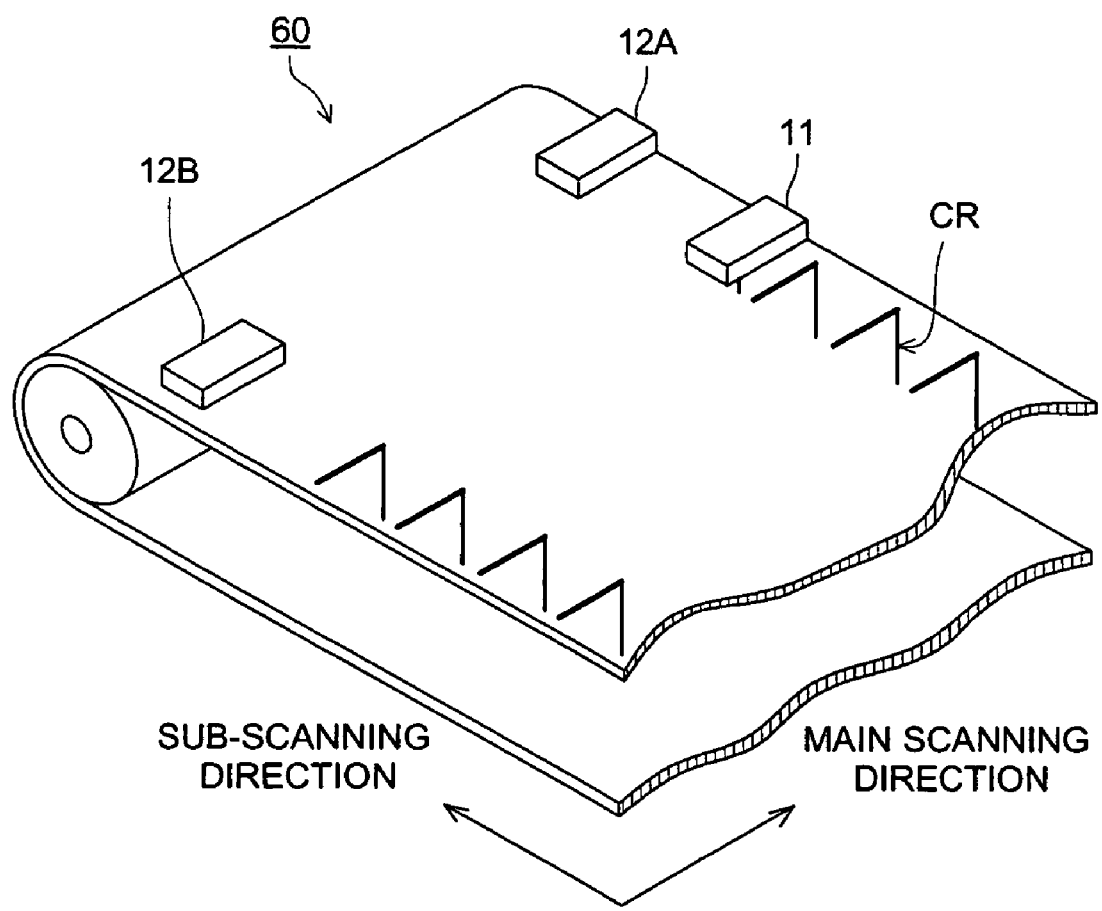
FIG. 32 is a perspective view showing an example of the detection of color registration marks CR by the registration sensors 12A and 12B.

FIG. 32 is a perspective view showing an example of the detection of color registration marks CR by the registration sensors 12A and 12B. In FIG. 32, after the density detection of the patch marks, the image forming units 10Y', 10M', 10C', and 10K' are controlled to form, for example, 7-shaped color registration marks CR having its density adjusted during the next one revolution of the photoreceptor belt 60. The positions of the color registration marks CR formed on the photoreceptor belt 60 are detected by the registration sensors 12A and 12B. Then, the control device 15 comes to practice the color registration control for adjusting the forming positions of component color images on the basis of the positions of the color registration marks CR. In addition, as regards the example of binarization of position detection signals S2 from the registration sensors 12A etc., please refer to FIG. 10(A) and FIG. 10(B).

Figure 33:
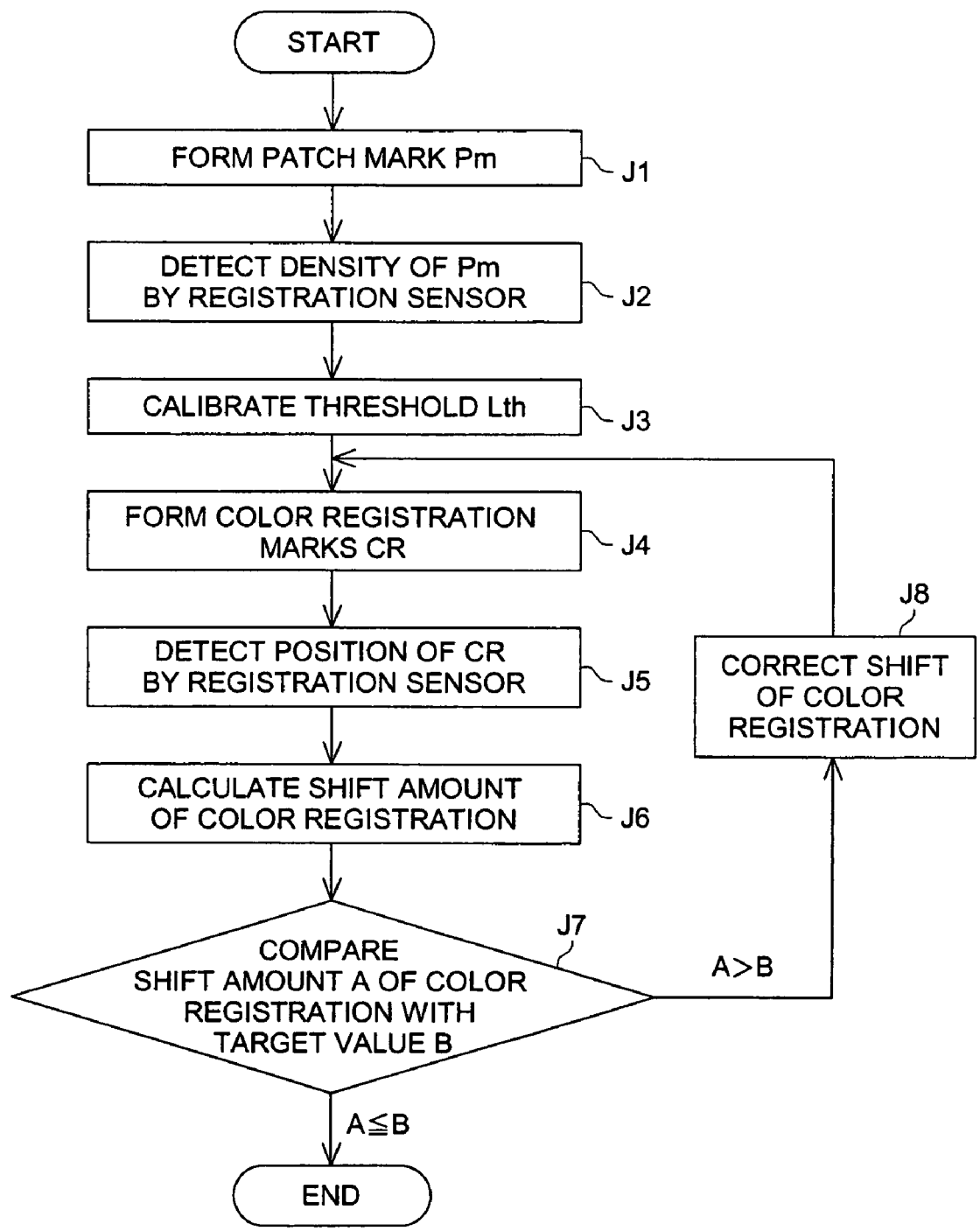
FIG. 33 is a flow chart showing an example of the operation of the color image forming apparatus 400.

Next, a fourth image forming method will be explained with reference to an example of the operation of the color image forming apparatus 400. FIG. 33 is a flow chart showing an example of the operation of the color image forming apparatus 400.

This example is premised on it that the photoreceptor belt 60 is provided in the image transfer system I, and in order that a color image may be formed on a sheet of paper sheet P through the superposition of component color images on the photoreceptor belt 60 on the basis of arbitrary image information, the forming positions of the component color images are adjusted on the basis of the positions of color registration marks CR. Further,. it is taken for example the case where a threshold voltage Lth used in detecting the positions of color registration marks CR is corrected in real time before the adjustment of the forming positions of component color images. The toner image density sensor 11 (the first detection system) and the registration sensors 12A and 12B (the second detection system) are arranged above the circumference of the photoreceptor belt 60, with the latter two sensors 12A and 12B located at positions of the same phase next to the toner image density sensor 11 with respect to the running direction (advancing direction of the belt) of the photoreceptor belt 60.

With this incorporated into the image forming condition, in the step J1 to J3 of the flow chart shown in FIG. 33, the initial adjustment concerning the detection by the registration sensors 12A and 12B etc. is carried out, and after that, in the steps J4 to J8, the adjustment of writing position is made. In this initial adjustment, an optimum threshold voltage Lth is determined from the sensor output of the substrate and the sensor output of the marks for density detection.

In this example, in the step J1, patch marks Pm for color density correction are formed on the photoreceptor belt 60. At this time, the image forming unit 10Y', 10M', 10C' or 10K' forms patch marks Pm of several kinds having different density values on the photoreceptor belt 60 as shown in FIG. 31. After that, the procedure moves to the step J2, where the density of the patch marks Pm formed on the photoreceptor belt 60 is detected by the registration sensor 12A or the like. For example, a density detection signal S2' detected by the registration sensor 12A is such one as shown in FIG. 6(B).

Further, the procedure moves to the step J3, where the threshold voltage Lth for the position detection of the color registration mark CR is corrected on the basis of the density detection signal S2' of the patch marks outputted from the registration sensor 12A. The threshold voltage Lth is corrected by the operation shown in FIG. 8. At this time, in the control device 15, the maximum value (MAX) of a density detection signal S2' in the formation area of the patch marks Pm outputted from the registration sensor 12A and the minimum value (MIN) of its non-formation area are detected, and the average value is calculated on the basis of the maximum value and the minimum value of the density detection signal S2'. A density detection signal S2' in the non-formation area of patch marks Pm reflects the substrate of the photoreceptor belt 60.

This average value is determined to be the threshold voltage Lth for the registration sensors 12. Further, the density values of color registration marks CR for the registration of component color images are adjusted on the basis of the density of the patch marks Pm. By forming the color registration marks CR on the basis of the density of the patch marks detected in the above, it is possible to make the density of color registration marks CR most suitable for the position detection by the registration sensors 12. Further, toner consumption amount and adjustment time for the formation of color registration marks can be reduced.

Then, color registration marks CR (mark images) with their density adjusted are formed on the photoreceptor belt 60 in the step J4. After that, the positions of the color registration marks CR formed on the photoreceptor belt 60 are detected by the registration sensors 12 in the step J5. At this time, the passage timing of any one of the color registration marks is detected on the basis of the threshold voltage Lth shown in FIG. 10(A). After that, in the step J6, the amounts of color deviations are calculated on the basis of passage timings, for the purpose of adjusting the forming positions of component color images on the basis of the positions of the color registration marks CR.

Then, the procedure moves to the step J7, where the amounts of color deviations are compared with a target value. If the amounts of color deviations are not greater than the target value, the processing is completed without adjusting the forming positions of component color images. If the amounts of color deviations exceed the target value, the procedure moves to the step J8, where a color deviation correction is made. In this color deviation correction, for example, in the correction means for the Y-color 5Y, the fθ lens adjusting mechanism 42 is driven on the basis of a position correction signal Sy (YVV), and the lens holding mechanism 41 is moved to rotate the fθ lens about its optical axis perpendicular to the image formation surface for adjustment. By doing this, the writing position of a laser beam on the photoreceptor belt 60 can be adjusted.

Then, the procedure moves back to the step J4, and the above-mentioned processings are repeated, for the purpose of making the amounts of color deviations zero to adjust the forming positions of component color images to the optimum. After that, in the same way as conventional methods, a color image can be formed on the photoreceptor belt 60 by the image forming units 10Y', 10M', 10C', and 10K' with the image forming position adjusted to the optimum.

As explained in the above, according to the color image forming apparatus 400 and the image forming method as the embodiment 4 of the present invention, it is put into practice that the density of patch marks Pm for color density correction is detected by the registration sensor 12A, and the threshold voltage Lth for detecting the positions of the color registration marks CR is corrected on the basis of a density detection signal S2' of the patch marks Pm outputted from said registration sensor 12A.

Accordingly, it is possible, in accordance with the condition of use, to adjust the threshold voltage Lth for detecting the positions of color registration marks CR in such a way as to adapt it for the state of use of the image forming units 10Y', 10M', 10C', and 10K'. On top of it, because the density of color registration marks can be optimized, a high accuracy in the detection processing of color registration marks can be secured.

Owing to this, even if the condition of use changes with the passage of time due to the change of reflection light quantity at the photoreceptor belt 60, the decrease of the light emission quantity of the sensors, etc., the proper positions of color registration marks can be exactly detected; therefore, the forming positions of component color images can be adjusted at a high accuracy on the basis of high-reliability position detection signals S2. Accordingly, because component color images can be exactly superposed on the photoreceptor belt 60, it is possible to transfer a color image on a desired paper sheet P at a high accuracy.

(5) Embodiment 5

Figure 34:
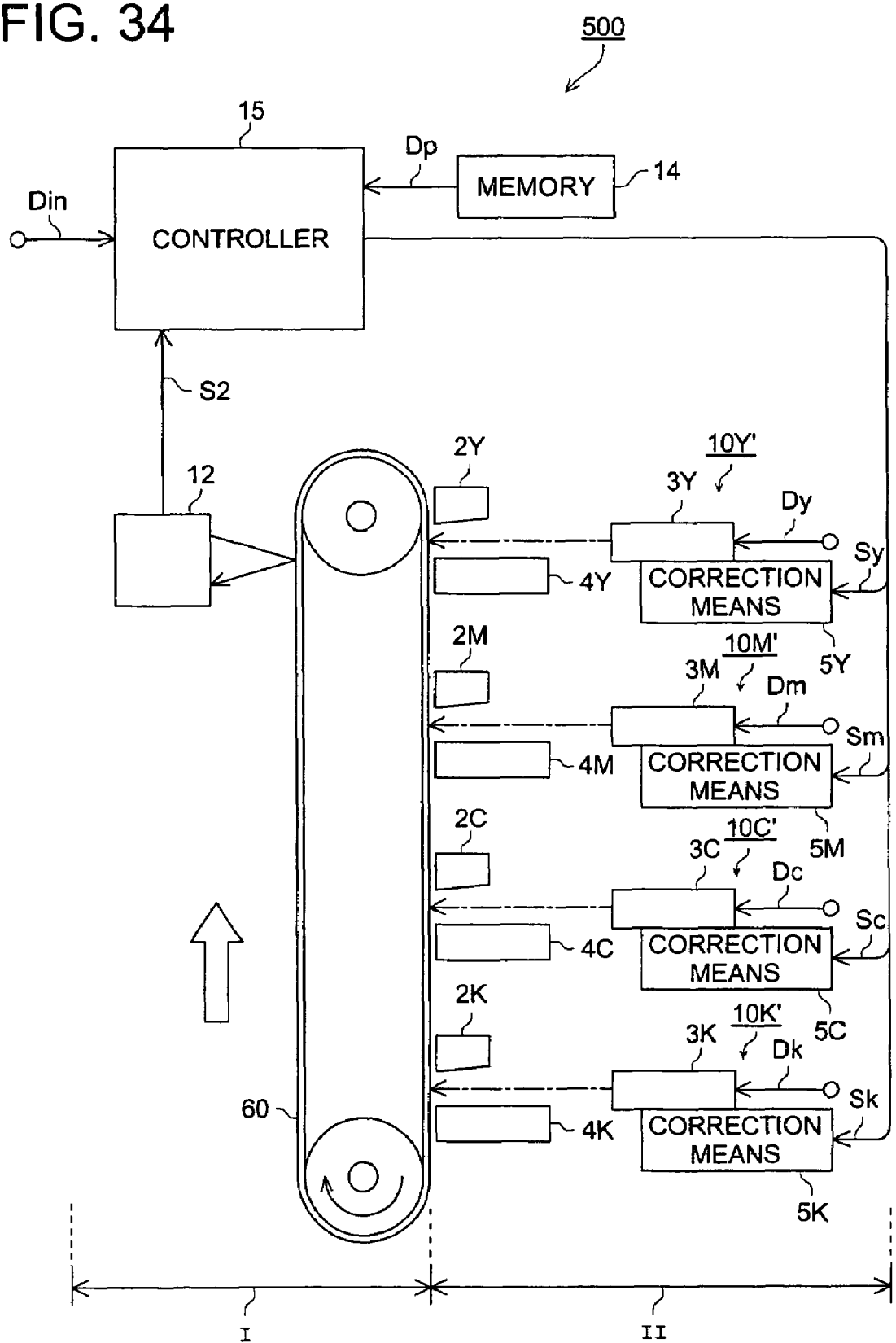
FIG. 34 is a block drawing showing an example of the structure of the image transfer system and the image forming system of a color image forming apparatus 500 as the embodiment 5 of this invention.

FIG. 34 is a block drawing showing an example of the structure of the image transfer system and the image forming system of a color image forming apparatus 500 as the embodiment 5 of the present invention.

In this example of the embodiment, it is brought into practice that, in order that a color image may be formed through the superposition of component color images on the basis of arbitrary image information, there is provided a control device 15 for controlling image forming units 10Y', 10M', 10C', and 10K' on the basis of reversed mark images obtained by the reversing of mark images for the registration of component color images, at least, reversed mark images are formed beforehand on a photoreceptor belt 60, and after that, the forming positions of component color images are adjusted on the basis of the position detection of mark images defined by the void portions of these reversed mark images. Thus, even if scratches etc. are produced on the photoreceptor belt 60 due to the change with the passage of time caused by maintenance operations and wear of parts, a color image can be transferred onto a desired paper sheet P at a high accuracy.

The color image forming apparatus 500 shown in FIG. 34 is an apparatus for forming a color image through the superposition of component color images on the basis of arbitrary image information. Said apparatus 500 comprises the photoreceptor belt 60, and is given a function to form a color image on this photoreceptor belt 60 and then transfer this color image onto a desired paper sheet P. Along this photoreceptor belt 60, image forming units 10Y', 10M', 10C', and 10K' are provided to practice the formation of a color image. Registration sensors 12 as an example of the detection means are provided, for example, at the left of the photoreceptor belt 60, and are given a role to detect the positions of mark images formed on the photoreceptor belt 60.

The registration sensors 12 are connected to the control device 15, by which the photoreceptor belt 60 and the image forming units 10Y', 10M', 10C', and 10K' are controlled on the basis of output signals of the registration sensors 12. The control device 15 controls the image forming units 10Y', 10M', 10C', and 10K' in such a way that at least reversed color registration marks RCR as the reversed ones of mark images for the registration of component color images are previously formed on the photoreceptor belt 60, and the forming positions of component color images are adjusted on the basis of the position detection of mark images defined by the void portions of the reversed color registration marks RCR. For example, by the control device 15, on the basis of output signals of the registration sensor 12A etc., with the reversed color registration mark RCR for the color BK taken as the reference, the image forming units 10C', 10M', and 10Y' for the other colors C, M, and Y are controlled. By this control, the writing positions for the colors C, M, and Y are adjusted to come to agree with the writing position for the color BK.

A storage device 14 is connected to the control device 15, and a plurality of kinds of reversed mark image data DP for reversing mark images for the registration of component color images are stored in it. Of course, the way of handling the data is not limited to this, and also it is appropriate that mark image information for forming mark images for the registration of component color images is stored in the storage device 14 beforehand, and at the time of detecting color registration marks, reversed mark image data DP are prepared on the basis of the mark image information and the pattern width. This is done for the purpose of forming reversed color registration marks RCR as the reversed ones of mark images on the basis of reversed mark image data DP on the photoreceptor belt 60.

In this example, a developing device 4Y for forming a toner image of the color Y on the photoreceptor belt 60 is provided in the image forming unit 10Y', a developing device 4M' for forming a toner image of the color M is provided in the image forming unit 10M, a developing device 4C for forming a toner image of the color M is provided in the image forming unit 10C', and a developing device 4K for forming a toner image of the color BK is provided in the image forming unit 10K'; toner images formed on the photoreceptor belt 60 by these developing devices 4Y, 4M, 4C, and 4K on the basis of the reversed mark image data DP for the colors Y, M, C, and BK form the reversed registration marks RCR of the respective colors, and the void portions with no toner particles deposited represent the mark images.

In addition, as regards items having the same name and sign as those explained in the embodiment 4, the explanation will be omitted because they have the same function. Further, as regards the example of the structures of non-reversed color registration marks CR and reversed color registration marks RCR, please refer to FIG. 13(A) and FIG. 13(B).

Figure 35:
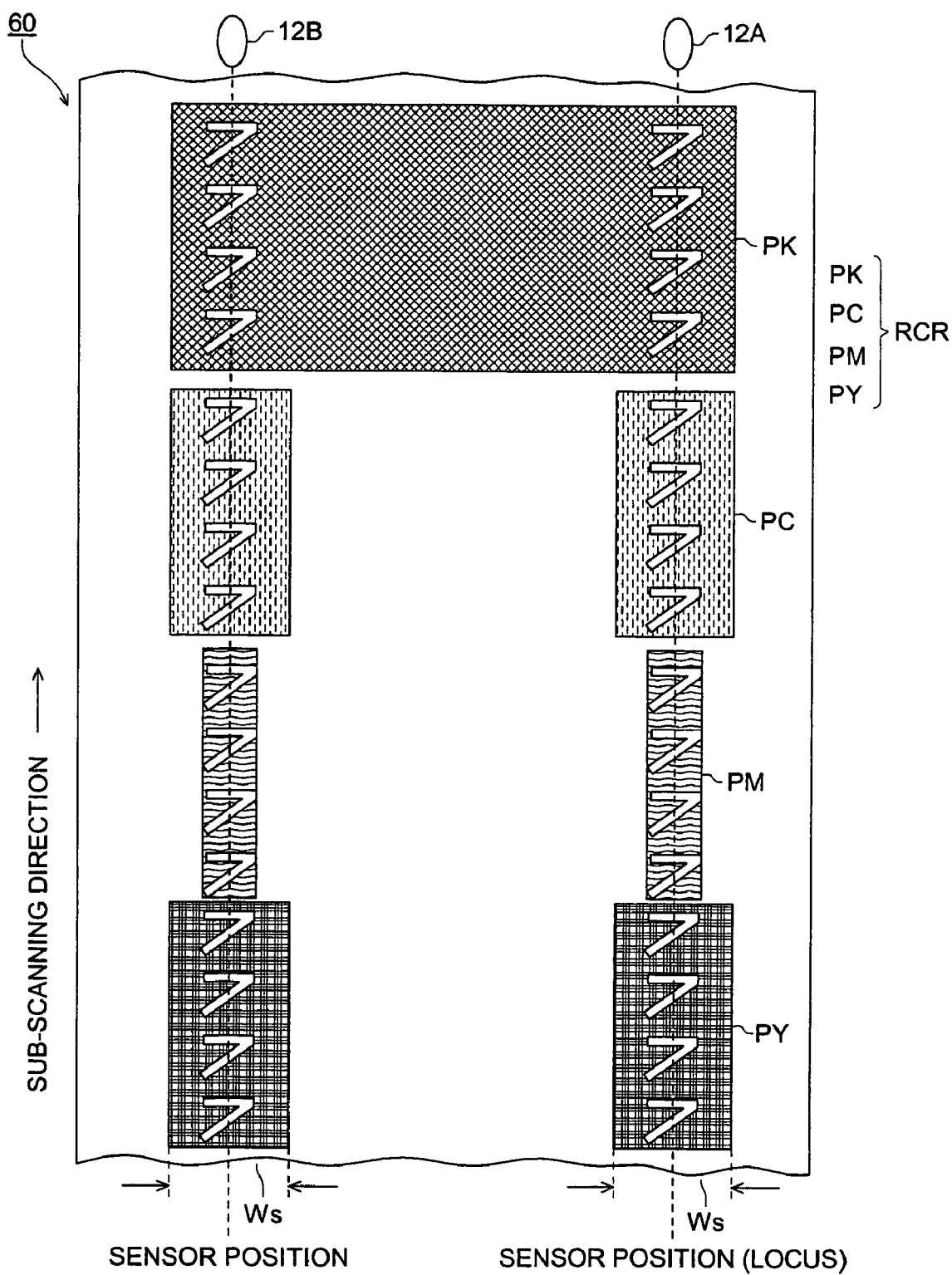
FIG. 35 is a conceptual drawing showing an example of the formation of reversed color registration marks RCR for the colors BK, C, M, and T.

FIG. 35 is a conceptual drawing showing an example of formation of reversed color registration marks RCR for the colors BK, C, M, and Y.

The reversed color registration marks RCR for the color BK (hereinafter referred to as the BK-color reversed pattern PK simply), the reversed color registration marks RCR for the color C (hereinafter referred to as the C-color reversed patterns PC simply), the reversed color registration marks RCR for the color M (hereinafter referred to as the M-color reversed patterns PM simply), and the reversed color registration marks RCR for the color Y (hereinafter referred to as the Y-color reversed patterns PY simply) shown in FIG. 14 are an example of patterns formed serially in the sub-scanning direction on the photoreceptor belt 60.

The case where the reversed patterns PK, PC, PM, and PY are detected by the two registration sensors 12A and 12B is shown. The registration sensor 12A is provided above a position near the right edge of the photoreceptor belt 60 with respect to its running direction, and the registration sensor 12B is provided above a position near the left edge of the photoreceptor belt 60. The broken lines represent the apparent loci of the two registration sensors due to the revolution of the photoreceptor belt 60.

In this example of patterns, the BK-color reversed pattern PK is integrally formed in the main scanning direction; the two mark portions are formed as series of void portions in a toner image that is uniform over the whole width, and are detected by the registration sensors 12A and 12B respectively. If all the reversed patterns are formed as a uniform toner image over the whole width in the main scanning direction containing two mark portions in the above-mentioned way, toner consumption increases. Therefore, it is appropriate to form a uniform toner image in the narrow area near the mark portion, to limit the pattern width Ws like the reversed patterns PC, PM, and PY for the colors C, M, and Y respectively. Thus, the toner consumption can be suppressed.

In the example of the reversed pattern PM for the color M, the pattern width Ws of the reversed pattern PM is made narrower than the width of the mark image. In this case, the toner consumption can be suppressed to the minimum. The reversed pattern PM has a structure such that a plurality of partial figure patterns partitioning the void portions are arranged, and is different from the reversed patterns PK, PC, and PM for the colors BK, C, and Y respectively having a rectangular pattern structure surrounding the whole of the mark images formed of the void portions.

Reversed mark image data DP for forming these plural kinds of reversed pattern, PY, PM, PC, and PK are stored in the storage device 14. It is appropriate to select the reversed patterns PY, PM, PC, and PK by the control device 15 in accordance with the state of use of the photoreceptor belt 60.

Further, in the case where two or more kinds of reversed color registration mark are formed serially in the sub-scanning direction on the photoreceptor belt 60, the image forming units 10Y', 10M', 10C', and 10K' are controlled by the control device 15 so as to make the lower edge portion of a reversed color registration mark of one kind formed on the photoreceptor belt 60 overlap the upper edge portion of a reversed color registration mark of another kind, for example, by one pixel.

By doing this, as in the example of the reversed pattern PM for the color M and the reversed pattern PY for the color Y shown in FIG. 35, concerning the range to cover uniformly with toner particles on the photoreceptor belt 60, it is possible to make the toner image for the color M overlap the toner image for the color Y. By doing this way, on top of it that the reading of mark images by the used of hardware can be easily limited, the density of a color image after the superposition of the component color images can be also confirmed.

Figure 36:
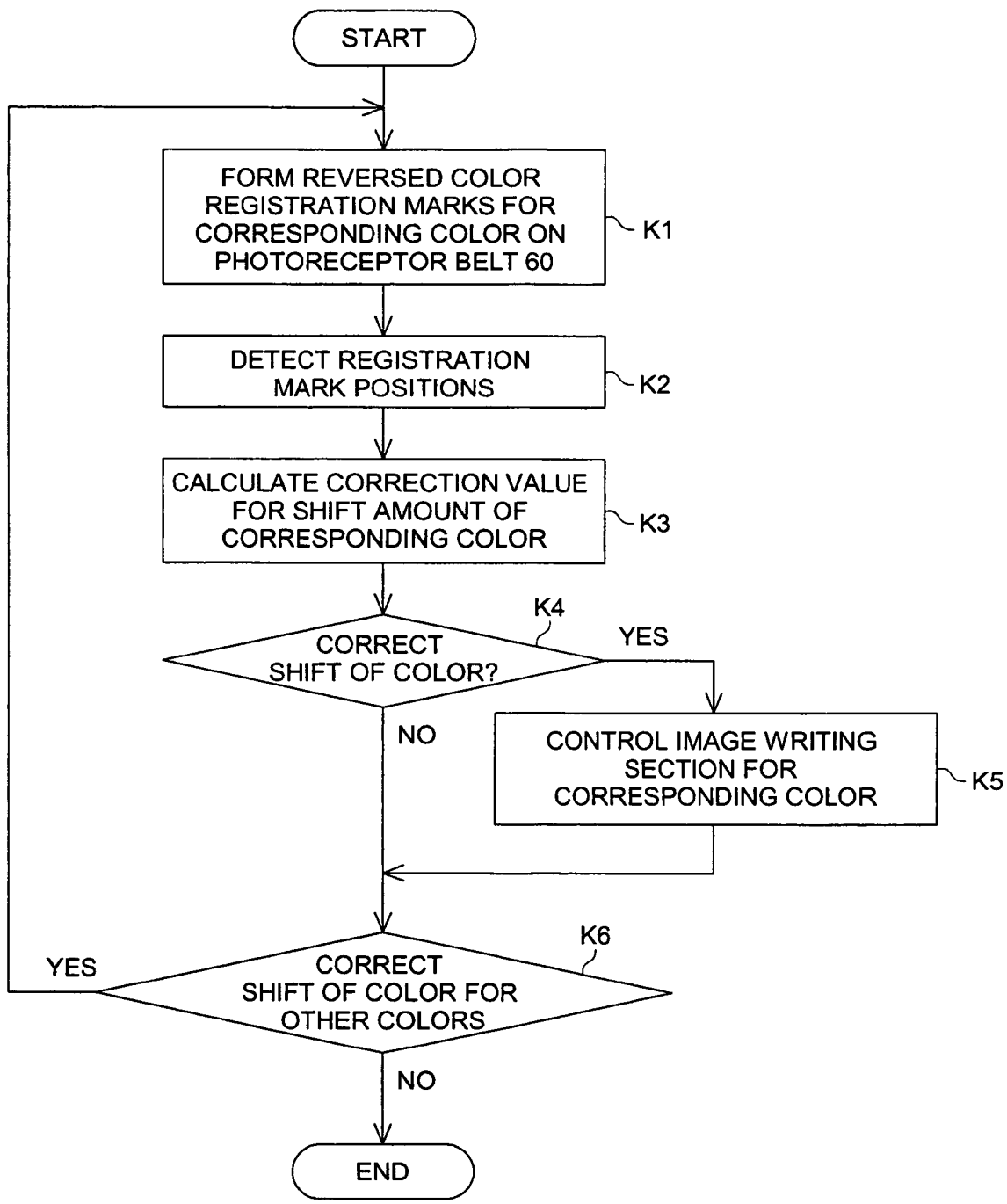
FIG. 36 is a flow chart showing an example of the operation of the color image forming apparatus 500.

Next, the fifth image forming method will be explained with reference to an example of the operation of the color image forming apparatus 500. FIG. 36 is a flow chart showing an example of the operation of the color image forming apparatus 500.

This example of the embodiment relates to a case where in order that a color image may be formed through the superposition of the component color images on the photoreceptor belt 60 on the basis of arbitrary image information, reversed mark image data DP for reversing mark images for the registration of the component color images are prepared beforehand. The reversed mark image data DP are read out from the storage device 14 such as a ROM. Of course, it is also appropriate to prepare reversed mark image data DP on the basis of the mark image information and the pattern width at the time of forming color registration marks. Now, take it for instance the case where color deviations are corrected in the order the color C, M, and Y on the basis of the color BK. The correction of color deviations are made in such a way that the writing positions for the colors Y, M, and C are modified with respect to the writing position for the color BK taken as the reference.

With this incorporated into the image position adjustment condition, reversed color registration marks of the concerned color RCR are formed on the photoreceptor belt 60 on the basis of reversed mark image data DP in the step K1 of the flow chart shown in FIG. 36. In this example, a BK color reversed pattern PK is formed at first on the photoreceptor belt 60 by the image forming unit 10K'. In this example, when a toner image is formed on the photoreceptor belt 60 on the basis of reversed mark image data DP, the portion covered by toner particles on the photoreceptor belt 60 represents the BK-color reversed pattern PK, (the reversed color registration mark), and the void portions with no toner particles deposited represent the mark images. Then, it is practiced to detect the positions of the mark images defined by the void portions of the BK-color reversed pattern PK formed on the photoreceptor belt 60 by the registration sensors 12A etc. in the step K2.

Further, in the step K3, it is practiced to calculate the correction value for the BK color deviation on the basis of the positions of the mark images defined by the void portions in the control device 15. After that, the procedure moves to the step K4, whether or not a color deviation correction is to be practiced is judged by the control device 15. Whether or not a color deviation correction is practiced is judged by comparing the deviation with a control target value determined beforehand.

If the color deviation amount exceeds the target value and a color deviation correction is required, the procedure moves to the step K5, where the image writing section 3K is controlled by the control device 15. At this time, in the correction means for the BK-color 5K, the fθ lens adjusting mechanism 42 is driven on the basis of a position correction signal Sy (YVV), and the lens holding mechanism 41 is moved to rotate the fθ lens about its optical axis perpendicular to the image formation surface for adjustment. By doing this, the writing position of a laser beam on the photoreceptor belt 60 can be adjusted.

If the color deviation amount is not greater than the target value and no color deviation correction is required in the step K4, the procedure moves to the step K6, and whether or not the detection of color registration marks for the other colors is to be practiced is judged. Because the detection of color registration marks for the other colors, namely, for the colors C, M, and Y, is to be practiced, the procedure moves back to the step K1.

Then, in the step K1, C-color reversed patterns PC are formed on the photoreceptor belt 60 by the image forming unit 10C' on the basis of reversed mark image data DP, in the step K2, the positions of the mark images defined by the void portions in the C-color reversed patterns PC are detected by the registration sensors 12A etc.

Further, in the step K3, it is practiced to calculate the correction value of the color deviation amount on the basis of the positions of the mark images defined by the void portions in the control device 15. At this time, in the control device 15, the writing position of the reversed color registration marks RCR for the color BK and the writing position of the reversed color registration marks RCR for the color C are detected, and the correction value is calculated from the amount of deviation in the case where the writing position of the reversed color registration marks RCR for the color C is converted into the writing position of the reversed color registration marks RCR for the color BK.

After that, the procedure moves to the step K4, and whether or not a color deviation correction is to be practiced is judged by the control device 15. Whether or not a color deviation correction is to be practiced is judged by comparing the deviation amount with a control target value determined beforehand in the same way as the case of the color BK. If the color deviation amount exceeds the target value, and a color deviation correction is required, the procedure moves to the step K5, where the image writing section 3C is controlled by the control device 15. At this time, in the correction means 5C for the color C, the fθ lens adjusting mechanism 42 is driven on the basis of a position correction signal Sy (YVV), and the lens holding mechanism 41 is moved to rotate the fθ lens about its optical axis perpendicular to the image formation surface for adjustment. By doing this, the writing position of a laser beam on the photoreceptor belt 60 can be adjusted.

Further, in the step K1, M color reversed patterns PM are formed on the photoreceptor belt 60 by the image forming unit 10M' on the basis of reversed mark image data DP, and in the step K2, the positions of the mark images defined by the void portions in the M-color reversed patterns PM are detected by the registration sensors 12A etc.

Further, in the step K3, it is practiced to calculate the correction value of deviation amount for the color M on the basis of the positions of the mark images defined by the void portions in the control device 15. At this time, in the control device 15, the writing position of the reversed color registration marks RCR for the color BK and the writing position of the reversed color registration marks RCR for the color M are detected, and the correction value is calculated from the amount of deviation in the case where the writing position of the reversed color registration marks RCR for the color M is converted into the writing position of the reversed color registration marks RCR for the color BK.

After that, the procedure moves to the step K4, and whether or not a color deviation correction is to be practiced is judged by the control device 15. Whether or not a color deviation correction is to be practiced is judged by comparing the deviation amount with a control target value determined beforehand. If the color deviation amount exceeds the target value, and a color deviation correction is required, the procedure moves to the step K5, where the image writing section 3M is controlled by the control device 15. At this time, in the correction means for the color M 5M, the fθ lens adjusting mechanism 42 is driven on the basis of a position correction signal Sy (YVV), and the lens holding mechanism 41 is moved to rotate the fθ lens about its optical axis perpendicular to the image formation surface for adjustment. By doing this, the writing position of a laser beam on the photoreceptor belt 60 can be adjusted.

Further, in the step K1, Y color reversed patterns PY are formed on the photoreceptor belt 60 by the image forming unit 10Y' on the basis of reversed mark image data DP, in the step K2, the position of the mark images defined by the void portions in the Y color reversed pattern PY are detected by the registration sensors 12A etc.

Further, in the step K3, it is practiced to calculate the correction value of the color deviation amount for the color Y on the basis of the positions of the mark images defined by the void portions in the control device 15. At this time, in the control device 15, the writing position of the reversed color registration marks RCR for the color BK and the writing position of the reversed color registration marks RCR for the color Y are detected, and the correction value is calculated from the amount of deviation in the case where the writing position of the reversed color registration marks RCR for the color Y is converted into the writing position of the reversed color registration marks RCR for the color BK.

After that, the procedure moves to the step K4, and whether or not a color deviation correction is to be practiced is judged by the control device 15. Whether or not a color deviation correction is to be practiced is judged by comparing the deviation amount with a control target value determined beforehand. If the color deviation amount exceeds the target value, and a color deviation correction is required, the procedure moves to the step K5, where the image writing section 3Y is controlled by the control device 15. At this time, in the correction means for the color Y 5Y, the fθ lens adjusting mechanism 42 is driven on the basis of a position correction signal Sy (YVV), and the lens holding mechanism 41 is moved to rotate the fθ lens about its optical axis perpendicular to the image formation surface for adjustment. By doing this, the writing position of a laser beam on the photoreceptor belt 60 can be adjusted.

As explained in the above, according to the color image forming apparatus and the image forming method as the embodiment 5 of the present invention, it is practiced that, by the control device 15, a BK-color reversed pattern PK is formed beforehand on the photoreceptor belt 60, and after that, the image writing section 3C is controlled in such a way that the forming position of the component image of the color C is adjusted on the basis of the positions of the mark images defined by the void portions of the C-color reversed patterns PC formed on the photoreceptor belt 60. Also as regards the color M and Y, it is practiced that the image writing section 3M and the image writing section 3Y are controlled in such a way that the forming positions of the component images of the color M and Y are adjusted.

Accordingly, because the area except the void portions defining the mark images can be covered with reversed color registration marks (toner images) of the colors Y, M, C, and BK, even if scratches etc. are produced on the photoreceptor belt 60 due to the change with the passage of time caused by maintenance operations and wear of parts, the proper positions of mark images can be exactly detected.

Owing to this, the forming positions of component color images can be adjusted at a high accuracy on the basis of high-reliability position detection signals S2 with no noise signal due to scratches etc. superposed. On top of it, for the calculation of color deviation values, the structure based on a conventional method can be used as it is with almost no alteration. Further, the reading of portions other than reversed color registration marks RCR is eliminated by the use of hardware, and on top of it, toner consumption can be suppressed. Accordingly, because component color images can be superposed exactly on the photoreceptor belt 60, a color image can be transferred onto a desired paper sheet P without being influenced by the change with the passage of time.

(6) Embodiment 6

Figure 37:
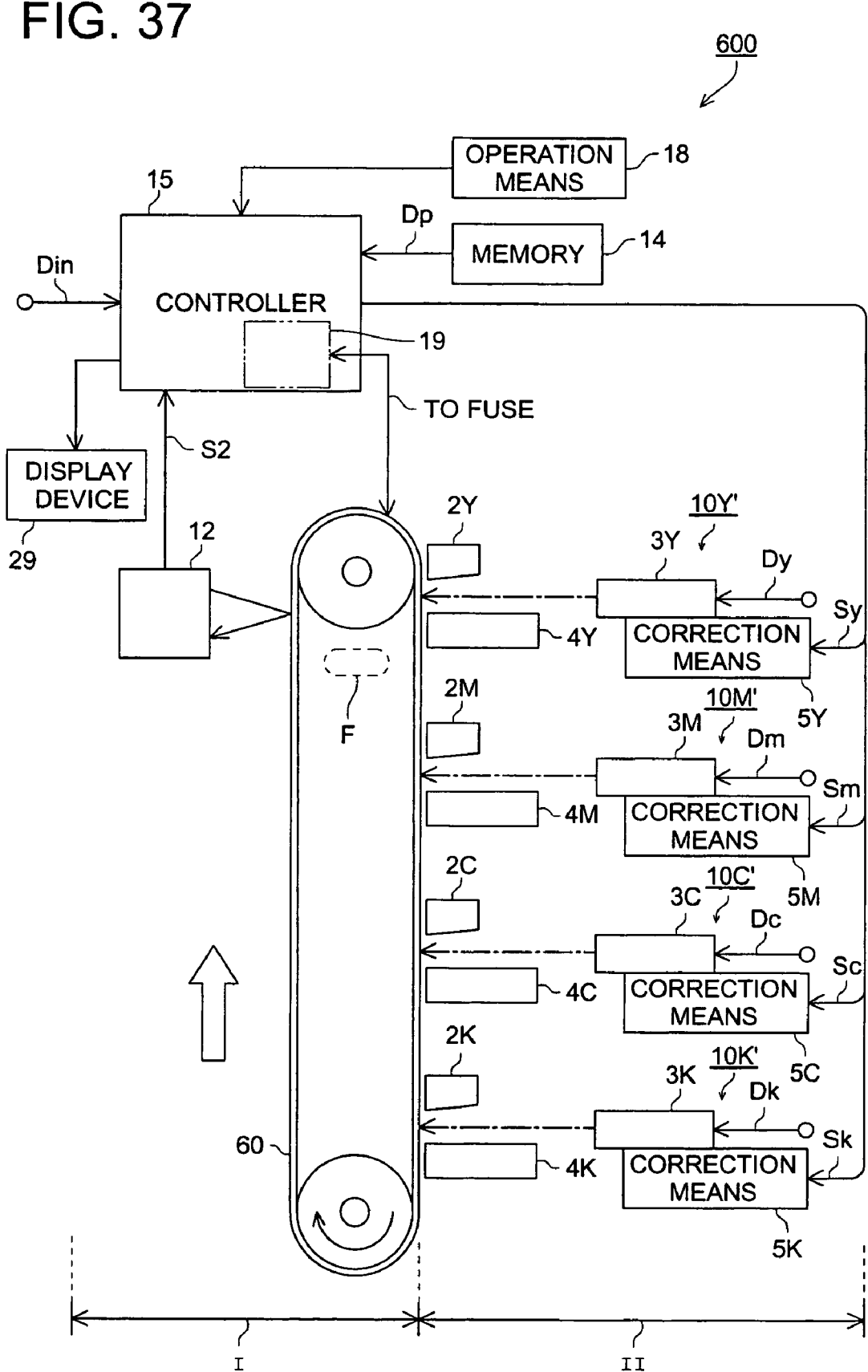
FIG. 37 is a block drawing showing an example of the structure of the image transfer system and the image forming system of a color image forming apparatus 600 as the embodiment 6 of this invention.

FIG. 37 is a block drawing showing an example of the structure of the image transfer system and image forming system of a color image forming apparatus 600 as the embodiment 6 of the present invention.

In this example of the embodiment, there is provided a control device 15 for controlling image forming units 10Y', 10M', 10C', and 10K' on the basis of the position detection of mark images. Further, mark images or reversed registration marks RCR as the reversed ones of said mark images for the registration of the component color images are formed on the photoreceptor belt 60, and the image forming units 10Y', 10M', 10C', and 10K' are controlled in such a way as to adjust the forming positions of the component color images on the basis of the position detection of non-reversed mark images or mark images defined by the void portions of reversed color registration marks formed on the photoreceptor belt 60.

Owing to this, in the case where a new photoreceptor belt 60 is used for the first time, or in the case where an old photoreceptor belt 60 has been just replaced with a new one, the forming positions of component color images can be adjusted on the basis of the position detection of mark images. On the other hand, even if scratches etc. are produced on the photoreceptor belt 60 due to the change with the passage of time caused by maintenance operations, wear of parts, etc., the forming positions of component color images can be adjusted at a high accuracy on the basis of high-reliability position detection signals S2 with no noise signal due to scratches etc. superposed.

The color image forming apparatus 500 shown in FIG. 37 is an apparatus for forming a color image through the superposition of the component color images on the basis of arbitrary image information. Said image forming apparatus 600 comprises the photoreceptor belt 60, and is given a function of forming a color image on this photoreceptor belt 60 and then transferring this color image onto a desired paper sheet P. Along this photoreceptor belt 60, there are provided image forming units 10Y', 10M', 10C', and 10K', which are given a function to form a color image. A plurality of registration sensors 12 which are an example of the detection means are disposed above the photoreceptor belt 60, and are given a role to detect the positions of the mark images formed on the photoreceptor belt 60.

The control device 15 is connected to the registration sensors 12, and is supposed to control the photoreceptor belt 60 and the image forming units 10Y', 10M', 10C', and 10K' on the basis of output signals of these registration sensors 12. The control device 15, in accordance with the state of use of the photoreceptor belt 60, at least controls the image forming units 10Y', 10M', 10C', and 10K' to form mark images or reversed color registration marks as the reversed ones of said mark images for the registration of component color images on the photoreceptor belt 60, and adjust the forming positions of component color images on the basis of the position detection of the color registration marks CR or the color registration marks CR defined by the void portions of the reversed color registration marks RCR formed on the photoreceptor belt 60.

A storage device 14 is connected to the control device 15, and is given a role to store mark image information for forming color registration marks CR and reversed mark image data DP for forming reversed color registration marks RCR. Of course, the way of handling the information is not limited to this, and also it is appropriate that mark image information for forming mark images for the registration of component color images are stored in the storage device 14, and at the time of the formation of color registration marks, reversed mark image data DP are prepared on the basis of the mark image information and the pattern width, in order to form reversed color registration marks RCR as the reversed ones of the mark images on the photoreceptor belt 60 on the basis of the reversed mark image data DP.

In this example, with the running direction of the photoreceptor belt 60 taken as the sub-scanning direction and the direction perpendicular to the sub-scanning direction taken as the main scanning direction, the plural registration sensors 12 are arranged in the sub-scanning direction. By doing this, the surface state of the registration mark formation area of the photoreceptor belt 6o can be detected with respect to its plural divisional parts for the plural sensors. Accordingly, for each of the divisional registration mark formation areas extending in the sub-scanning direction to be detected by the concerned registration sensor 12, mark image information or reversed mark image information for forming color registration marks CR or reversed color registration marks RCR can be selected from the storage device 14.

In this example, along the photoreceptor belt 60, a developing device 4Y for forming a toner image of the color Y is provided in the image forming unit 10Y', a developing device 4Y for forming a toner image of the color M is provided in the image forming unit 10M', a developing device 4C for forming a toner image of the color C is provided in the image forming unit 10C', and a developing device 4K for forming a toner image of the color BK is provided in the image forming unit 10K'; toner image portions of the colors Y, M, C, and BK formed on the photoreceptor belt 60 make up the reversed registration marks RCR of the respective colors, and the void portions with no toner particles deposited represent the mark images. In addition, as regards items having the same name and sign as those explained in the embodiment 4, the explanation will be omitted because they have the same function.

The control device 15 detects the surface state of the registration mark formation area of the photoreceptor belt 60 by means of the registration sensors 12, and judges whether or not the surface state of the photoreceptor belt 60 is good on the basis of the output of the registration sensors 12 to control the selection and readout of information in the storage device 14. In this example, the registration sensors 12, the storage device 14, and the control device 15 make up a mark detection judging means 80.

In the mark detection judging means 80, the surface state of the registration mark formation area of the photoreceptor belt 60 is detected, and in the control device 15, a detection unable flag FG is prepared. This detection unable flag FG is used as the basis of the judgment concerning whether or not the registration sensors 12 will make an erroneous detection at the time of the detection of color registration marks.

In this example, the control device 15 receives the detection output of the registration sensors 12, and controls the image forming units 10Y', 10M', 10C', and 10K' to form color registration marks CR or reversed color registration marks RCR as the reversed ones of said color registration marks CR on the registration mark formation area in accordance with the surface state of the photoreceptor belt 60.

Now, let it be the first adjustment mode, a mode in which it is practiced the processing to form color registration marks CR on the photoreceptor belt 60 on the basis of mark image information (hereinafter referred to also as the first mark producing method), and adjust the forming positions of component color images on the basis of the position detection of the color registration marks CR formed on the photoreceptor belt 60. Further, let it be the second adjustment mode, a mode in which it is practiced the processing to form reversed color registration marks RCR on the photoreceptor belt 60 on the basis of reversed mark image data DP (hereinafter referred to also as the second mark producing method), and adjust the forming positions of component color images on the basis of the position detection of the marks images defined by the void portions of the reversed color registration marks RCR formed on the photoreceptor belt 60.

To the control device 15, an operation means 18 and a display device 29 are connected, and these are operated to set (select) either the first adjustment mode or the second adjustment mode being carded out. In the control device 15, it is practiced to control the photoreceptor belt 60 and the image forming units 10Y', 10M', 10C', and 10K' on the basis of the output of the operation means 18. A setting screen at the time of image formation is displayed on the display device 29. A touch panel with the operation means 18 incorporated is used for the display device 29.

For example, if the surface state of the registration mark formation area is good, or if the first adjustment mode is set, it is practiced that color registration marks CR are formed on the photoreceptor belt 60 by the first mark producing method, and the forming positions of component color images are adjusted on the basis of the position detection of the color registration marks CR formed on the photoreceptor belt 60.

Further, if the surface state of the registration mark formation area is inferior to a reference value determined beforehand, of if the second adjustment mode is set, it is practiced that reversed color registration marks RCR are formed on the photoreceptor belt 60 by the second mark producing method, and the forming positions of component color images are adjusted on the basis of the position detection of the color registration marks CR defined by the void portions of the reversed color registration marks RCR formed on the photoreceptor belt 60.

In this example, a fuse F for detecting a new belt is further provided at the photoreceptor belt 60. This fuse F is connected to a discrimination circuit 19. The discrimination circuit 19 is provided, for example, in the control device 15, operates to output a new belt detection signal based on the melting-off or no melting-off of the fuse F, and melts off the fuse F on the basis of an externally set signal.

In this example, the control device 15 controls the image forming units 10Y, 10M, 10C, and 10K to make them form color registration marks CR or reversed color registration marks RCR as the reversed ones of said color registration marks CR on the registration mark formation area of the photoreceptor belt 60 on the basis of a new belt detection signal obtained from the discrimination circuit 19 for the photoreceptor belt 60.

Further, in the case where the control device 15 has already controlled the image forming units 10Y', 10M', 10C', and 10K' on the basis of the second adjustment mode, if a new belt detection signal Snd obtained from the discrimination circuit 19 indicates that "the photoreceptor belt is new", the control device 15 operates to switch over the mode from the second to the first to control the image forming units 10Y', 10M', 10C', and 10K', for the purpose of switching over the mark producing method from the second to the first.

In addition, as regards the positional deviation control system and the image formation control system of the control device 15, please refer to FIG. 17; as regards the example of the structure of the new belt unit detection circuit 19, please refer to FIG. 18(A) and FIG. 18(B). Further, as regards the example of the display of the operation screen P1 at the time of image formation in the display device 29, please refer to FIG. 19(A) to FIG. 19(C).

Figure 38:
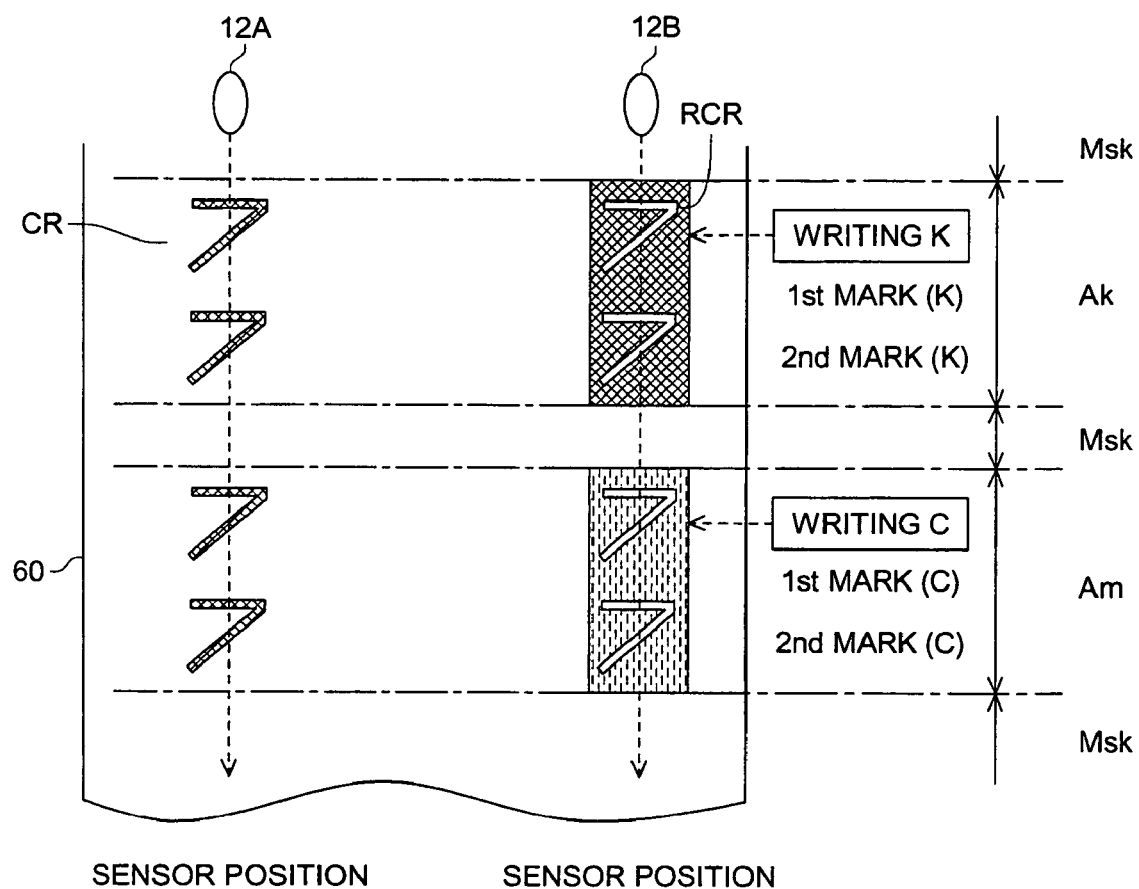
FIG. 38 is a conceptual drawing showing an example of the formation of non-reversed color registration marks CR and reversed color registration marks RCR on a photoreceptor belt 60.

FIG. 38 is a conceptual drawing showing an example of the formation of non-reversed color registration marks CR and reversed color registration marks RCR on the photoreceptor belt 60.

In this example, it is brought into practice that non-reversed color registration marks CR on the photoreceptor belt 60 are detected by the registration sensor 12A, and reversed color registration marks RCR on the photoreceptor belt 60 are detected by the registration sensor 12B.

Non-reversed color registration marks CR and reversed color registration marks RCR are ones based on the first or second mark producing method which is automatically or manually set by the software switch mode screen shown in FIG. 19(C), are ones based on the first or second mark producing method which is automatically selected on the basis of the new belt detection circuit 90, or ones based on the first or second mark producing method which is automatically selected on the basis of the result of detection of the state of use of the photoreceptor belt 60.

On the left side part of the photoreceptor belt 60 that is apparently traced by the registration sensor 12A, non-reversed color registration marks CR of the colors BK, M, etc. are formed in the same way as a conventional method. On the right side part of the photoreceptor belt 60 which is apparently traced by the registration sensor 12B, reversed color registration marks RCR of the color BK are formed in the writing K; in this example, the first mark (K) and the second mark (K) is serially formed and this registration mark formation area is a signal reading area Ak.

Further, in the writing M, registration marks of the color M are formed; in this example, the first mark (M) and the second mark (M) are serially formed, and this registration mark formation area is a signal reading area Am. An area other than these reversed color registration marks RCR of the colors BK, M, etc., for example, an area between the signal reading area Ak and the signal reading area Am is made to be a signal masking area Msk.

The processing for this signal masking area Msk is done in such a way that a passage timing pulse signal Sp is masked by a mask generation circuit 515 shown in FIG. 3 and FIG. 17. Further, in the deviation amount detection section 552 shown in FIG. 17, the relative amount of deviations of the first mark (M), the second mark (M), . . . , etc. are calculated, for the purpose of superposing the component color images with a good reproducibility.

Figure 39:
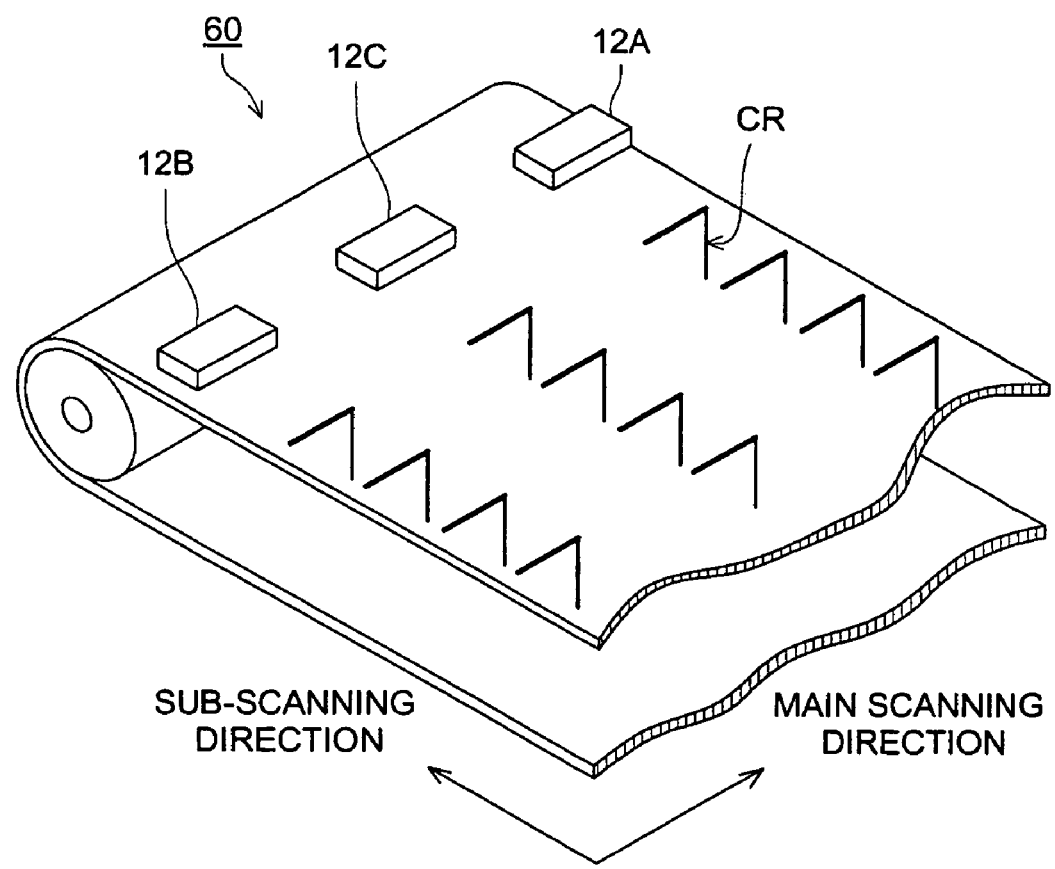
FIG. 39 is a perspective view showing another example of the arrangement of the registration sensors 12A etc.

FIG. 39 is a perspective view showing another example of arrangement of the registration sensors 12A etc. In this example, with the running direction of the photoreceptor belt 60 taken as the sub-scanning direction, and the direction perpendicular to the sub-scanning direction taken as the main scanning direction, a plurality of detection devices are arranged in the main scanning direction, and the detection of the state of the registration mark formation area of the photoreceptor belt 60 is separately borne by the plural detection devices.

In the example of arrangement shown in FIG. 39, three registration sensors 12A to 12C are arranged. The registration sensor 12A is disposed in the right side with respect to the running direction of the photoreceptor belt 60, the registration sensor 12B is disposed in the left side, and the registration sensor 12C is disposed at the center, to make up a detection system based on a 3-row scheme of left, right and center. For scratches produced on the registration mark formation area of the photoreceptor belt 60 due to the change with the passage of time, a mask generation method corresponding to the distribution of the scratches can be selected.

That is, the surface of the registration mark formation area of the photoreceptor belt 60 is divided into plurality of parts of which the detection can be borne separately by this arrangement of sensors. Accordingly, for each of the divisional registration mark formation areas extending to the sub-scanning direction to be detected by the respective registration sensors 12, mark image information or reversed mark image information for forming color registration marks or reversed color registration marks can be read out selectively from the storage device 14.

Compared to the detection system of a left-and-right two-row scheme shown in FIG. 32, the detection system of a left-center-right three-row scheme makes it possible to set the first adjustment mode or the second adjustment mode for each of the divisional registration mark formation areas. Accordingly, it is possible to select either the first mark producing method or the second mark producing method for each of the registration sensors 12A, 12B, and 12C. By doing this, the toner amount of marks can be suppressed, and the influence of belt scratches on the detection of color registration marks can be also suppressed. In addition, as regards the example of the signal at the time of the base level correction by means of the registration sensors 12A etc., please refer to FIG. 22.

Next, an example of the color image forming apparatus 600 concerning the sixth image forming method of the present invention will be explained with reference to three different examples of practice. In each example, it is taken as a prior condition that a color image is supposed to be formed on the photoreceptor belt 60 through the superposition of the component color image on the basis of arbitrary image information Din.

EXAMPLE 1

Figure 40:
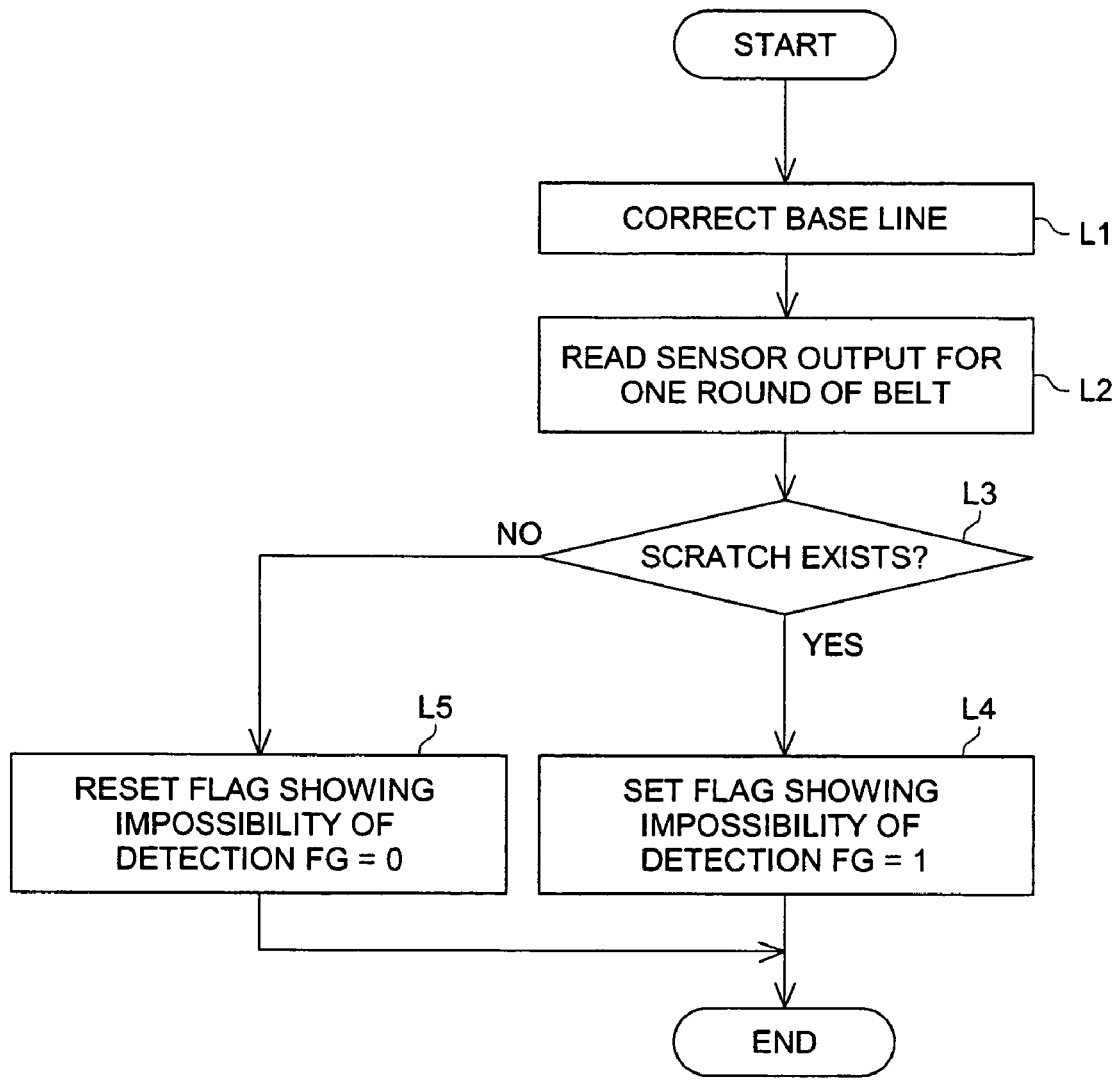
FIG. 40 is a flow chart showing an example of operation (at the time of detecting the presence or absence of a scratch) of the color image forming apparatus 600 as the first example of this invention.

FIG. 40 is a flow chart showing an example of the operation (at the time of the detection of presence or absence of scratches) of the color image forming apparatus 600 as the first example of the present invention.

In this example, there is provided the mark detection judgement means 80 made up of the registration sensors 12, the storage device 14, and the control device 15 explained in FIG. 37; by the registration sensors 12, the surface state of the registration mark formation area of the photoreceptor belt 60 is detected, and in the control device 15, a detection unable flag FG is prepared. This detection unable flag FG is adopted as the basis of judgement concerning whether or not an erroneous detection is to be made by the registration sensors 12A etc. at the time of the detection of color registration marks.

With this taken as an operation condition, first, in order to detect the surface state of the registration mark formation area of the photoreceptor belt 60, a base level correction processing is practiced in the step L1 of the flow chart shown in FIG. 40. In this processing, the registration mark formation area is cleaned through the driving of the endless-shaped photoreceptor belt 60, and the procedure moves to the step L2, where the sensor output of the registration sensors 12A, 12B, etc. for one revolution of the belt are written in the RAM 57 or the like, for the purpose of sampling the noises during at least one revolution period of the photoreceptor belt 60. Then, the procedure moves to the step L3, where it is judged whether or not there is a scratch on the registration mark formation area of the photoreceptor belt 60.

As regards the judgement of a scratch being present or not made at this time, before color registration marks CR are formed, a position detection signal S2 which comes down to a level much lower than the threshold voltage Lth from the base correction level Lb as shown in FIG. 55 is detected. If the photoreceptor belt was a new one before no color registration mark is formed, it is expected that a position detection signal S2 of a base correction level as shown in FIG. 22 is detected. If scratches are produced on the registration mark formation area of the photoreceptor belt 60 due to the change with the passage of time, a position detection signal S2 of a level coming down lower than the threshold voltage Lth is detected. This position detection signal S2 is binarized by the comparator 59 at the time of the detection of color registration marks, is converted into a passage timing pulse signal Sp, and is outputted through the mask generation circuit 515 to the latch circuit 56.

In the case where a position detection signal S2 of a level coming down to a value lower than the threshold voltage Lth is detected in the detection (grasping) processing of the state of use of the photoreceptor belt 60, there is a possible risk of an erroneous detection being made after the formation of color registration marks. Therefore, if it is judged that there is a scratch on the photoreceptor belt 60 in the step L3, the detection unable flag FG is set to establish FG=1 in the step L4. In contrast with this, if it is judged that there is no scratch on the photoreceptor belt 60 in the step L3, the detection unable flag FG is reset to establish FG=0 in the step L5. The detection unable flag FG is temporarily memorized in the RAM 57.

Example of Setting of Positional Deviation Adjustment Mode

Figure 41:
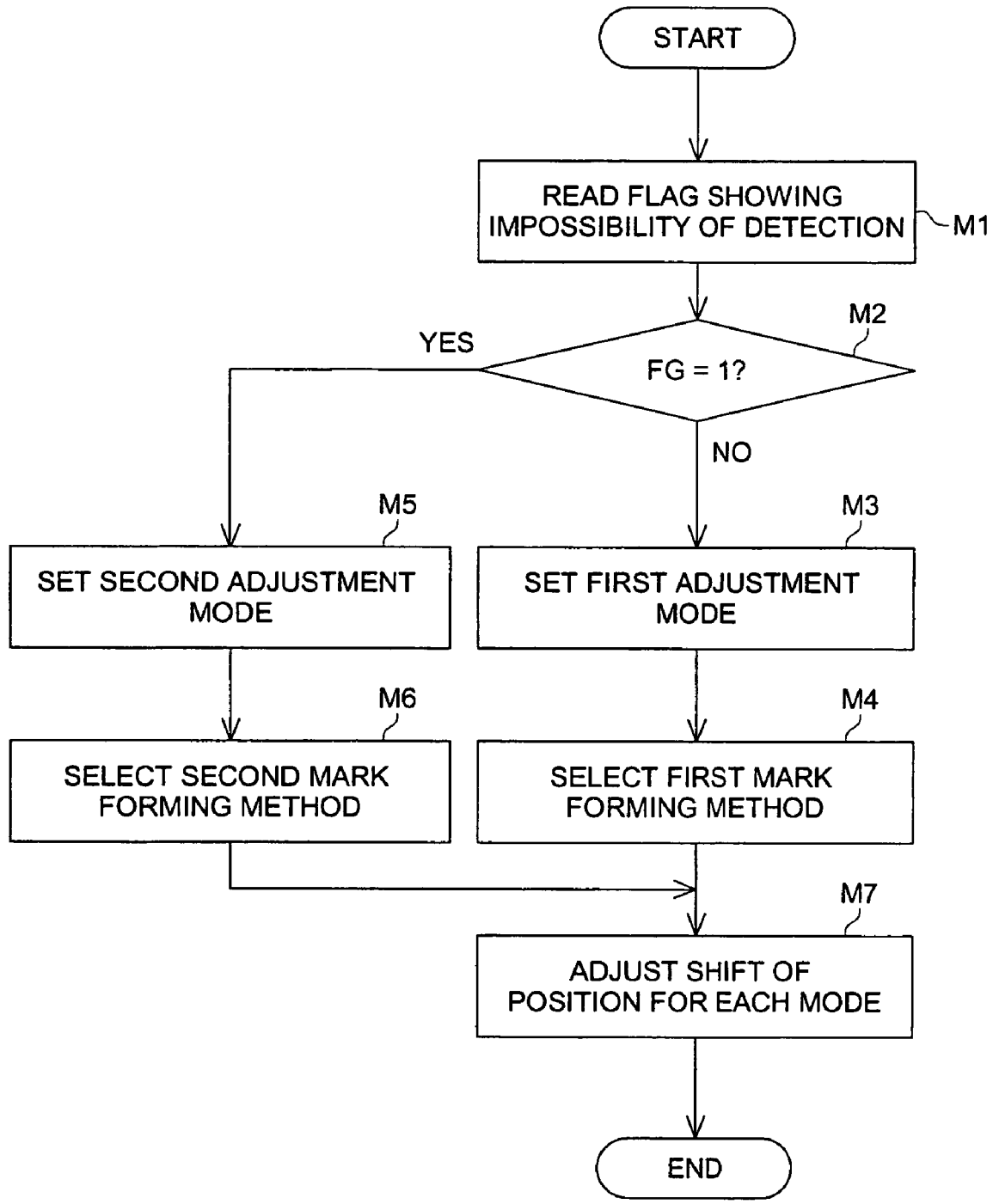
FIG. 41 is a flow chart showing an example of the setting of a positional deviation adjustment mode in the color image forming apparatus 600.

FIG. 41 is a flow chart showing an example of setting of the positional deviation adjustment mode in the color image forming apparatus 600.

In this example, when mark images are formed by the photoreceptor belt 60, the control device 15 judges whether or not the surface state of the photoreceptor belt 60 is good, and in accordance with this surface state of the photoreceptor belt 60 being good or not, it makes a control to form color registration marks CR or reversed color registration marks RCR as the reversed ones of said color registration marks CR for the registration of the component color images on said photoreceptor belt 60. In this example, it is practiced that the first adjustment mode or the second adjustment mode is set in accordance with the result of the judgement of the control device 15, and after that, the first mark producing method or the second mark producing method is selected, to carry out the mark detection.

As for the method of forming color registration marks CR, the first mark producing method in which the effective mark portions to make up non-reversed color registration marks CR are toner images, and the second mark producing method in which areas other than the effective mark portions to make up reversed color registration marks RCR are toner images are prepared. Of course, mark image information for forming color registration marks CR and reversed mark image data DP for forming reversed color registration marks RCR are also prepared beforehand.

With this taken as an operation condition, in the step M1 of the flow chart shown in FIG. 41, the CPU 55 reads out the detection unable flag FG corresponding to the surface state of the registration mark formation area from the RAM 57. Then, in the step E2, it judges whether or not the detection unable flag FG=1. If the equation FG=1 is not established, in other words, in the case where FG=0 and the surface state of the registration mark formation area is good, the procedure moves to the step M3, where the first adjustment mode is set, and after that, the procedure moves to the step M6, where the first mark producing method is selected. Then, the procedure moves to the step M7.

In contrast with the above, if the detection unable flag FG=1 in the step M2, in other words, in the case where the surface state of the registration mark formation area is inferior to a threshold voltage determined beforehand, the procedure moves to the step M5, where the second adjustment mode is set. After that, the procedure moves to the step M6, where the second mark producing method is selected. Then, the procedure moves to the step M7. In the step M7, positional deviation adjustment processings are carried out on the basis of the respective adjustment modes.

For example, if the first adjustment mode is set in the above-mentioned step M3, mark image information is read out according to the first mark producing method, and color registration marks CR based on this mark image information are formed on the photoreceptor belt 60. The positions of the color registration marks formed on the photoreceptor belt 60 are detected by the registration sensors 12A and 12B. On the basis of the position detection of the color registration marks CR formed on the photoreceptor belt 60, the adjustment of the forming positions of component color images are carried out. By the control device 15, on the basis of the output of the registration sensors 12A etc., with the color registration marks for the color BK taken as the reference, the image forming units 10C', 10M', and 10Y' for the other colors C, M, and Y are controlled. By this control, the writing positions for the colors C, M, and Y are adjusted to come to agree with the writing position for the color BK.

Further, if the second adjustment mode is set in the step M5, reversed mark image data DP are read out according to the second mark producing method, and reversed color registration marks based on these reversed mark image data DP are formed on the photoreceptor belt 60 by the image forming units 10Y', 10M', 10C', and 10K'. It is practiced to adjust the forming positions of component color images on the basis of the position detection of the mark images defined by the void portions of these reversed color registration marks RCR formed on the photoreceptor belt 60.

Another Example at the Time of Detecting Scratches Being Present or Not

Figure 42:
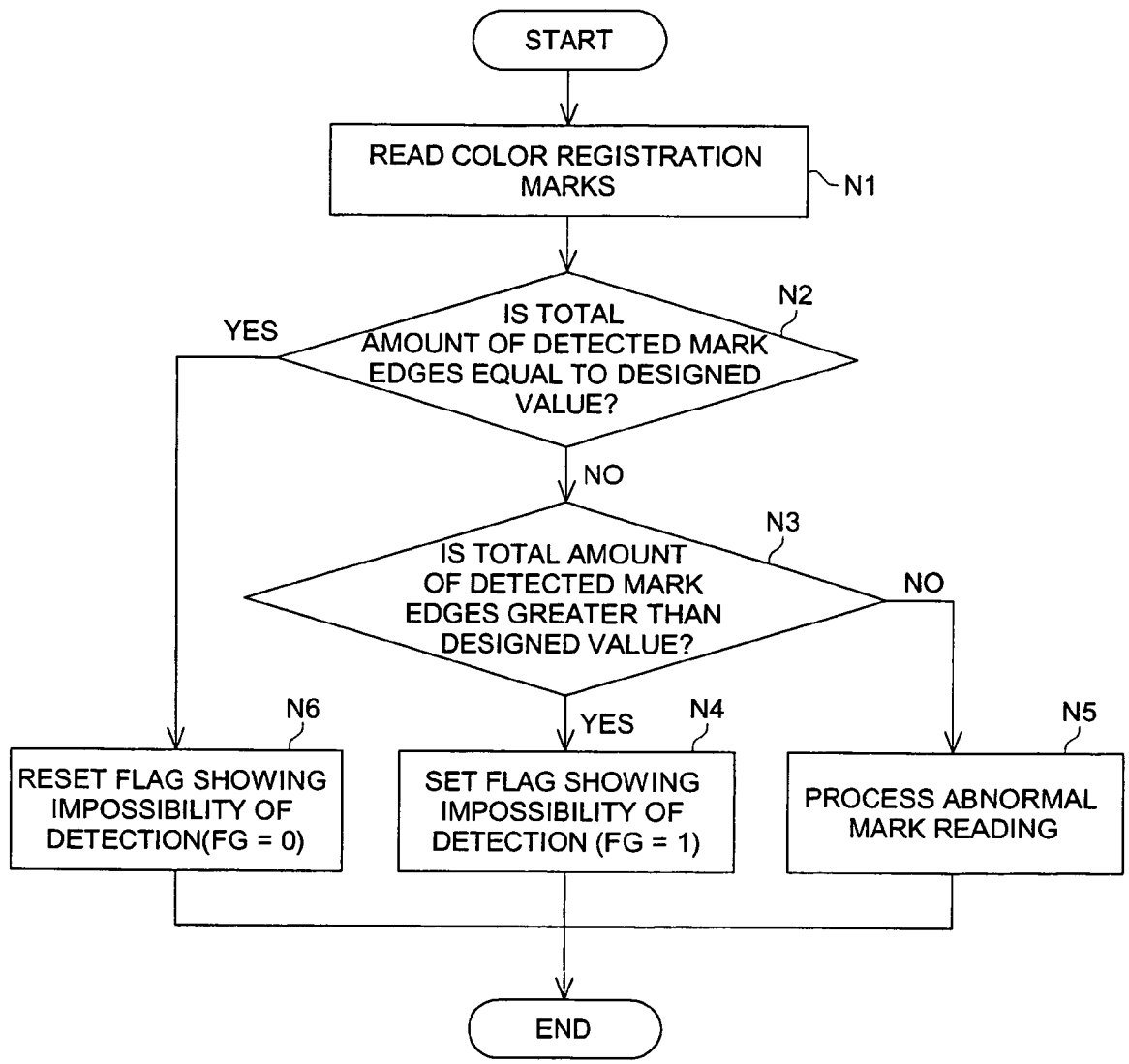
FIG. 42 is a flow chart showing another example of the operation (at the time of detecting the presence or absence of a scratch) of the color image forming apparatus 600.

FIG. 42 is a flow chart showing another example of the operation (at the time of detecting scratches being present or not) of the color image forming apparatus 600.

In this example, there is provided the mark detection judging means made up of the registration sensors 12, the storage device 14, and the control device 15 explained in FIG. 37; when the surface state of the registration mark formation area of the photoreceptor belt 60 is detected by the registration sensors 12, non-reversed color registration marks CR are formed and the total number of the mark edges are compared with the design value; after that, the detection unable flag is set on the basis of the result of the comparison, and then, the adjustment mode is reconsidered.

That is, as regards non-reversed color registration marks CR, the number of mark edges to be detected at the time of detecting the marks is definite beforehand according to the design value. If there is such a scratch as to induce an erroneous detection on the photoreceptor belt 60, the number of mark edges detected does not agree with the design value. Owing to it, the result of the calculation of color deviations etc. becomes inappropriate to make it impossible to carry out the correction processing normally. This number of mark edges detected is adopted as the basis of the judgement whether the detection is to be regarded as an erroneous one or not. Accordingly, regardless of the presence or absence of a scratch, non-reversed color registration marks CR are formed on the photoreceptor belt 60 by the first mark producing method.

With this taken as a prior condition, first, in order to detect the surface state of the registration mark formation area of the photoreceptor belt 60, the reading processing of non-reversed color registration marks CR is practiced in the step N1 of the flow chart shown in FIG. 42. Then, the procedure moves to the step N2, where the number of mark edges are compared with the design value. If the total number of mark edges does not agree with the design value, the procedure moves to the step N3. In the step N3, it is detected if the total number of mark edges exceeds the design value. If the total number of mark edges exceeds the design value, because the surface state of the registration mark formation area is deteriorated due to the change with the passage of time, the procedure moves to the step N4, where the detection unable flag FG is set to establish FG=1.

Further, if the total number of mark edges agrees with the design value in the step N2, because the surface state of the registration mark formation area is good, the procedure moves to the step N6, where the detection unable flag FG is reset, to establish FG=0. The detection unable flag FG is memorized temporarily in the RAM 57. The processing after that is carried out in such a way as to follow the example of setting of the positional deviation adjustment mode shown in FIG. 33.

Besides, if the total number of mark edges does not reach the design value in the step N3, the procedure moves to the step N5, where a processing for abnormal mark reading is practiced. In this processing, that the formation of non-reversed color registration marks CR is not good, that setting of positional deviation adjustment mode from now on should not be made, etc. are indicated on the display device. As regards the processing after that, the same processings as those of the flow chart shown in FIG. 33.

As explained in the above, according to the color image forming apparatus and its image forming method of the example 1 of this invention, there is provided the mark detection judging means made up of the registration sensors 12, the storage device 14, and the control device 15, the surface state of the registration mark formation area of the photoreceptor belt 60 is detected by the registration sensors 12, and the detection unable flag FG is prepared in the control device 15. At the time of detecting color registration mark edges, whether or not an erroneous detection is to be made by the registration sensors 12A etc. is judged by the detection unable flag FG.

Accordingly, in the case where the photoreceptor belt 60 is newly used, in the case where said intermediate transfer belt 6 has been just replaced with a new one, etc., the forming positions of component color images can be adjusted on the basis of the position detection of color registration marks CR. In the case where scratches etc. are produced on the photoreceptor belt 60 owing to the change with the passage of time caused by maintenance operations, wear of parts, etc., the scratches etc. can be covered by reversed color registration marks RCR; therefore, the proper positions of mark images can be exactly detected.

Owing to this, the forming positions of component color images can be adjusted on the basis of high-reliability position detection signals S2 with no noise signal due to scratches etc. superposed. Further, because component color images can be exactly superposed on the photoreceptor belt 60, it is possible to transfer a color image on a desired paper sheet P at a high accuracy.

EXAMPLE 2

Figure 43:
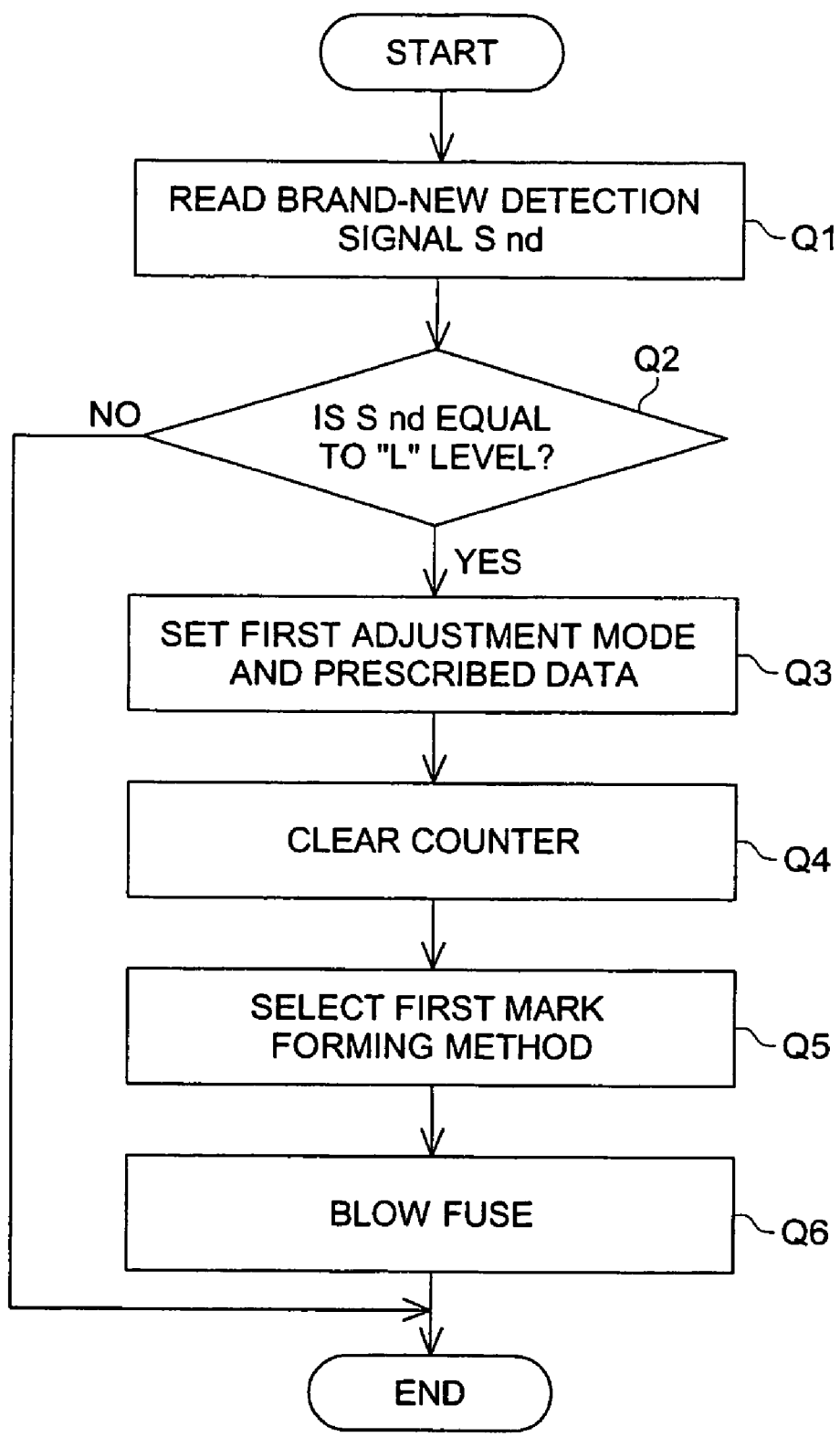
FIG. 43 is a flow chart showing an example of the operation of the color image forming apparatus 600 as the second example of this invention.

FIG. 43 is a flow chart showing an example of the operation of the color image forming apparatus 600 as the second example of the present invention.

In this example, a fuse F for detecting a new belt is attached to the photoreceptor belt 60, and a new belt unit detection circuit 90 (NEW detection means) for melting off said fuse F is provided in the control device 15; in the case where the photoreceptor belt 60 is newly used or in the case where said photoreceptor belt 60 has been just replaced with a new one, the fuse F is melted off. In accordance with the result of the judgement concerning whether the fuse F is melted off or not, the mark producing method is switched over, to carry out the detection of registration marks.

This is based on it that the fuse F is in the through-conduction state when the photoreceptor belt (the belt unit) 60 is new, and the belt unit can be judged as one in use when the fuse F is opened. As the result of this, image formation processing is carried out in the first adjustment mode for adjusting the forming positions of component color images on the basis of a new belt detection signal Snd obtained from this new belt unit detection circuit 90.

With this taken as an operation condition, the control device 15 reads out a new belt detection signal Snd from the new belt unit detection circuit 90 in the step Q1 of the flow chart shown in FIG. 43. Then, it is judged in the step Q2 whether or not the new belt detection signal Snd is of "L" level. If the new belt detection signal Snd is of "L" level, because the belt unit is new, the procedure moves to the step Q3, where the first adjustment mode is set, and a processing for setting predetermined data required is carried out.

After that, the procedure moves to the step Q4, where the counter is cleared, and further, the procedure moves to the step Q5, where the selection of the first mark producing method etc. are practiced. Then, the procedure moves to the step Q6, where the melting-off processing of the fuse F is carried out. In this processing, the fuse F is forcibly opened by it that an externally set signal Sop is supplied to the new belt unit detection circuit 90, the transistor TR turns on, and an excessive electric current is made to flow through the fuse F to melt it off, and the belt is brought in a state of use. After the fuse F is opened, a new belt detection signal of "H" level is made to be outputted from the new belt unit detection circuit 90 to the control device 15.

In this example, it is practiced that non-reversed color registration marks CR are formed on the registration mark formation area of the photoreceptor belt 60 on the basis of a new belt detection signal Snd of "L" level obtained from the new belt unit detection circuit 90. If the new belt detection signal Snd is not of "L" level in the step Q2, that is, if the new belt detection signal is of "H" level and the belt unit is already in use, the procedure is completed without carrying out the new belt processing.

Besides, as shown in the first example, in the case where the setting has been switched over from the first adjustment mode to the second adjustment mode, and the control device 15 controls the image forming units 10Y', 10M', 10C', and 10K' on the basis of the second adjustment mode, when the belt unit is replaced with a new one and the new belt detection signal Snd becomes of "L" level, that is, "the photoreceptor belt 60 is new" is indicated, it is practiced to switch over the processing automatically from the second adjustment mode to the first adjustment mode.

As explained in the above, according to the color image forming apparatus and its image forming method of the second example of the present invention, the fuse F for detecting a new belt is attached to the photoreceptor belt 60, the control device 15 is equipped with the new belt detection circuit 90, and when the photoreceptor belt 60 is newly used or when the photoreceptor belt 60 has been just replaced with a new one, the fuse F is melted off. In accordance with the result of the judgement concerning whether the fuse F is melted off or not, the mark producing method is switched over, to carry out the detection of registration marks.

Accordingly, in the case where the photoreceptor belt 60 is newly used, in the case where said photoreceptor belt 60 has been just replaced with a new one, etc., the forming positions of component color images can be adjusted on the basis of the position detection of color registration marks CR. In the case where scratches etc. are produced on the photoreceptor belt 60 owing to the change with the passage of time caused by maintenance operations, wear of parts, etc., the scratches etc. can be covered by reversed color registration marks RCR; therefore, the proper positions of mark images can be exactly detected.

Owing to this, the forming positions of component color images can be adjusted on the basis of high-reliability position detection signals S2 with no noise signal due to scratches etc. superposed. Further, because component color images can be exactly superposed on the photoreceptor belt 60, it is possible to transfer a color image on a desired paper sheet P at a high accuracy.

EXAMPLE 3

Figure 44:
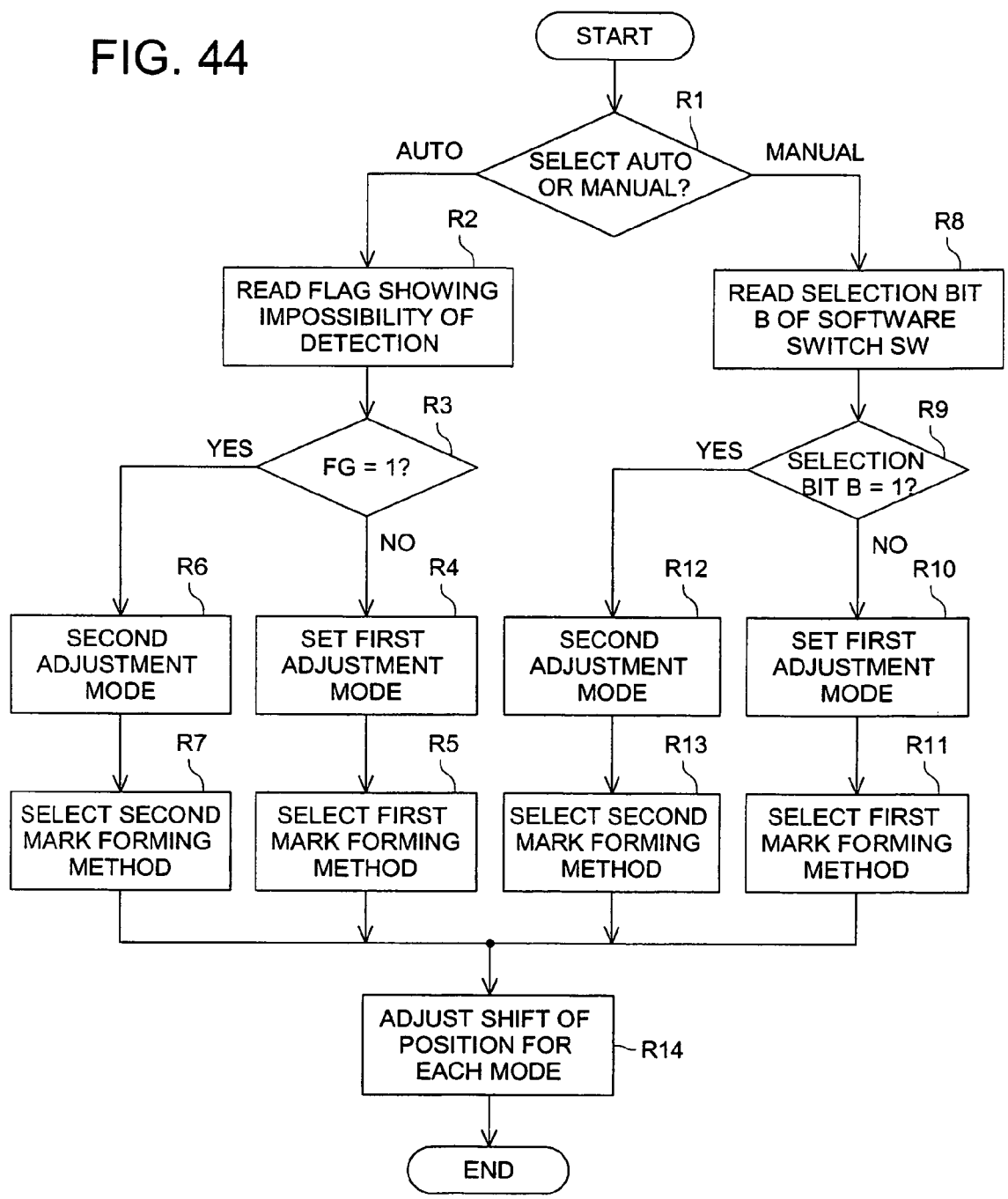
FIG. 44 is a flow chart showing an example of the operation of the color image forming apparatus 600 as the third example of this invention.
Figure 45:
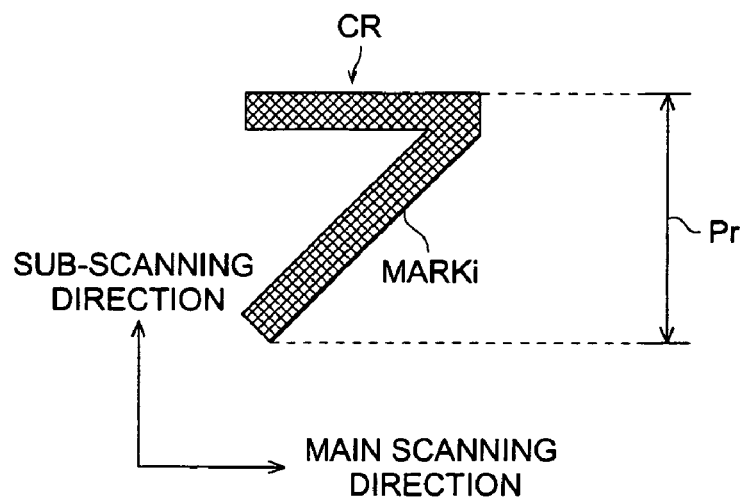
FIG. 45(A) and FIG. 45(B) are drawings showing an example of the printing of a color registration mark CR and an example of the waveform of a passage timing pulse signal SP based on this in the embodiment 7 of this invention.
Figure 45:
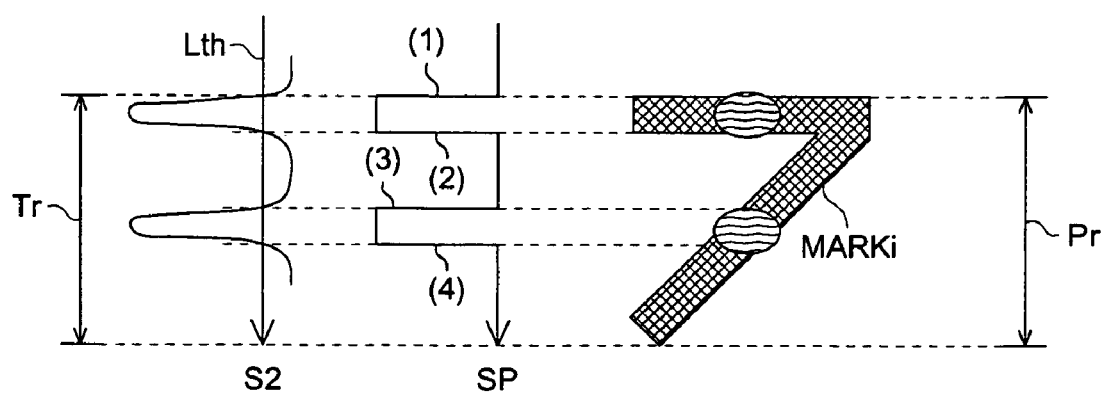
Figure 46:
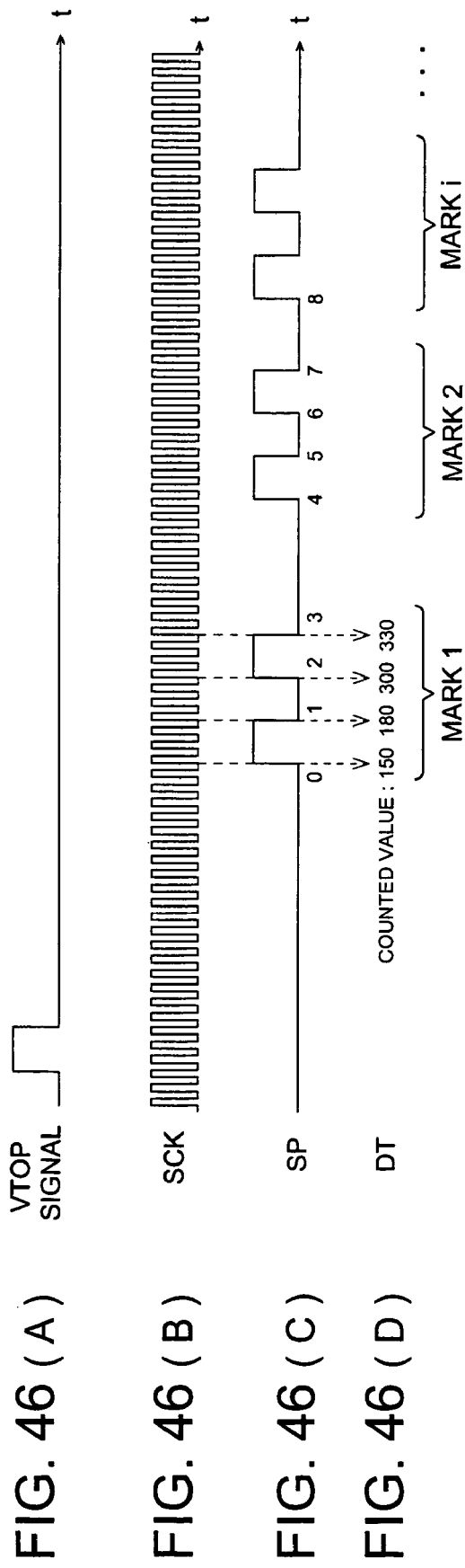
FIG. 46(A) to FIG. 46(D) are waveform drawings showing an example of the output of passage time data DT based on a passage timing pulse signal.
Figure 48:
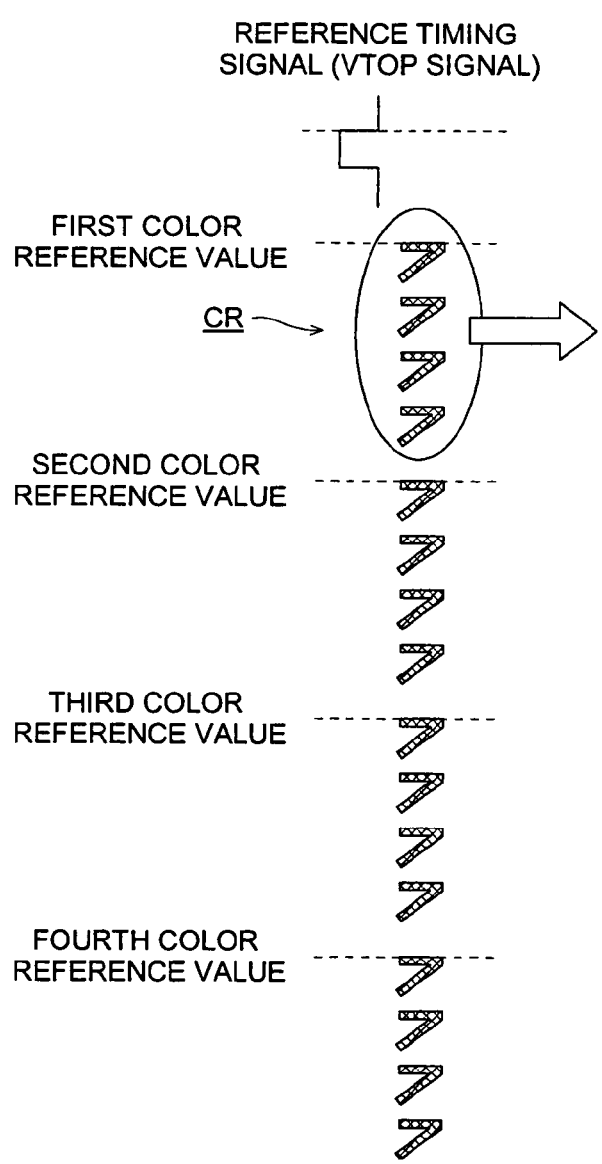
FIG. 48(A) and FIG. 48(B) are a drawing showing an example of the formation of color registration marks of the first color to the fourth color and a conceptual drawing showing an example of the setting of unit basic ranges Pr in color registration marks CR of the first color respectively.
Figure 48:
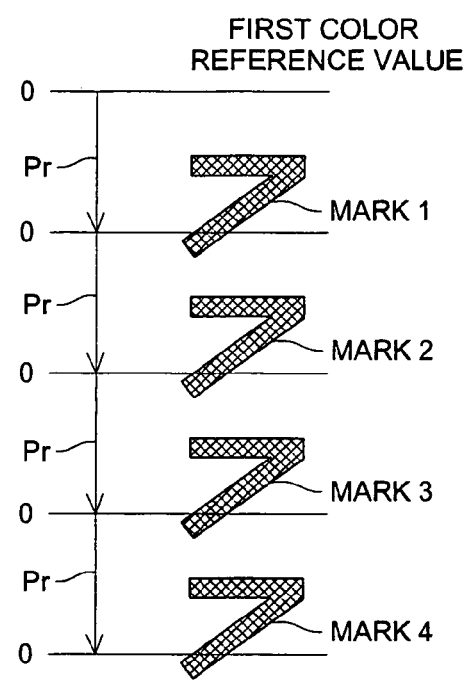

FIG. 44 is a flow chart showing an example of the operation of the color image forming apparatus 600 as the third example of the present invention.

This example is premised on the case where automatic or manual selection is set by the use of the operation means 18 shown in FIG. 16, and on the basis of this, either the first adjustment mode or the second adjustment mode is set.

With this taken as a condition of operation, the control is bifurcated in the control device 15 through the setting of automatic or manual selection in the step R1 of the flow chart shown in FIG. 44. Automatic or manual selection is set by the operation screen P1 for key operation. If the selection bit A of the software switch SW3 is "0", to set automatic selection, the procedure moves to the step R2, where it is judged by the control device 15 whether the detection unable flag FG is "1" or "0". If the detection unable flag FG=0, the procedure moves to the step R4, where the first adjustment mode is set, and the procedure moves to the step R5, where the firs mark producing method is selected. After that, the procedure moves to the step R14.

If the detection unable flag FG=1 in the step R2, the procedure moves to the step R6, where the second adjustment mode is set, and the procedure moves to the step R7, where the second mark producing method is selected. After that, the procedure moves to the step R14.

Further, in the case where the selection bit A of the software switch SW3 is "1", to set manual selection in the step R1, the procedure moves to the step R8, where the selection bit B of the software switch SW3 is read. Then, the procedure moves to the step R9, where it is judged whether the selection bit B is "1" or "0". If the selection bit B is "0", the procedure moves to the step R10, where the first adjustment mode is set, and the procedure moves to the step R11, where the first mark producing method is selected. After that, the procedure moves to the step R14.

If the selection bit B is "1" in the step R2, the procedure moves to the step R12, where the second adjustment mode is set, and the procedure moves to the step R13, where the second mark producing method is selected. After that, the procedure moves to the step R14. In the step R14, in the same way as the second example, positional deviation processing is carried out on the basis of the selected adjustment mode.

For example, in the case where the first adjustment mode is set in the above-mentioned step R4 or R9, mark image information is read out according to the first mark producing method in the step R5 or R11, and color registration marks CR based on this mark image information are formed on the photoreceptor belt 60. The positions of the color registration marks CR formed on the photoreceptor belt 60 are detected by the registration sensors 12A and 12B. It is practiced to adjust the forming positions of component color images on the basis of the position detection of these color registration marks CR formed on the photoreceptor belt 60. With the color registration marks CR for the color BK taken for the reference, the control device 15 controls the image forming units 10C', 10M', and 10Y', for the other colors C, M, and Y. By this control, the writing positions for the colors C, M, and Y are adjusted to come to agree with the writing position for the color BK.

Further, in the case where the second adjustment mode is set in the step R6 or R12, reversed mark image data DP are read out according to the second mark producing method, and reversed color registration marks RCR based on this reversed mark image data DP are formed on the photoreceptor belt 60 by the image forming units 10Y', 10M', 10C', and 10K'. On the basis of the position detection of the mark images defined by the void portions of these reversed color registration marks RCR formed on the photoreceptor belt 60, it is practiced to adjust the forming positions of component color images.

As explained in the above, according to the color image forming apparatus and its image forming method of the third example of the present invention, automatic or manual selection is set by the use of the operation means 18, and on the basis of this, it is practiced to set either the first adjustment mode or the second adjustment mode.

Accordingly, in the case where the photoreceptor belt 60 is used for the first time, in the case where said photoreceptor belt 60 has been just replaced with a new one, etc., the forming positions of component color images can be adjusted on the basis of the position detection of color registration marks CR. In the case where scratches etc. are produced on the photoreceptor belt 60 owing to the change with the passage of time caused by maintenance operations, wear of parts, etc., the scratches etc. can be covered by reversed color registration marks RCR; therefore, the proper positions of mark images can be exactly detected.

Owing to this, the forming positions of component color images can be adjusted on the basis of high-reliability position detection signals S2 with no noise signal due to scratches etc. superposed. On top of it, the amount of toner used in the formation of color registration marks can be suppressed. Further, because component color images can be exactly superposed on the photoreceptor belt 60, it is possible to transfer a color image on a desired paper sheet P at a high accuracy.

As has been explained up to now, according to the first image forming apparatus and image forming method of the present invention, there is provided a control device for controlling image forming means on the basis of the output of a density detection system and a position detection system for toner images; this control device detects the density of patch images for color density correction by means of the position detection system for monochromatic (toner) images, and corrects the binarization reference value for the position detection of mark images on the basis of density detection signals of the patch image outputted from said position detection system.

By this structure, the binarization reference value for the position detection of mark images can be corrected in such a way as to be adapted for the condition of use of the image transfer means. Accordingly, even if the condition of use changes with the passage of time caused by the change of reflection light quantity at the intermediate transfer belt or photoreceptor belt making up the image transfer system, the reduction of light emission quantity of the sensors, etc., the proper forming positions of component color images can be exactly detected; therefore, the forming positions of component color images can be adjusted at a high accuracy on the basis of a high-reliability position detection signal. Owing to this, because component color images can be superposed exactly by the image forming means, a color image can be transferred onto a desired transfer paper sheet at a high accuracy.

According to the second image forming apparatus and image forming method of the present invention, in order that a color image may be formed through the superposition of the component color images on the basis of arbitrary image information, with a control device for controlling an image forming means on the basis of reversed mark images as the reversed ones of mark images for the registration of component color images provided, at least, reversed mark images are formed beforehand by the image forming means, and after that, the image forming means are controlled in such a way as to adjust the forming positions of component color images on the basis of the position detection of the mark images defined by the void portions of the reversed mark images.

By this structure, because areas other than the void portions defining mark images can be covered by the reversed mark images, even if scratches etc. are produced on the intermediate transfer belt or photoreceptor belt making up the image transfer system due to the change with the passage of time caused by maintenance operations, wear of parts, etc., the proper positions of the mark images can be exactly detected. Accordingly, the forming positions of component color images can be adjusted at a high accuracy on the basis of high-reliability position detection signals with no noise signal due to scratches etc. superposed. Owing to this, because component color images can be superposed exactly on the image transfer means or image forming member, a color image can be transferred onto a desired transfer paper sheet at a high accuracy.

According to the third image forming apparatus and image forming method of the present invention, a control device for controlling the image forming means on the basis of the position detection of monochromatic images is provided, and this control device forms, at least, mark images or reversed mark images as the reversed ones of said mark images for the registration of component color images by the image forming means in accordance with the state of use of the intermediate transfer belt or photoreceptor belt, and controls the image forming means in such way as to adjust the forming positions of component color images on the basis of the position detection of the mark images or the mark images defined by the void portions of the reversed mark images formed by this image forming means.

By this structure, in the case where the image transfer means or image forming member making up the image transfer system is used for the first time, in the case where said image transfer means or image forming member is replaced with a new one, etc., the forming positions of component color images can be adjusted on the basis of the position detection of mark images. In the case where scratches etc. are produced on the image transfer means or image forming member owing to the change with the passage of time caused by maintenance operations, wear of parts, etc., the scratches etc. can be covered by the reversed mark images; therefore, the proper positions of the mark images can be exactly detected. Accordingly, the forming positions of component color images can be adjusted at a high accuracy on the basis of high-reliability position detection signals with no noise signal due to scratches etc. superposed.

It is extremely appropriate to apply this invention to a color printer or copying machine of a tandem type having an intermediate transfer belt or a photoreceptor belt.

(7) Embodiment 7

In the following, with reference to the drawings, FIG. 1 to FIG. 4, FIG. 9, and FIG. 45 to FIG. 53, an image forming apparatus and an image forming method of the embodiment 7 of the present invention for accomplishing its second object will be explained.

A color image forming apparatus 100 shown in FIG. 1 as a conceptual drawing is also an example of the structure of an image forming apparatus of the Embodiment 7.

In this example of the embodiment, in order that a color image may be formed through the superposition of component color images on the basis of arbitrary image information, a control device for controlling an image transfer means or/and an image forming units on the basis of the positions of series of mark images for the registration of component color images is provided, concerning the mark images for the registration of component color images formed on the image transfer means, position data representing the forming positions of the mark images with respect to a reference value determined arbitrarily are obtained, the position data of the mark images for the respective colors are sorted into groups for their respective unit basic ranges, concerning the position data sorted for each unit basic range, an operation processing for converting them into those based on respective reference values representing the front edge of the unit basic ranges concerned is carried out, the position data representing ranges common to the mutually overlapping ranges each of which is represented by a couple of position data corresponding to the rising and falling edges of a passage timing pulse are extracted as the position data of the mark images for the registration of component color images, and positional deviations of the component color images from one another are calculated on the basis of the position data extracted in the above.

By doing this, it becomes possible to eliminate the data representing a range not overlapped by any other range represented by a pair of position data as position data concerning scratches. On top of it, even in the case where position data containing data of scratches are obtained due to the use of image transfer means with the passage of time, it is possible to extract position data not containing the influence of scratches for each of the colors.

FIG. 45(A) is a drawing showing an example of a color registration mark CR printed, and FIG. 45(B) is a drawing showing an example of the waveform of a position detection signal S2 by a registration sensor 12A or the like and that of a passage timing pulse signal SP.

The color registration mark CR shown in FIG. 45(A) is an example of the mark images, and with the running direction of the intermediate transfer belt 6 taken as the sub-scanning direction and the direction perpendicular to this sub-scanning direction taken as the main scanning direction, each mark is formed of a combination of a line image parallel to the main scanning direction and an oblique line image not perpendicular to the main scanning direction. For example, as regards the color registration marks CR, each one of them, MARKi is formed in a 7-shape. The registration marks, MARK's are formed serially one after another in a specified unit basic range Pr on the intermediate transfer belt 6.

The reason for the shape being made such one is that the forming positions of marks can be detected. The forming position of a mark is detected by the timings when the edges of a registration mark MARK pass under the registration sensor 12A or the like. In this example, the position detection signal S2 outputted by the registration sensor 12A or the like shown in FIG. 9 is binarized on the basis of a specified threshold voltage Lth shown in FIG. 45(B).

In this example, a position detection signal S2 is rising at the time when it crosses the threshold line Lth at the edge (1) of a line image parallel to the main scanning direction, and after that, the signal S2 is falling at the edge (2). Subsequently, the position detection signal S2 is rising at the time when it crosses the threshold line Lth at the edge (3) of the oblique line image not perpendicular to the main scanning direction, and after that, the signal S2 is falling at the edge (4). That is, from one 7-shaped registration mark (MARK), two pulses are obtained. These pulses makes up a passage timing pulse signal SP.

This passage timing pulse signal SP is outputted from a comparator 59 shown in FIG. 3 through a mask generation circuit 515 to a latch circuit 56, and is used as the reference for adjusting the positional deviations of component color images. In this example, the amount of deviations of the writing positions for the colors Y, M, and C with respect to the writing position for the color BK are calculated.

According to this method of forming color registration marks CR, it is to be considered a case where belt scratches which happen to be produced on the parts having no toner particle deposited due to the change of the intermediate transfer belt 6 with the passage of time make noises to be erroneously detected by the registration sensors 12A etc., which becomes the cause of lowering the S/N ratio of the position detection signal S2. Therefore, by a method of this invention, it is put into practice to eliminate a noise signal due to a belt scratch by data processing.

In this example, as shown in FIG. 45(B), a unit basic term Tr is determined for each of the mark portions of the position detection signal S2 of each component color, and in this unit basic term Tr, the pulse width corresponding to the period of time of the position detection signal S2 being of "H" level is obtained. The pulse width obtained in this way is the period of time from the rising edge (1) of the position detection signal S2 to the falling edge (2), or the period of time from the rising edge (3) to the falling edge (4).

This period of time of "H" level represents the range where a registration mark MARKi is present (a range where a mark is formed). This period of time of "H" level is obtained for all the registration marks MARKi. After that, each period of time of "H" level is converted into time data within one unit basic term Tr containing all registration marks MARKi, and the ranges having a maximum frequency of occurrence are used as position data at the time of detecting marks of the color concerned.

FIG. 46(A) to FIG. 46(D) are waveform drawings showing an example of the output of passage time data DT based on a passage timing pulse signal SP.

In this example, the passage time data DT sampled by a passage timing pulse signal SP within a unit basic term Tr correspond to (dependent on) the position data DP obtained within the unit basic range Pr on the intermediate transfer belt 6 by the measurement of the forming position of each registration mark from the reference position. This time-position relationship is utilized in the detection of position data DP.

That is, by subtracting an arbitrary reference value from the passage time data DT, the position data DP are obtained. For the position data DP of registration marks of each of the component colors, first, reference values for the position data DP of the respective component colors are determined to be the design values obtained theoretically, and the values of position data DP are reduced to those with respect to the above-mentioned reference value concerned. Then, in order to sort these position data DP into groups for the respective unit basic ranges Pr, all the position data DP are sorted into groups for their respective unit basic ranges Pr. As regards the position data DP for each of the component colors after being sorted, the position data DP in each unit basic range having the above-mentioned reduced values based on the theoretical reference values are to be converted into position data based on a reference value determined to represent the front edge of the unit basic range Pr concerned. For this purpose, all the data values corresponding to the registration marks of the component color concerned are divided by the value of the unit basic range Pr, to obtain remainders. The remainders have approximately the same values for each of the unit basic ranges Pr, to become position data DP corresponding to the positions of the registration marks in the respective unit basic ranges Pr. This operation is carried out for each of the component colors, and position data DP with respect to the respective reference values are obtained for the respective component colors.

As regards the position data DP for each unit basic range Pr for each of the component colors obtained by the above-mentioned operation, position data DP in one unit basic range Pr are compared with those in the other unit basic ranges of the same color, to find overlapping ranges represented by the position data. The data representing the ranges common to the above-mentioned overlapping ranges can be regarded as the position data DP representing the position of the color registration marks CR of the color concerned.

In this example, when a VTOP signal shown in FIG. 46(A), a counter circuit 55 is actuated. The VTOP signal is supplied from a CPU 55 shown in FIG. 3 to the counter circuit 54 as a reset signal. In the counter circuit 54, a system clock signal SCK shown in FIG. 46(B) is counted.

In the latch circuit 56 connected to this counter circuit 54, when a registration mark MARKi shown in FIG. 45(A) is detected by the registration sensor 12A or the like, count values Cout are latched on the basis of, for example, the rising edges "0, 2, 4, 6, 8, . . . " or the falling edges "1, 3, 5, 7, . . . " of a passage timing pulse signal SP concerning the registration marks MARK1, MARK2, MARK3, . . . shown in FIG. 45(C).

In this example, the count values Cout "150" for the rising edge "0" of the passage timing pulse signal SP at the registration mark MARK1, "180" for the falling edge "1", "300" for the rising edge "2", "330" for the falling edge "3", . . . are latched in the same way, and these count values Cout become the passage time data DT of the registration mark MARK1 shown in FIG. 46(D). For the other registration marks MARK2, MARK3, . . . , the passage time data DT are obtained in the same way.

Accordingly, the passage time data DT of one registration mark MARK1 are composed of four data, two rising time data and two falling time data in total. Supposing that color registration marks CR of one color are composed of registration marks MARK1 to MARK4 for i=4, 64 passage time data DT in total for the colors Y, M, C, and K are obtained. These passage time data DT are stored in a RAM 57 shown in FIG. 3.

In this example, in the CPU 55 shown in FIG. 3, it is practiced to calculate the forming positions of color registration marks CR of the respective colors Y, M, C, and K with respect to the reference values from the passage time data DT stored in the RAM 57, for the purpose of converting the passage time data into the position data DP.

FIG. 47(A) to FIG. 47(C) are drawings showing an example of the processing of the passage time data DT concerning the forming positions of registration marks CR of the first color to the fourth color (Y, M, C, and BK).

According to an example of the record of the passage time data DT shown in FIG. 47(A), concerning the registration mark MARK1, for example, count values Cout "150" for the No. 0 of a passage timing pulse signal SP, "180" for the No. 1, "300" for the No. 2, and "330" for the No. 3 are recorded in the same way.

Concerning the passage time data DT of the registration mark MARK2, count values Cout "410" for the No. 4 of a passage timing pulse signal SP, "440" for the No. 5, "560" for the No. 6, and "580" for the No. 7 are recorded in the same way. As regards the other registration marks MARK3 to MARK16, passage time data DT based on the passage timing pulse signal SP are stored for use in obtaining position data DP.

In this example, position data DP are obtained by the following conversion operation. Out of the count values Cout from the actuation of the counter circuit 54 by a VTOP signal up to the detection of the first registration mark MARK1, an arbitrary passage data DT is selected to set an arbitrary reference value. In this example, a passage time data "140" is selected for the arbitrary reference value. Position data DP are obtained by subtracting this passage time data "140" representing the reference value from each passage time data DT. By this operation, it becomes possible to specify the forming position of the registration mark MARK1 from the reference position.

According to an example of the record of position data DP shown in FIG. 47(B), because the passage time data showing the reference value is "140", concerning the registration mark MARK1, the passage time data DT="150" is converted into the position data DP="10", DT="180" is converted into the position data DP="40", DT="300" is converted into the position data DP="160", and DT="330" is converted into the position data DP="190"; these position data DP showing the forming position of this registration mark MARK1 are recorded in the RAM 57.

Concerning the registration mark MARK2, the passage time data DT="410" is converted into the position data DP="270", DT="440" is converted into the position data DP="300", DT="560" is converted into the position data DP="420", and DT="580" is converted into the position data DP="440"; these position data DT showing the forming position of this registration mark MARK2 are recorded in the RAM 57. As regards the other registration marks MARK3 to MARK16, the passage time data "140" showing the reference value is subtracted from each passage time data DT, and the position data DP representing the forming positions of the registration marks MARK1 to MARK16 are obtained. All the position data DP are stored in the RAM 57.

In this example, the position data DP of the registration marks MARK2 to MARK16 except the position data DP of the registration mark MARK1 are further converted into position data DP for the comparison of positions as described below, for the purpose of comparing the position data DP of the registration mark MARK1 with the position data DP of the other registration marks MARK2 to MARK16 on the basis of reference positions translated from the reference positions theoretically determined for the respective component colors by a multiple of unit basic range. The position data DP for the comparison of the positions are obtained for the purpose of eliminating data due to scratches from the position data of each registration mark MARKi.

In order to obtain the above-mentioned position data for the comparison of the positions, the position data DP of all the registration marks CR are sorted into groups for their respective unit basic ranges Pr. The unit basic range Pr is defined for the purpose of normalizing the range of comparison of a passage timing pulse signal SP. For example, the data representing the length of the unit basic range Pr has been designed to be 256 ("0" to "255"). The position data DP for the comparison of the positions are obtained by a division operation using all the position data of the registration marks MARK2 to MARK16 except the MARK1, which is taken as the reference, as the dividend and "256" as the divisor.

This division processing (operation processing) is done for the purpose of converting the position data DP into those based on the reference values of the respective unit basic ranges. The remainder of this division operation is regarded as the position data DP for the comparison of the positions, and the position data DP of the registration mark MARK1 and the position data DP for the comparison of the positions of the registration marks MARK2 to MARK16 are recorded in the RAM 57.

According to an example of the record of the position data for the comparison of positions shown in FIG. 47(C), because the data indicating the length of the unit basic range is "256", concerning the registration mark MARK2, when the position data DP=270 is divided by "256", the remainder becomes "14". This becomes the position data for the comparison of positions "14". By such operations, the position data DP of each registration mark MARKi of every component color are converted into the position data for the comparison of positions DP.

Accordingly, the position data DP="330" is converted into the position data for the comparison of positions "44", the position data DP="420" is converted into the position data for the comparison of positions "164", and the position data DP="440" is converted into the position data for the comparison of positions "184"; these position data for the comparison of positions DP are recorded in the RAM 57 together with the position data indicating the forming position of the registration mark MARK1.

FIG. 48(A) and FIG. 48(B) are conceptual drawings showing an example of the formation of color registration marks CR of the first to fourth color and an example of the setting of the unit basic range Pr for the color registration marks CR of the first color respectively. In this example, the writing position of the color registration marks CR of the first color (for example, the color BK) shown in FIG. 48(A) is determined to be the first reference value, the writing position of the color registration marks CR of the second color (for example, the color C) is determined to be the second reference value, the writing position of the color registration marks CR of the third color (for example, the color M) is determined to be the third reference value, and the writing position of the color registration marks CR of the fourth color (for example, the color Y) is determined to be the fourth reference value.

The color registration marks of the first color are formed between the first reference value and the second reference value. The color registration marks of the second color are formed between the second reference value and the third reference value. The color registration marks of the third color are formed between the third reference value and the fourth reference value. The color registration marks of the fourth color are formed below the fourth reference value.

FIG. 48(B) is an enlarged drawing extracted from FIG. 48(A) for the part surrounded by the ellipsoid. In the color registration mark CR of the first color shown in FIG. 48(B), with the area where each registration mark MARKi is formed made the unit basic range Pr, in the CPU 55, concerning color registration marks for the registration of component color images, it is practiced to obtain position data DP of each color registration mark CR with respect to the reference value for each unit basic range.

For example, in the CPU 55, the position data DP of the color registration marks of the first color are sorted for each of the four unit basic ranges Pr representing the forming positions of the color registration marks MARK1 to MARK4 respectively. Concerning the position data sorted for each unit basic range Pr in the above, as explained in FIG. 47(C), in order to convert the position data DP into those based on the reference values of the respective unit basic ranges, a division processing is carried out. By making the data values based on the respective reference values, it becomes possible to compare the position data DP of the first registration mark MARK1 with the position data of the other registration marks MARK2 to MARK4, and by the use of the result of this comparison, it is possible to eliminate data due to scratches etc.

Figure 49:
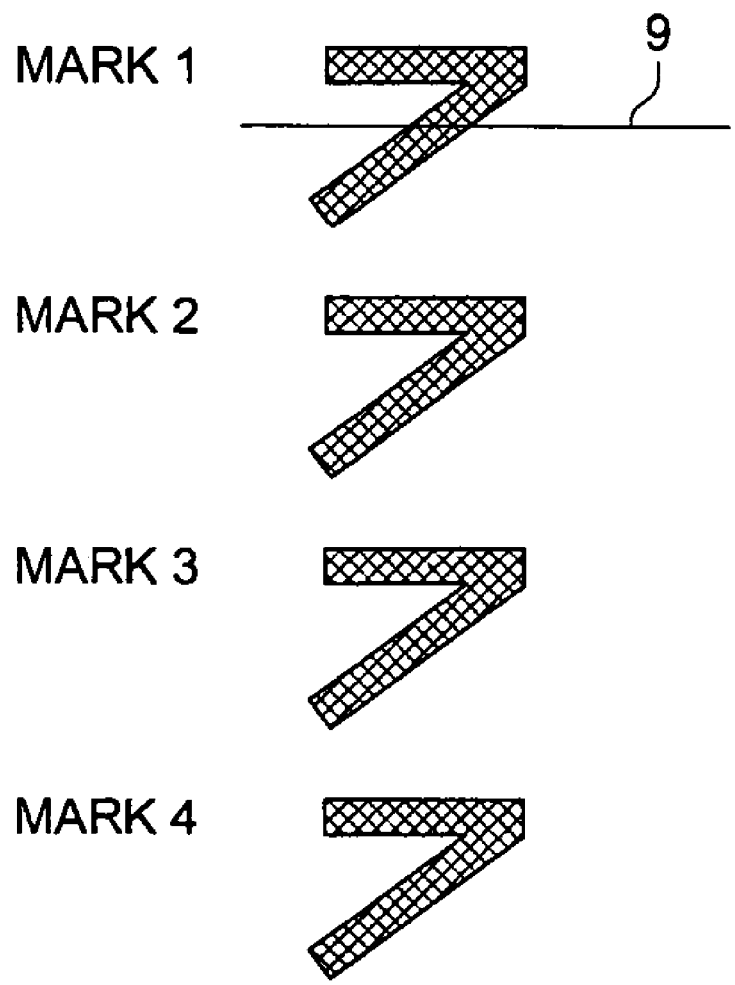
FIG. 49 is a drawing showing an example of a belt scratch 9 happening to come in the registration mark MARK1.
Figure 50:
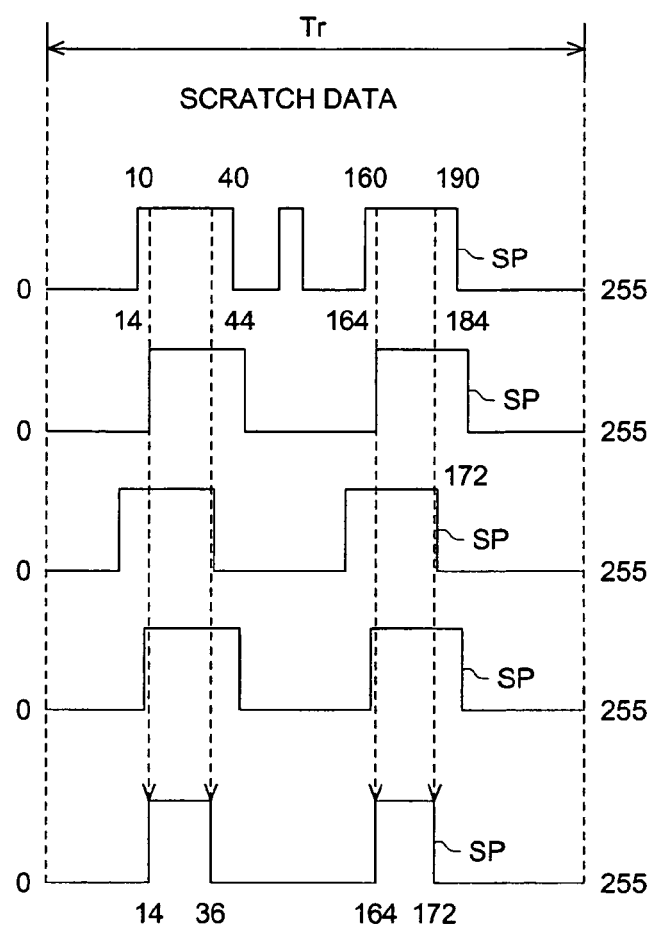
FIG. 50(A) to FIG. 50(E) are drawings showing an example of the operation for eliminating image data produced by the belt scratch 9 shown in FIG. 49.

FIG. 49 is a drawing showing an example of a belt scratch 9 having got mixed in the registration mark MARK1. FIG. 50(A) to FIG. 50(E) are drawings showing an example of the operation to eliminate scratch data due to the belt scratch 9.

In the example shown in FIG. 49, the belt scratch 9 is detected at the same time as the position detection of the color registration mark CR of the first color. In this example, the belt scratch 9 is produced at the registration mark MARK1. Accordingly, a scratch data as shown in FIG. 50(A) is contained in the position data DP of the registration mark of the first color MARK1. However, although the position data DP of any one of the registration marks have approximately the same values as those of the other registration marks, the scratch data have values different from any one of these position data DP so long as similar scratch data are not produced in the other registration marks MARK2 to MARK4.

That is, in this example, the position data DP for each of the component colors representing the front and rear edges of ranges common to the mutually overlapping ranges each of which is represented by a couple of position data corresponding to the rising edge and falling edge of a passage timing pulse in the unit basic range Pr concerned shown in FIG. 50(A) to FIG. 50(D) are extracted as the position data DP of the color registration marks of the color concerned for the color registration adjustment as shown in FIG. 50(E). Accordingly, the range represented by the scratch data is not overlapped by any one of the ranges represented by pairs of position data DP which have been subjected to the above-mentioned operation processing. Owing to this, it becomes possible to eliminate a scratch data due to the belt scratch 9 or the like with a good reproducibility. It is put into practice to calculate the amounts of positional deviations between color registration marks of the pertinent colors on the basis of the position data DP extracted here.

Figure 51:
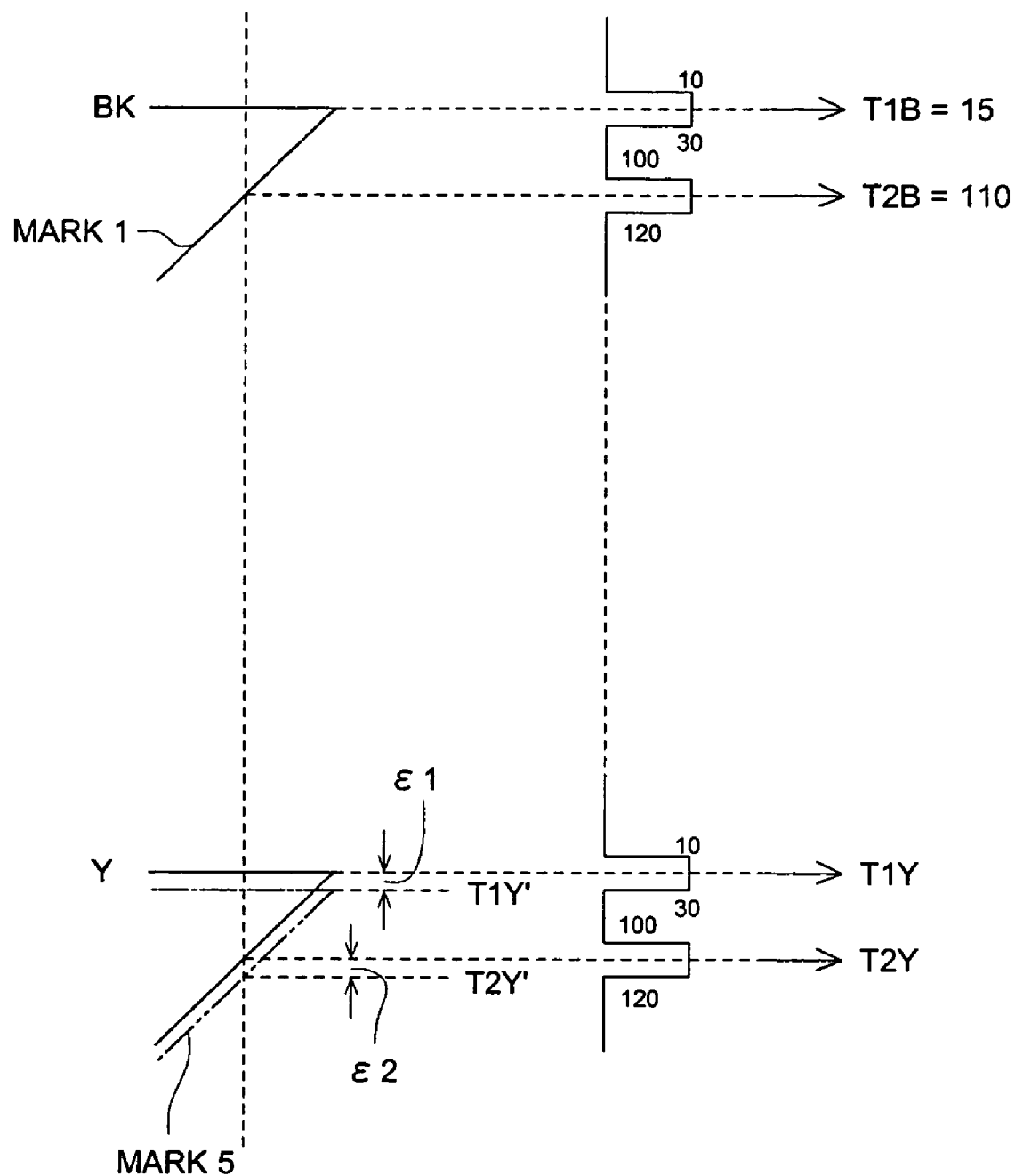
FIG. 51 is a conceptual drawing showing an example of the correction of a positional deviation by means of the CPU 55.

FIG. 51 is a conceptual drawing showing an example of the correction of positional deviation in the CPU 55. According to the example of positional deviation shown in FIG. 51, the image writing systems for the colors C, M, and Y are adjusted with the writing system for the color BK taken as the reference in the same way as conventional methods.

The position data DP for the color BK, for example, are expressed as (T1 B, T2B). The first data T1B indicates the passage time concerning the first rising edge and falling edge of the registration marks MARKi, and the second data T2B indicates the passage time concerning the next rising edge and falling edge. For example, in the case where the count value Cout denoting the first rising edge is "10", and the count value Cout denoting the falling edge is "30", the first data T1B is "20". In the case where the count value Cout denoting the next rising edge is "100", and the count value Cout denoting the falling edge is "120", the second data T1B is "110".

In the same way, the position data for the color Y are expressed as (T1Y, T2Y). The position data for the color M are expressed as (T1M, T2M), and the position data for the color C are expressed as (T1C, T2C) in the same way.

In this example, to take the position data DP for the color BK as the reference to adjust the writing position for the color Y, assuming that the position data DP for the color Y (T1Y, T2Y) represent the normal writing position, if the registration mark MARK5 of the color Y is retarded by $\epsilon$ for example, position data (T1Y', T2Y') are detected as the position data DP for the color Y as shown in FIG. 51. In order to correct this positional deviation, $\epsilon 1=(T1Y'-T1Y)$, $\epsilon 2=(T2Y'-T2Y)$ are calculated. The writing timing is adjusted in such a way that these position deviations $\epsilon 1$ and $\epsilon 2$ are made zero.

Figure 52:
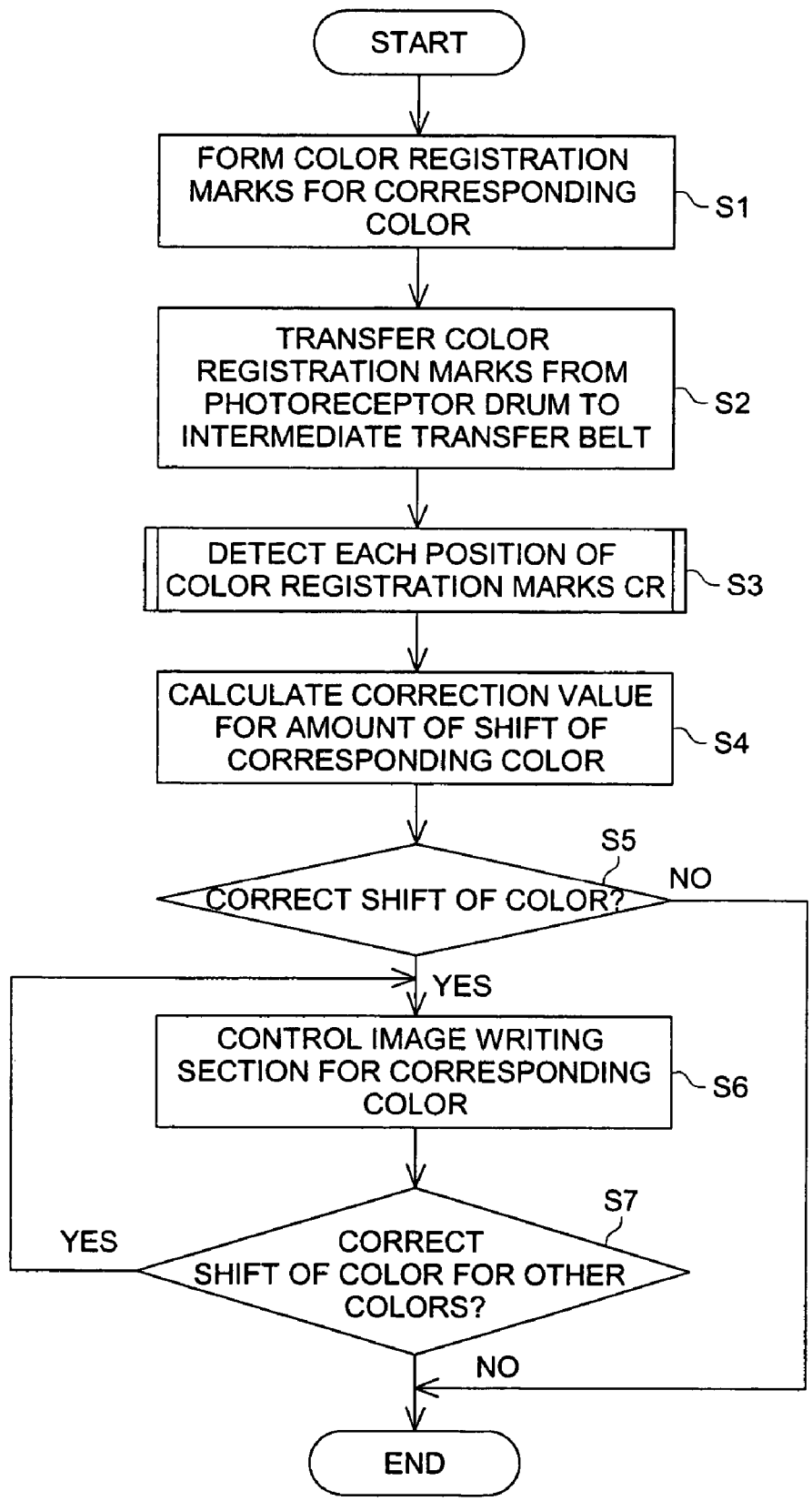
FIG. 52 is a flow chart showing an example of the operation of the color image forming apparatus 100 in the embodiment 7.
Figure 53:
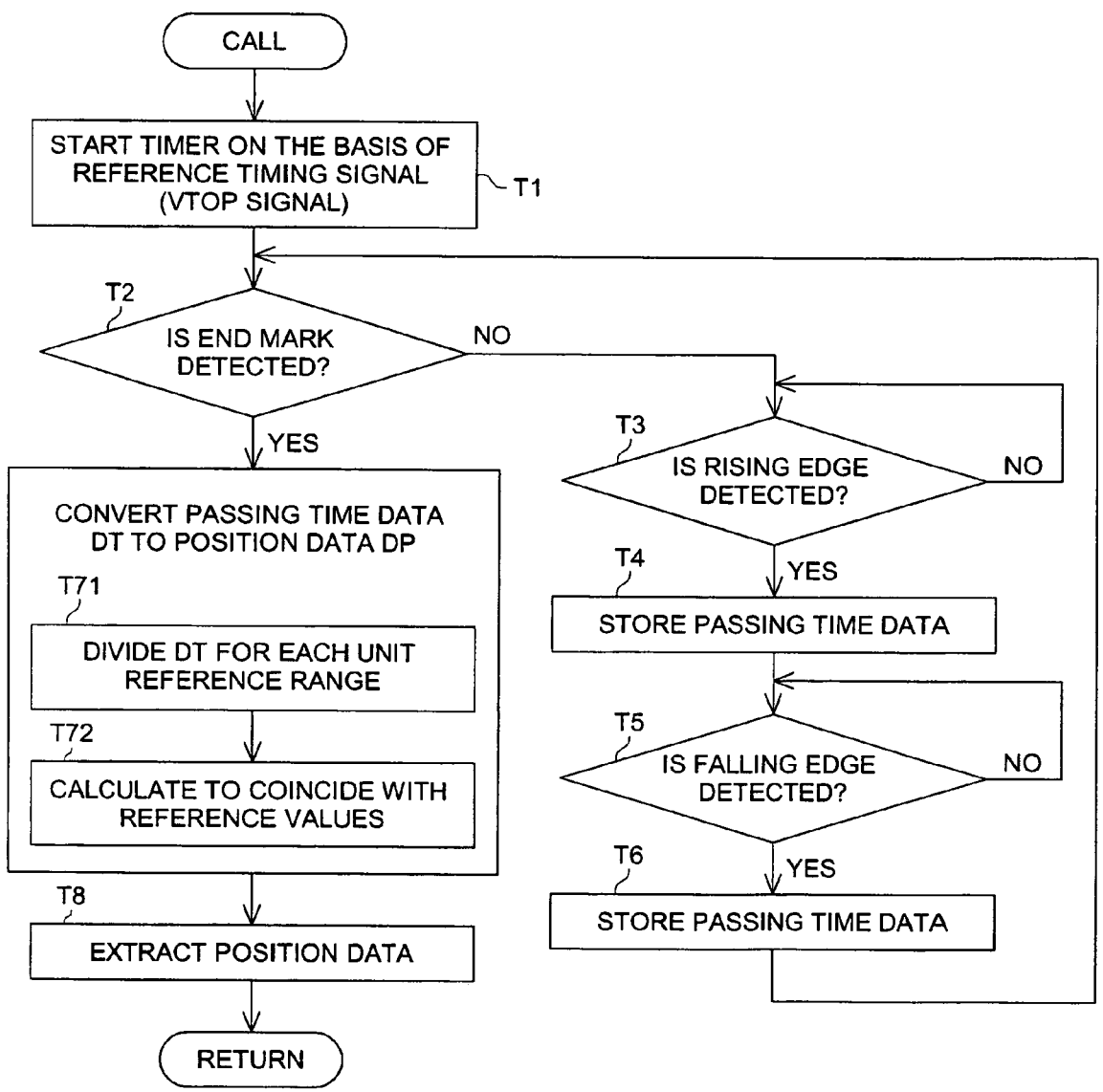
FIG. 53 is a flow chart showing an example of the acquisition of position data DP based on passage time data DT.
Figure 54:
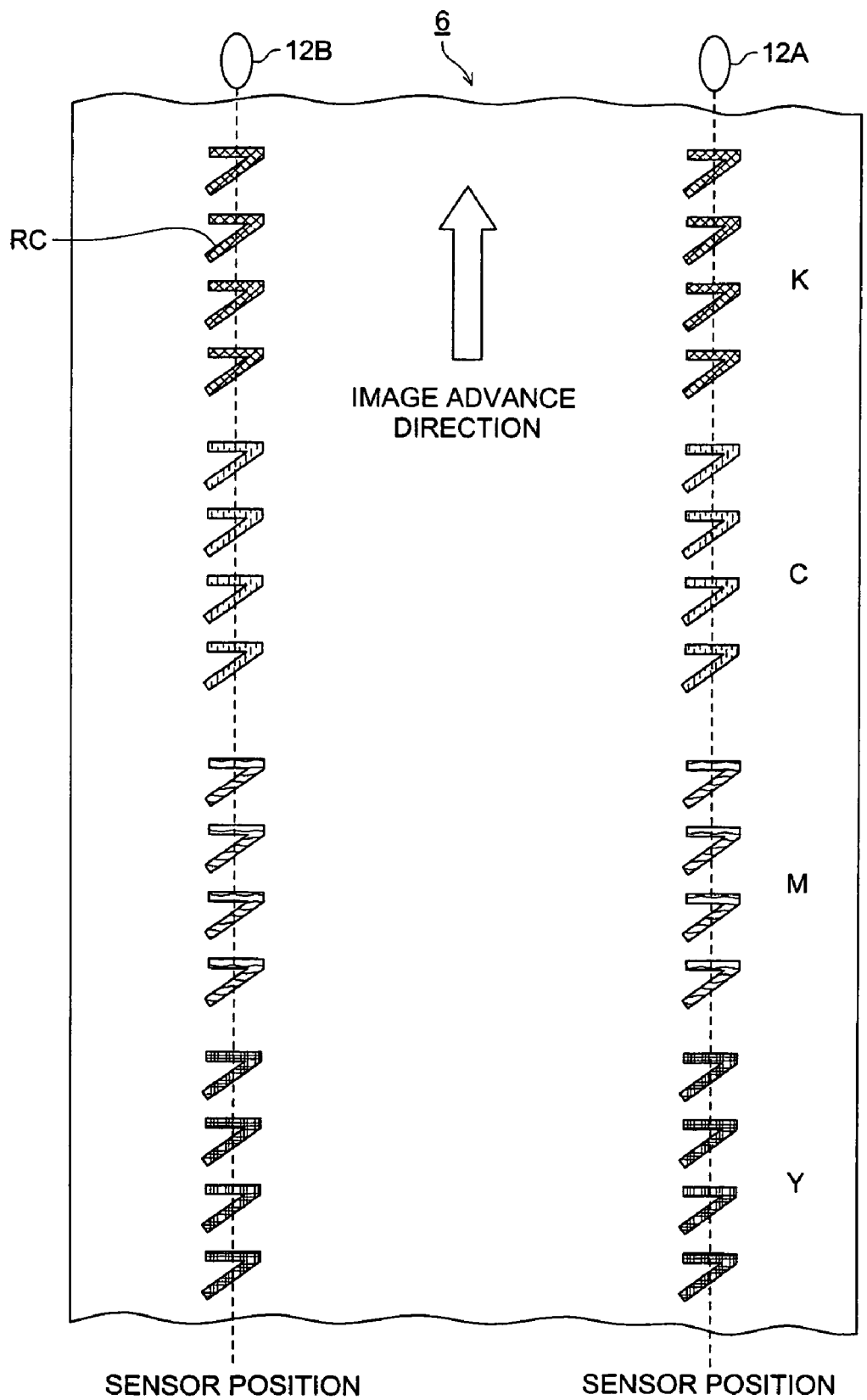
FIG. 54 is a drawing showing an example of the detection of color registration marks according to a prior art.

Subsequently, the image forming method of the present invention will be explained with reference to an example of the operation of the image forming apparatus 100. FIG. 52 is a flow chart showing an example of the operation of the color image forming apparatus 100. FIG. 53 is a flow chart showing an example of the acquisition of position data DP based on passage time data DT.

In this example of the embodiment, in order that a color image may be formed through the superposition of component color images on the basis of arbitrary image information, a series of color registration marks CR for the registration of component color images are formed for each of the component colors on the intermediate transfer member (the image transfer system) 6, with a region in which each color registration mark MARKi is formed taken as a unit basic range Pr.

That is, in detecting color registration marks, a series of registration marks MARKi (i=1, 2, . . . ) are formed on the intermediate transfer belt 6 for each of the component colors in the order BK, C, M, and Y. The passage timing signal for the registration marks MARKi is divided by a certain unit basic time, and passage time data DT in each unit basic time are converted into position data DP. After that, the position data DP representing ranges common to the ranges overlapping one another represented by pairs of position data DP are extracted as the position data DP of the color registration marks CR of the color concerned; thus, it becomes possible to eliminate the influence of belt scratches 9 etc.

With this incorporated into the image forming condition, in the step S1 of the flow chart shown in FIG. 52, color registration marks of the colors BK, C, M, and Y are formed on the basis of the color registration mark data for the detection of the color registration. In this example, color registration marks are simultaneously formed in each of the image forming units 10K, 10C, 10M, and 10Y.

For example, in the image forming unit 10K, the latent image of 7-shaped marks of the color BK is written on the photoreceptor drum 1K in the image forming unit 10K, and is developed by a toner of the color BK to form BK-color marks PK. In the same way, in the image forming unit 10C, the latent image of 7-shaped marks of the color C is written on the photoreceptor drum 1C in the image forming unit 10C, and is developed by a toner of the color C to form C-color marks PC.

In the image forming unit 10M, the latent image of 7-shaped marks of the color M is written on the photoreceptor drum 1M in the image forming unit 10M, and is developed by a toner of the color M to form M-color marks PM. In the image forming unit 10Y, the latent image of 7-shaped marks of the color Y is written on the photoreceptor drum 1Y in the image forming unit 10Y, and is developed by a toner of the color Y to form Y-color marks PY.

After that, the procedure moves to the step S2, where the toner images of the color registration marks CR of the colors BK, C, M, and Y are successively transferred from the photoreceptor drums 1K, 1C, 1M, and 1Y onto the intermediate transfer belt 6. Then, the positions of the color registration marks of the colors BK, C, M, and Y formed on the intermediate transfer belt 6 are detected by the registration sensors 12A etc.

In this example, as shown in FIG. 45(B), a position detection signal S2 is detected by the registration sensor 12A or the like, and this position detection signal S2 is binarized on the basis of specified threshold voltage Lth. The position detection signal SP after being binarized becomes a passage timing pulse signal SP. This signal SP is outputted from the comparator 59 through the mask generation circuit 515 to the latch circuit 56, and is used as the reference for the adjustment of the positional deviations of component color images.

For example, after the calling of the sub-routine shown in FIG. 53, in the step T1 of the flow chart, the counter circuit (a timer) 54 is actuated. This actuation is done for the purpose of setting reference values beforehand concerning color registration marks CR for the registration of component color images formed on the intermediate transfer belt 6, and for the color registration marks CR formed on the intermediate transfer belt 6, obtaining position data DP representing the forming positions of the color registration marks CR with respect to the reference values.

Then, the procedure moves to the step T2, where it is judged whether or not an end mark is detected by the CPU 55. In this example, the end mark is the last registration mark MARK16 in the Y-color mark PY. If this end mark has not been detected, the procedure moves to the step T3, where it is checked if the rising edge of the passage timing pulse signal SP at the registration mark MARKi of the color concerned has been detected.

If the rising edge of the passage timing pulse signal SP has been detected, the procedure moves to the step T4, where passage time data DT are stored. In this example, it is practiced that, as shown in FIG. 45(B), first, at the rising edge (1) of the passage timing pulse signal SP for the color BK, a count value Cout by the counter circuit 54 is latched, and the passage time data DT are memorized (loaded) in the RAM 57.

Then, the procedure moves to the step T5, where it is checked if the falling edge of said registration mark MARKi has been detected. If the falling edge has been detected, the procedure moves to the step T6, where the passage time data DT are memorized. In this example, it is practiced that, as shown in FIG. 45(B), at the falling edge (2) of the passage timing pulse signal SP for the color BK, a count value Cout from the counter circuit 54 is latched, and the passage time data DT are memorized (loaded) in the RAM 57.

After that, the procedure returns to the step T2. If the end mark has not been detected in the step T2, the procedure moves to the step T3, and the above-mentioned acquisition processing of passage time data DT is repeated. For example, it is practiced that, at the rising edge (3) of the passage timing pulse signal SP for the color BK, a count value Cout by the counter circuit 54 is latched, and the passage time data DT are memorized (loaded) in the RAM 57.

After that, it is practiced that a count value Cout by the counter circuit 54 is latched at the falling edge (4) of the passage timing pulse signal SP in the step T6, and the passage time data DT are memorized (loaded) in the RAM 57. By doing this, the position data concerning one registration mark MARK1 of the color BK are obtained. In this way, when all the forming positions of the color registration marks CR of the colors BK, C, M, and Y formed on the intermediate transfer belt 6 are detected and the end mark is detected in the step T2, the procedure moves to the step T7.

In the step T7, the passage time data DT are converted into position data DP. In this example, as explained in FIG. 47(B), as regards the passage time data DT of the color registration marks CR of each color obtained in the steps T2 to T6, a passage time data "140" is selected for the arbitrary reference value. The position data DP are to be obtained by, first, subtracting this passage time data "140" representing the reference value from each passage time data DT. By this operation, the forming positions of the registration mark MARK1 from the reference position becomes able to be specified, and position data DP with respect to the reference value can be obtained. As regards the other registration marks MARK2 to MARK16, the same operation is carried out.

Then, the position data DP are sorted for each unit basic range Pr in the step T71, and the procedure moves to the step T72, where an operation for converting the values of the position data in each unit basic range into values based on the reference value representing the front edge (border between the two unit basic ranges) of the unit basic range concerned is carried out. At this time, as explained in FIG. 47(C), the position data of the registration marks MARK2 to MARK16 except the registration mark MARK1 are converted into the position data DP for the comparison of positions.

The above-mentioned operation is done for the purpose of comparing the position data DP of the registration mark MARK1 with the position data DP of the other registration marks MARK2 to MARK16 through the translation of the reference position to the front edge position of each unit basic range. The position data DP for the comparison of the positions are used to eliminate data due to scratches from the registration marks MARKi.

Then, the procedure moves to the step T8, where the position data DP representing ranges common to the ranges overlapping one another represented by pairs of position data DP are extracted as the position data DP of the color registration marks of the color concerned for the registration of component color images (refer to FIG. 50(A) to FIG. 50(E)). The position data DP extracted here are used later for the purpose of calculating the amounts of positional deviations of component color images from one another. In this way, when all the position data DP of the color registration marks CR of the colors BK, C, M, and Y formed on the intermediate transfer belt 6 are obtained, registration mark detection processing is completed, and the procedure moves back to the step S3 of the main routine shown in FIG. 52.

Further, the procedure moves to the step S4, where the correction values of the positional deviations for the color Y are calculated on the basis of the position data DP of the color registration marks CR. In this example, the amounts of deviations ϵ of the writing positions for the colors Y, M, C from the writing position for the color BK are calculated. For example, as shown in FIG. 51, to take the position data DP for the color BK taken as the reference, and assuming that the writing position for the color Y is to be adjusted, if the registration mark MARK5 of the color Y is retarded by ϵ, the data (T1Y', T2Y') are detected as the position data DP' for the color Y. In order to correct this position deviation, $\epsilon 1 = (T1y'-T1Y)$, and $\epsilon 2 = (T2Y'-T2Y)$ are calculated.

After that, the procedure moves to the step S5, where it is judged by the CPU 55 whether or not the color deviation correction for the colors K, C, M, and Y is to be practiced. Whether or not color deviation correction is to be practiced is judged by comparing the amounts of the positional deviations with a control target value determined beforehand. For example, if the amount of positional deviation of the color Y exceeds the target value and a correction of the color deviation is required, the procedure moves to the step S6, where the image writing section 3Y is controlled by the CPU 55.

At this time, it is practiced in the correction means for the color Y that the fθ lens adjusting mechanism 42 is driven on the basis of the position correction signal Sy (YVV), and the lens holding mechanism 41 is moved to rotate the fθ lens about its optical axis. By doing this, it is possible that the writing position of the light beam on the photoreceptor drum 1Y is adjusted, and the writing timing is adjusted in such a way that the above-mentioned positional deviations $\epsilon 1$, $\epsilon 2$, etc. become zero.

After that, the procedure moves to the step S7. In the step S7, it is judged whether or not writing position adjustment processing is to be carried out for the other colors too. If writing position adjustment processing is to be carried out for the other colors, namely, the colors M, C, and BK too, the procedure moves back to the step S6, where the above-mentioned processing is repeated. Further, if the amounts of positional deviations for all the colors BK, C, M, and Y are not greater than the target value to make color deviation correction unnecessary, the writing position adjustment processing is completed.

As explained in the above, according to the color image forming apparatus and the image forming method as the embodiment of this invention, in order that a color image may be formed through the superposition of the component color images on the basis of arbitrary image information, the position data DP of a series of color registration marks CR of each of the component colors are sorted for each unit basic range Pr, concerning the position data DP sorted for each unit basic range Pr in the above, an operation for converting the values of the position data in each unit basic range into values based on the reference value representing the front edge (border between the two unit basic ranges) of the unit basic range Pr concerned is carried out, and the position data DP for each of the component colors representing the front and rear edges of ranges common to the mutually overlapping ranges each of which is represented by a couple of position data corresponding to the rising edge and falling edge of a passage timing pulse in the unit basic range Pr concerned are extracted as the position data DP of the color registration marks for the registration of the component color images for each of the component colors.

Accordingly, the position data DP which represent a range not overlapped by any other range of positions represented by other position data DP can be eliminated as position data concerning the belt scratch 9 or the like. By doing this, even if position data DP containing those of belt scratch 9 etc. due to the use during the passage of time of the intermediate transfer belt 6 are obtained, position data DP not influenced by the belt scratch 9 etc. for each of the component colors can be extracted. Owing to this, it is not required to take the trouble of forming color registration marks CR avoiding the belt scratch 9 etc., and even if a plurality of belt scratches are produced on the intermediate transfer belt 6, position data DP not influenced by the belt scratches 9 etc. for each of the component colors can be extracted.

Owing to this, the forming positions of component color images can be adjusted at a high accuracy on the basis of high-reliability position data DP with no noise signal due to the belt scratch 9 etc. superposed. Accordingly, because component color images can be exactly superposed on the intermediate transfer belt 6, it is possible to transfer a color image onto a desired transfer paper sheet.

Furthermore, for the position data DP of series of color registration marks CR of the plural component colors formed on the intermediate transfer belt 6, it is possible to practice the scratch elimination processing in one time; therefore, it is unnecessary to practice the color registration mark formation sequence several times, which makes it possible, compared to a conventional method, to shorten the calculation time of the amounts of positional deviations.

As explained up to now, according to an image forming apparatus of the embodiment 7 of the present invention, the image forming apparatus is equipped with a control device for controlling, in order that a color image may be formed through the superposition of the component color images on the basis of arbitrary image information, an image transfer means or/and image forming units on the basis of the position detection of a plurality of series of mark images for the registration of the component color images, this control device obtains position data representing the forming positions of each series of mark images with respect to a reference value arbitrarily determined for the mark images for the registration of the component color images formed on the image transfer means, the position data of each series of the mark images for each component color are sorted for each unit basic range, concerning the position data sorted for each unit basic range in the above, an operation processing for converting the values of the position data in each unit basic range into values based on the reference value representing the front edge (border between the two unit basic ranges) of the unit basic range concerned, the position data DP for each of the component colors representing the front and rear edges of ranges common to the mutually overlapping ranges each of which is represented by a couple of position data corresponding to the rising edge and falling edge of a passage timing pulse in the unit basic range Pr concerned are extracted as the position data DP of the mark images for the registration of the component color images for each of the component colors, and the amounts of positional deviations of the component color images from one another are calculated on the basis of the position data extracted in the above.

By this structure, the position data which represent a range not overlapped by any other range of positions represented by other position data can be eliminated as position data concerning scratches. Accordingly, even if position data containing those of scratches due to the use during the passage of time of the image transfer means are obtained position data not influenced by scratches for each of the component colors can be extracted. Owing to this, it is not required to take the trouble of forming mark images avoiding a scratch, and even if a plurality of scratches are produced on the image transfer means, position data not influenced by the scratches for each of the component colors can be extracted.

Furthermore, for the position data of a plurality of series of color registration marks CR of the plural component colors formed on the image transfer means, it is possible to practice the scratch elimination processing in one time; therefore, it is unnecessary to practice the color registration formation sequence several times, which makes it possible, compared to a conventional method, to shorten the calculation time of the amounts of positional deviations.

According to an image forming method of the embodiment 7 of the present invention, in order that a color image may be formed through the superposition of the component color images on the basis of arbitrary image information, position data with respect to a reference value arbitrarily determined concerning mark images for the registration of component color images formed on an image transfer system are obtained, the position data of the mark images of each component color are sorted for each unit basic range, an operation processing for converting the values of the position data in each unit basic range into values based on the reference value representing the front edge (border between the two unit basic ranges) of the unit basic range concerned, the position data for each of the component colors representing the front and rear edges of ranges common to the plural ranges represented by pairs of position data overlapping one another in the unit basic range Pr are extracted as the position data of the mark images for the registration of the component color images for each of the component colors, and the amounts of positional deviations of component color images from one another are calculated on the basis of the position data extracted in the above.

By this structure, the position data which represent a range not overlapped by any other range of positions represented by other position data can be eliminated as position data concerning scratches. Accordingly, even if position data containing those of scratches due to the use during the passage of time of the image transfer system are obtained, position data not influenced by scratches for each of the component colors can be extracted.

Furthermore, for the position data of a plurality of series of mark images of the plural component colors formed on the image transfer system, it is possible to practice the scratch elimination processing in one time; therefore, it is unnecessary to practice the mark image formation sequence a plurality of times, which makes it possible, compared to a conventional method, to shorten the calculation time of the amounts of positional deviations.

It is extremely suitable to apply this invention to a printer or copying machine of a tandem type, or a complex machine of these.

What is claimed is:

1. An image forming apparatus for forming a color image on the basis of arbitrary image information for the color image, the apparatus comprising:
   (a) an image forming device having an image forming member for forming the color image through a superposition of component color images on the basis of the arbitrary image information;
   (b) a detector for detecting a position of a color image formed by the image forming device; and
   (c) a controller for controlling the image forming device on the basis of an output of the detector,
   wherein the controller controls the image forming device to form at least mark images or reversed mark images which are reversed from the mark images for a registration of component color images according to a condition of use of the image forming device, and controls the image forming device to adjust forming positions of component color images on the basis of a position detection of the mark images or those defined by void portions which are not filled with color toner particles, of the reversed mark images formed by the image forming device.

2. The image forming apparatus of claim 1, wherein the image forming device comprises:
   a plurality of image forming units each having an image forming member for a component color for forming a toner image corresponding to the component color on the image forming member; and
   an image transfer device to which the toner images formed on a plurality of image forming bodies are transferred.

3. The image forming apparatus of claim 2,
   wherein the image transfer device comprises an intermediate transfer body on which the mark images or the reversed mark images which are reversed from the mark images for a registration of component color images, wherein the apparatus further comprises a memory for storing mark image information to form the mark images and reversed mark image information to form the reversed mark images, and wherein the controller controls the detector to detect a state of a color image forming surface of the intermediate transfer body, judges whether the state of the color image forming surface is good or not according to a detected result and controls the memory to select and read the stored information.

4. The image forming apparatus of claim 3, wherein when the state of the color image forming surface is good, the controller controls the image forming device to form the mark images on the intermediate transfer body according to the mark image information and controls the image forming device to adjust the forming positions of the component color images on the basis of the position detection of the mark images, and wherein when the state of the color image forming surface is inferior to a predetermined control reference value, the controller controls the image forming device to form the reversed mark images on the intermediate transfer body according to the reversed mark image information and controls the image forming device to adjust the forming positions of the component color images on the basis of the position detection of the reversed mark images formed on the image transfer device.

5. The image forming apparatus of claim 3, further comprising an operation device for selecting a first adjustment mode or a second adjustment mode, wherein the controller is controlled according to an output of the operation device, where the first adjustment mode represents a processing in which the mark images are formed on the intermediate transfer body according to the mark image information and the forming positions of the component color images on the basis of the position detection of the mark images formed on the intermediate transfer body, are adjusted, and where the second adjustment mode represents a processing in which the reversed mark images are formed on the intermediate transfer body and the forming positions of the component color images on the basis of the position detection of the reversed mark images formed on the intermediate transfer body, are adjusted.

6. The image forming apparatus of claim 3, wherein the detector comprises a plurality of detectors which are arranged in a main scanning direction where a sub-scanning direction represents a traveling direction of the intermediate transfer body and the main scanning direction represents a direction perpendicular to the sub-scanning direction.

7. The image forming apparatus of claim 3, wherein the controller controls each of the image forming units so that an output of the detector is input and the mark images or the reversed mark images are formed on the component color image forming surface of the intermediate transfer body in accordance with the state of the surface of the intermediate transfer body.

8. The image forming apparatus of claim 3, wherein the image transfer device comprises a fuse for detecting a new article, and each of the image forming units outputs a new article detection signal on the basis of whether the fuse is brown out or not, and a discrimination circuit for blow out the fuse according to the a signal set outside.

9. The image forming apparatus of claim 8, wherein while the controller controls the image forming units according to the second adjustment mode, when the new article detection signal obtained from the discrimination circuit of the image forming units indicates that the image transfer device is new, the controller controls the image forming units according to the first adjustment mode after being switched from the second adjustment mode.

10. The image forming apparatus of claim 8, wherein the controller controls the image forming units so that the mark images or the reversed mark images are formed on the component color image forming surface of the intermediate transfer body on the basis of the new article detection signal obtained from the discrimination circuit of the image forming units.

11. The image forming apparatus of claim 2, wherein the image forming device comprises:

a single image forming member on which the component color images are superposed to form the color image; and a plurality of image forming units each for forming a component color image on the single image forming member.

12. The image forming apparatus of claim 11, wherein the mark images or the reversed mark images which are reversed from the mark images for a registration of component color images, are formed on the image forming member, wherein the apparatus further comprises a memory for storing mark image information to form the mark images and reversed mark image information to form the reversed mark images, and wherein the controller controls the detector to detect a state of a color image forming surface of the image forming member, judges whether the state of the color image forming surface is good or not according to a detected result and controls the memory to select and read the stored information.

13. The image forming apparatus of claim 11, wherein when the state of the color image forming surface is good, the controller controls the image forming device to form the mark images on the image forming member according to the mark image information and controls the image forming device to adjust the forming positions of the component color images on the basis of the position detection of the mark images, and wherein when the state of the color image forming surface is inferior to a predetermined control reference value, the controller controls the image forming device to form the reversed mark images on the image forming member according to the reversed mark image information and controls the image forming device to adjust the forming positions of the component color images on the basis of the position detection of the reversed mark images formed on the image forming member.

14. The image forming apparatus of claim 11, further comprising an operation device for selecting a first adjustment mode or a second adjustment mode, wherein the controller is controlled according to an output of the operation device, where the first adjustment mode represents a processing in which the mark images are formed on the image forming member according to the mark image information and the forming positions of the component color images on the basis of the position detection of the mark images formed on the image forming member, are adjusted, and where the second adjustment mode represents a processing in which the reversed mark images are formed on the image forming member and the forming positions of the component color images on the basis of the position detection of the reversed mark images formed on the image forming member, are adjusted.

15. The image forming apparatus of claim 11, wherein the detector comprises a plurality of detectors which are arranged in a main scanning direction where a sub-scanning direction represents a traveling direction of the image forming member and the main scanning direction represents a direction perpendicular to the sub-scanning direction.

16. The image forming apparatus of claim 11, wherein the controller controls each of the image forming units so that an output of the detector is input and the mark images or the reversed mark images are formed on the component color image forming surface of the image forming member in accordance with the state of the surface of the image forming member.

17. The image forming apparatus of claim 11, wherein the image forming member comprises a fuse for detecting a new article, and each of the image forming units outputs a new article detection signal on the basis of whether the fuse is brown out or not, and a discrimination circuit for blow out the fuse according to the a signal set outside.

18. The image forming apparatus of claim 11, wherein while the controller controls the image forming units according to the second adjustment mode, when the new article detection signal obtained from the discrimination circuit of the image forming units indicates that the image forming member is new, the controller controls the image forming units according to the first adjustment mode after being switched from the second adjustment mode.

19. The image forming apparatus of claim 11, wherein the controller controls the image forming units so that the mark images or the reversed mark images are formed on the component color image forming surface of the image forming member on the basis of the new article detection signal obtained from the discrimination circuit of the image forming units.

* * * * *